US012624544B2

(12) United States Patent
Ferrari et al.

(10) Patent No.: US 12,624,544 B2
(45) Date of Patent: May 12, 2026

(54) AUTONOMOUS ROBOTIC CONSTRUCTION SYSTEM AND METHOD

(71) Applicant: SQ4D PATENT LLC, Patchogue, NY (US)

(72) Inventors: Sal Ferrari, Patchogue, NY (US); Robert Smith, Medford, NY (US); Mario Szczepanski, Medford, NY (US)

(73) Assignee: SQ4D PATENT LLC, Patchogue, NY (US)

( * ) Notice: Subject to any disclaimer, the term of this patent is extended or adjusted under 35 U.S.C. 154(b) by 0 days.

(21) Appl. No.: 16/382,847

(22) Filed: Apr. 12, 2019

(65) Prior Publication Data

US 2019/0316344 A1     Oct. 17, 2019

Related U.S. Application Data

(60) Provisional application No. 62/657,769, filed on Apr. 14, 2018.

(51) Int. Cl.

| | |
|---|---|
| *E04B 1/35* | (2006.01) |
| *B25J 5/04* | (2006.01) |
| *B28B 1/00* | (2006.01) |
| *B33Y 10/00* | (2015.01) |
| *B33Y 30/00* | (2015.01) |

(52) U.S. Cl.
CPC ..... *E04B 1/35* (2013.01); *B25J 5/04* (2013.01); *B28B 1/001* (2013.01); *B33Y 10/00* (2014.12); *B33Y 30/00* (2014.12)

(58) Field of Classification Search
CPC ................................... B25J 5/04; B28B 1/001
See application file for complete search history.

(56) References Cited

U.S. PATENT DOCUMENTS

| | | | | |
|---|---|---|---|---|
| 5,529,471 | A | * 6/1996 | Khoshevis | B29C 41/36 |
| | | | | 425/150 |
| 11,766,807 | B2 | * 9/2023 | Butler | B28C 5/06 |
| | | | | 366/3 |
| 2005/0196484 | A1 | * 9/2005 | Khoshnevis | B29C 64/118 |
| | | | | 425/463 |
| 2015/0290860 | A1 | * 10/2015 | Shaw | B22F 12/53 |
| | | | | 264/308 |
| 2016/0046073 | A1 | * 2/2016 | Hadas | B29C 48/345 |
| | | | | 264/211.21 |

(Continued)

FOREIGN PATENT DOCUMENTS

| | | | |
|---|---|---|---|
| CN | 204354263 | U * | 5/2015 |
| CN | 106182787 | A * | 12/2016 |

(Continued)

*Primary Examiner* — Ariella Machness

(74) *Attorney, Agent, or Firm* — Lando & Anastasi, LLP

(57) ABSTRACT

Thus, there is disclosed an autonomous robotic construction system comprising at least one frame comprising at least one substantially horizontal track and at least one set of substantially vertical track; at least one nozzle; at least one movable device coupled to the frame and configured to move said nozzle around said frame; at least one pump configured to pump building materials through said at least one nozzle; and at least one computer system comprising at least one microprocessor configured to control said at least one nozzle, said at least one movable device and said at least one pump to control deposition of any building materials on a site.

26 Claims, 56 Drawing Sheets

(56)                    References Cited

U.S. PATENT DOCUMENTS

2017/0173884 A1*    6/2017    Ryan ..................... B29C 64/118
2017/0361493 A1*   12/2017    Jones ........................ B28C 5/48
2018/0056544 A1*    3/2018    Kreiger .................. B28B 1/001
2018/0093373 A1*    4/2018    Niederberger ........ B29C 64/209
2021/0107177 A1*    4/2021    Giles ......................... E04B 1/35
2021/0129377 A1*    5/2021    Mo ......................... B28B 1/522
2021/0146573 A1*    5/2021    Roux ..................... B01F 27/50

FOREIGN PATENT DOCUMENTS

CN              107042632  A  *   8/2017    ............. B28B 1/001
CN              107415220  A  *  12/2017
KR             20180012432  A  *   2/2018
WO     WO-2005070657  A1  *   8/2005    ........... E04B 1/3505
WO     WO-2016020150  A1  *   2/2016    ............. B29C 48/00

* cited by examiner 20, 30

32  34        30

38.1   36.1   38.2   36.2

33

32.1

32.2

38.1, 38,2, 36.1, 36.2

33

FIG. 9A
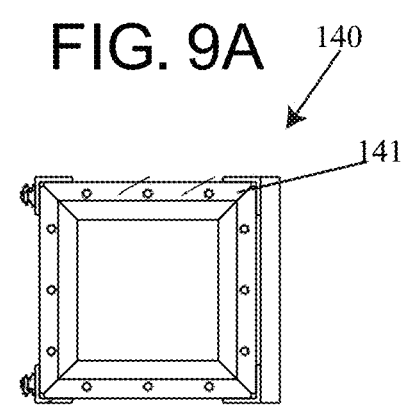
FIG. 9B
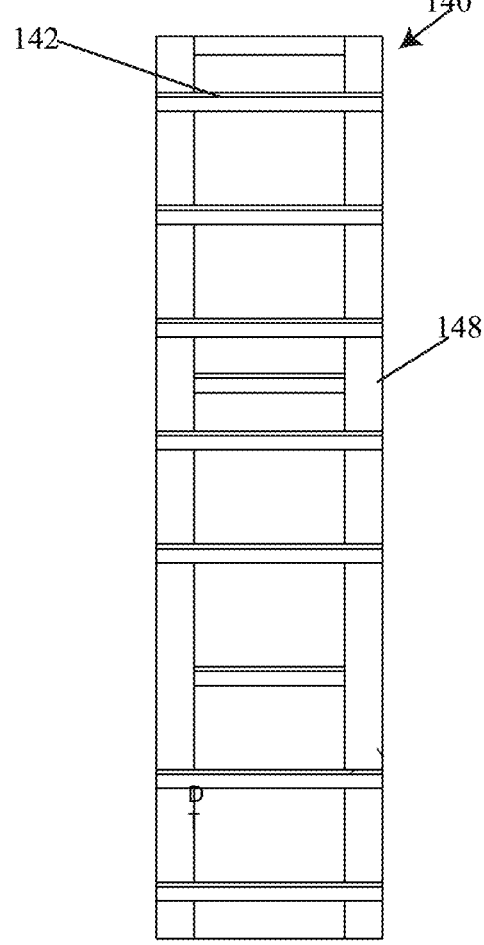
FIG. 9C
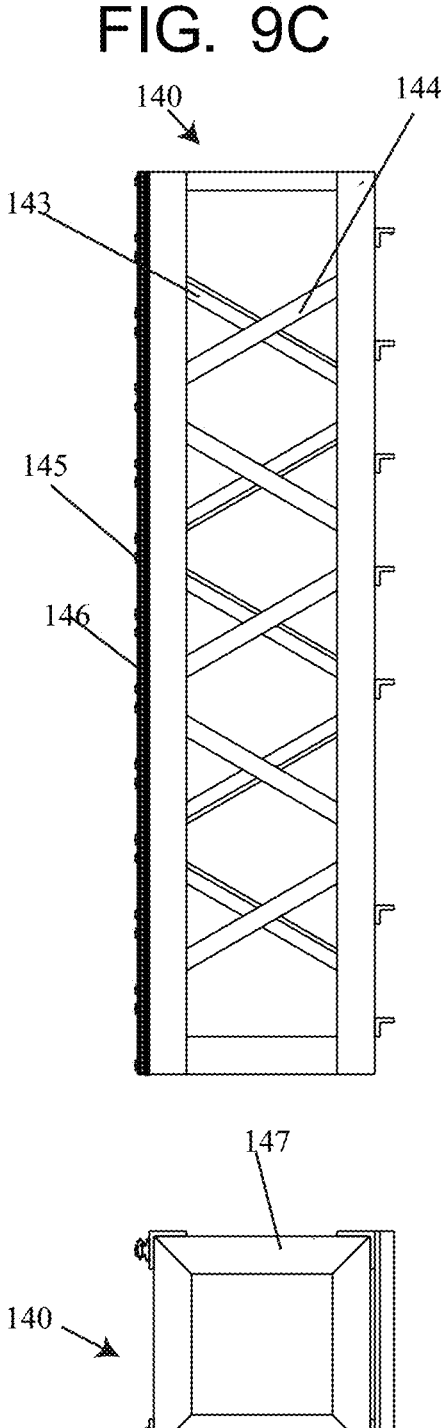
FIG. 9D

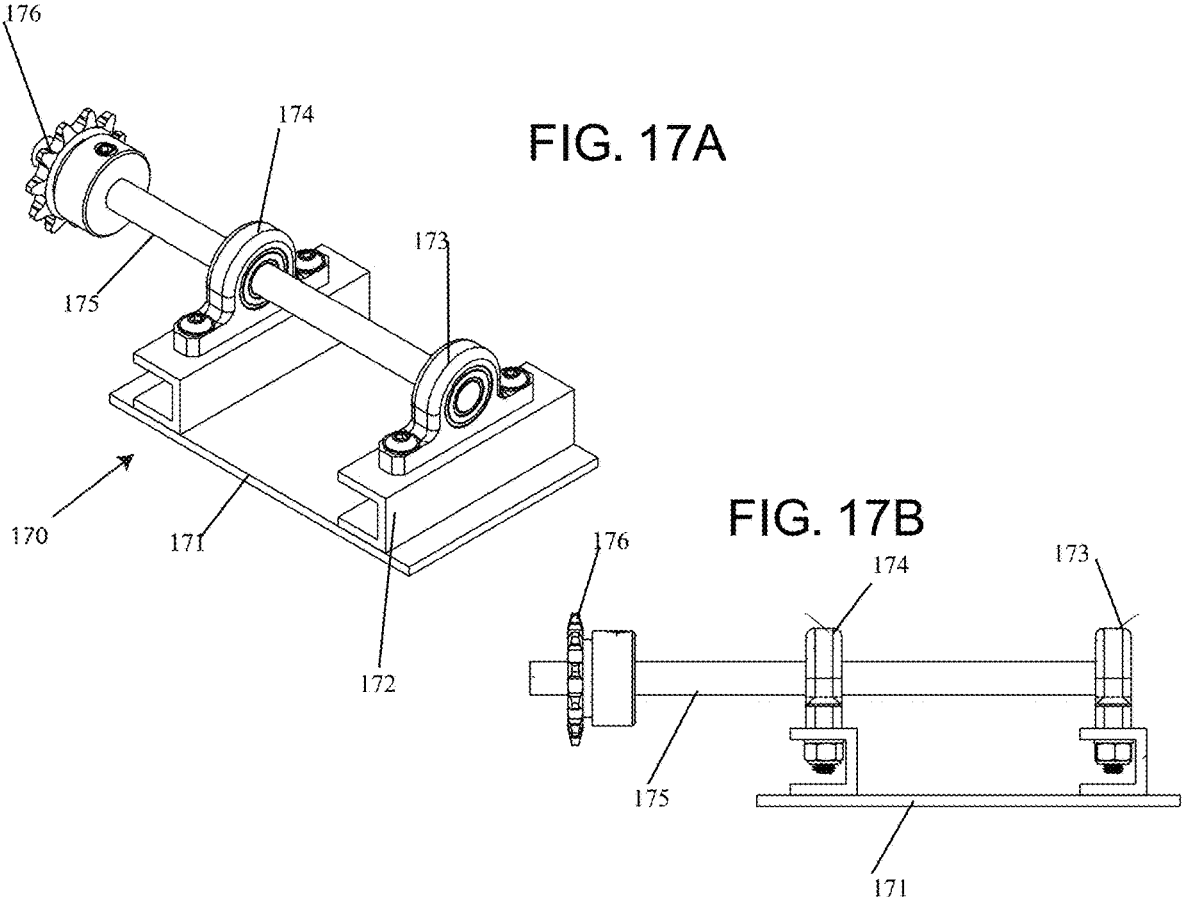
FIG. 17A
FIG. 17B
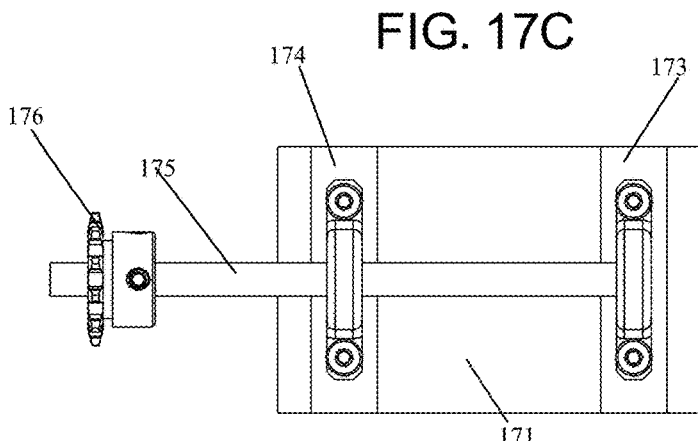
FIG. 17C

FIG. 18A
FIG. 18B
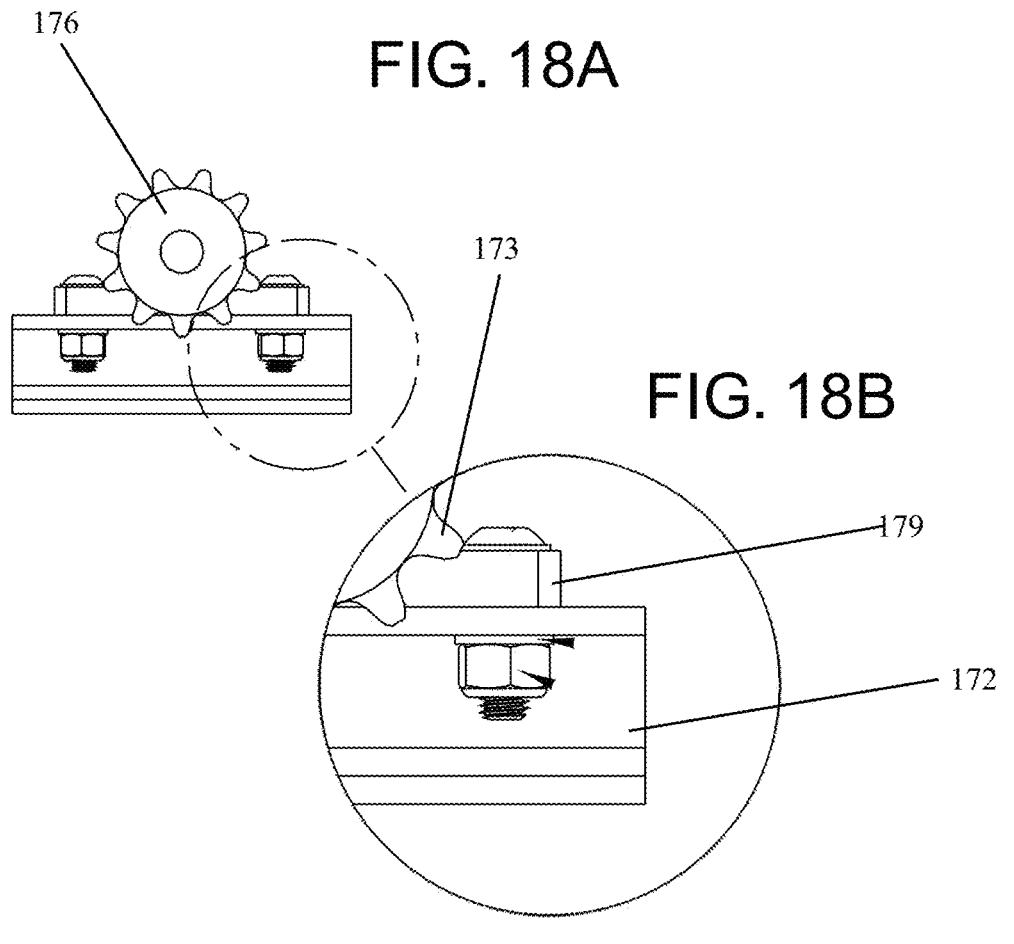
FIG. 18C
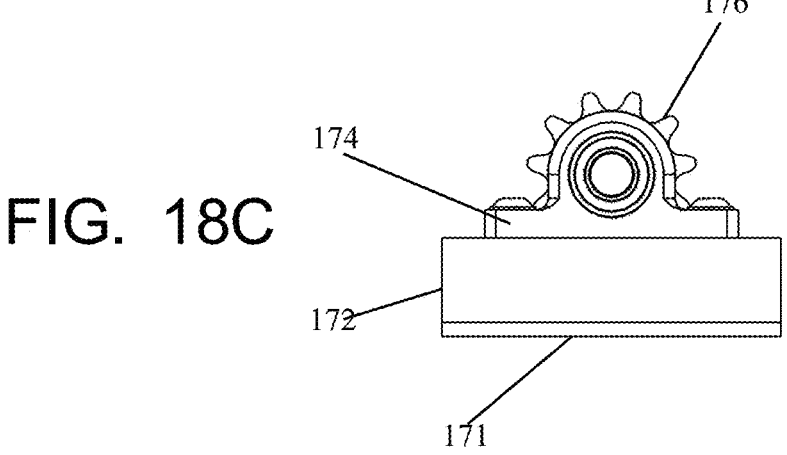

FIG. 19A
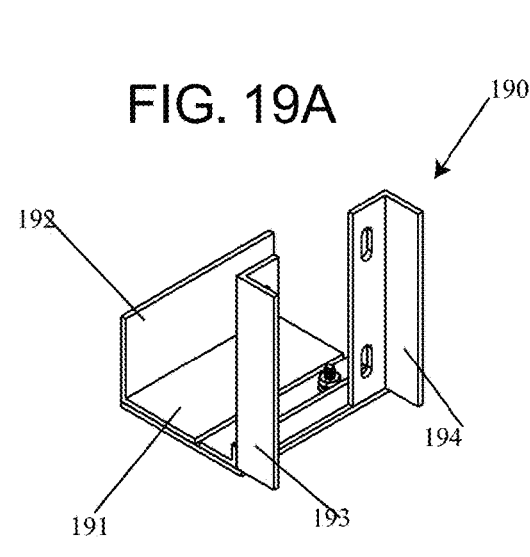
190
192
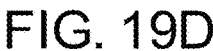
191
193
194
FIG. 19D
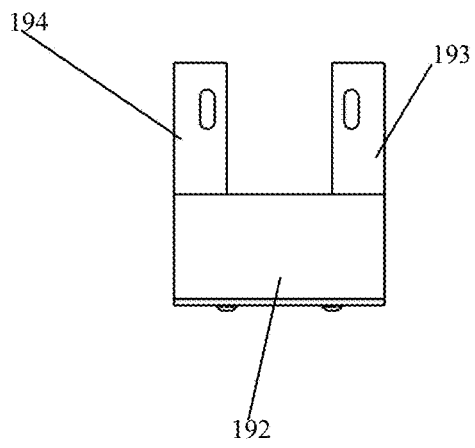
194
193
192
FIG. 19B
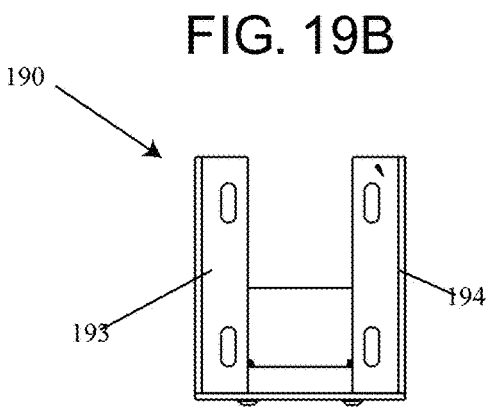
190
193
194
FIG. 19C
190
FIG. 19E
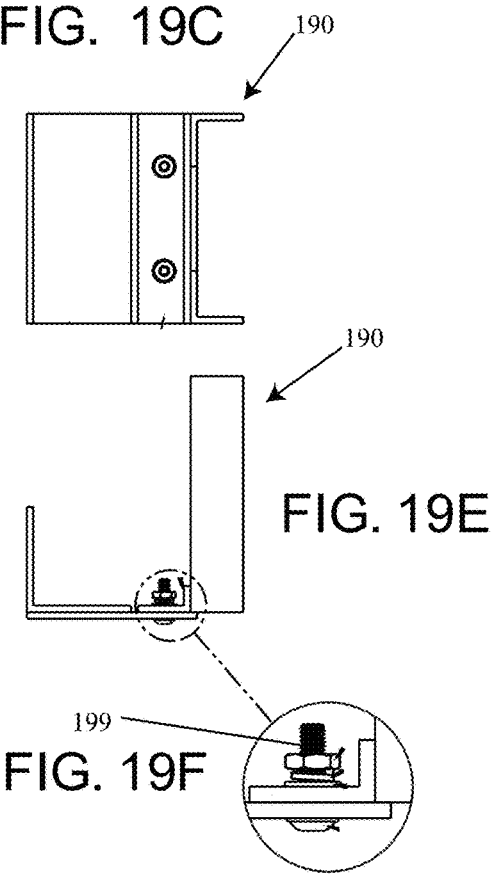
190
199
FIG. 19F

SECTION A-A

FIG. 33A
FIG. 33B
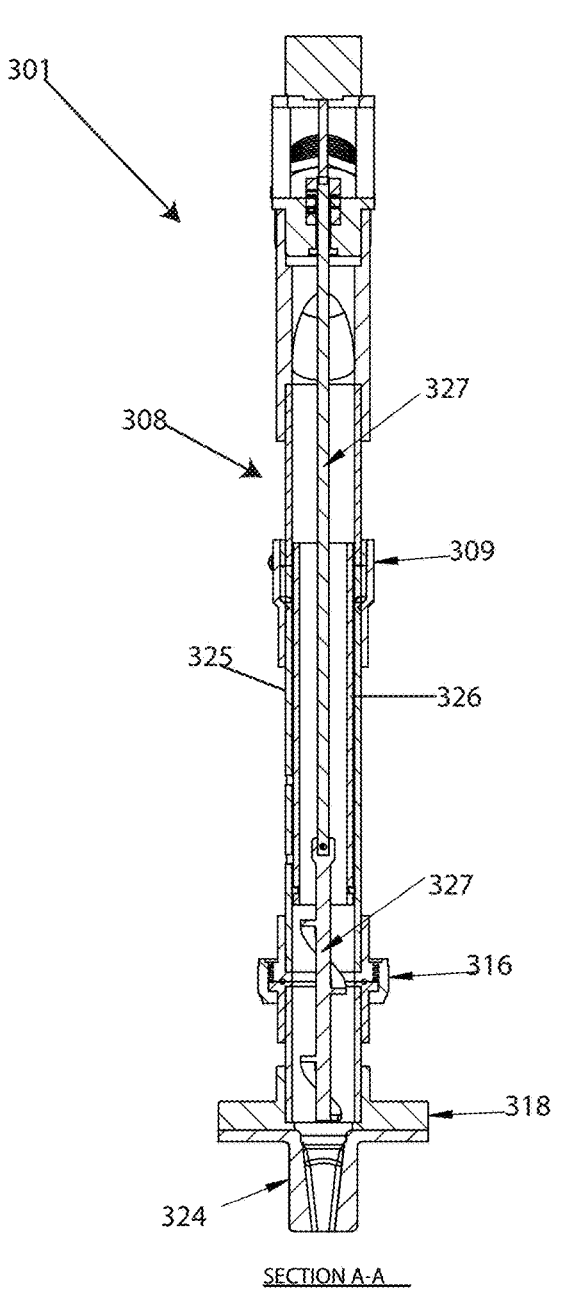
SECTION A-A
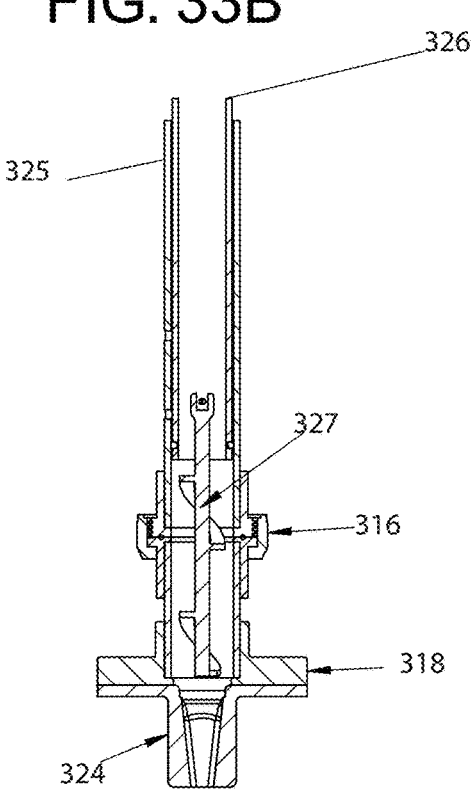

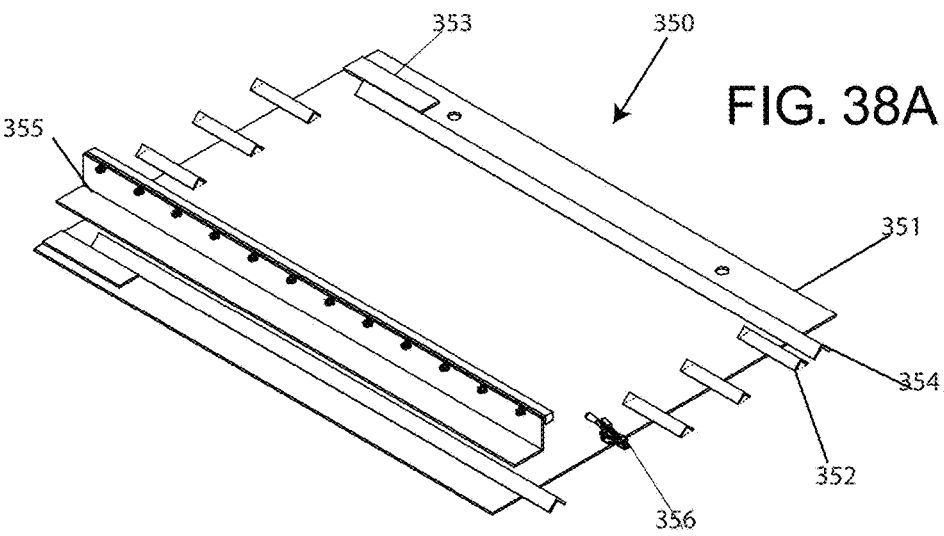
FIG. 38A
FIG. 38B
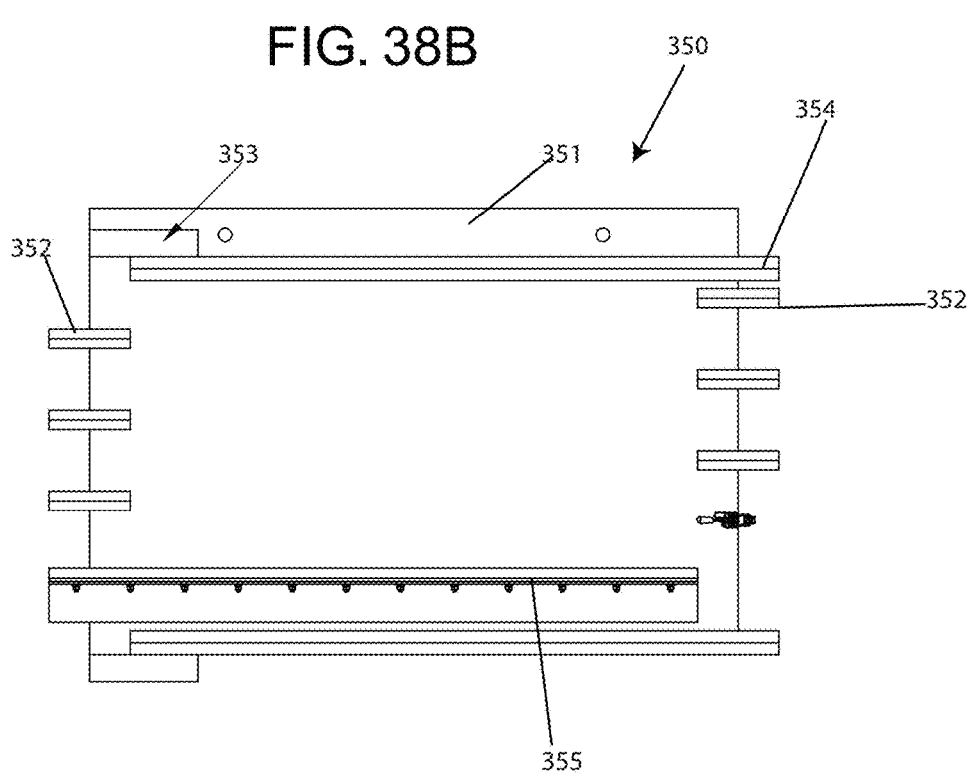

362.4

362.6

362.7

362.1
362.4
362.5

362.6

362.4

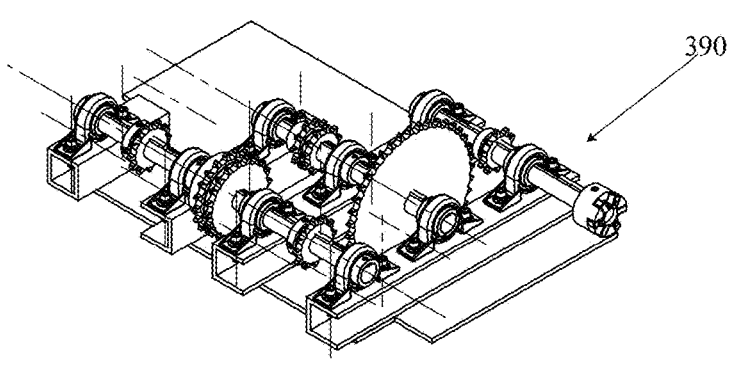
FIG. 49A
FIG. 49B
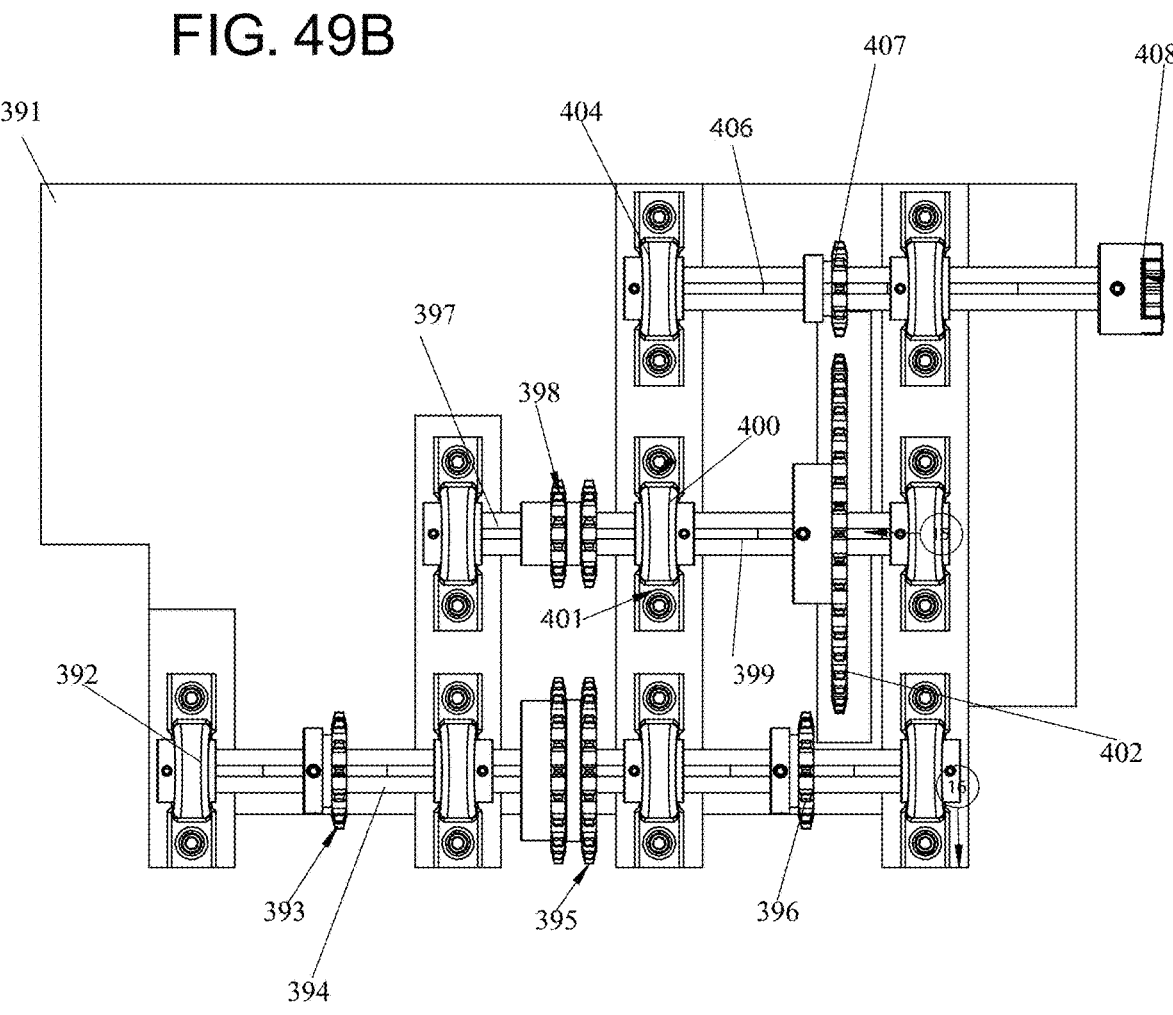

S110 — Start At First Wall Deposit Material

S111a — Move Head in pre-set pattern (Sinulsoidal)

Rotate Head S111b

S112 — Move To Opposite Wall

S114 — Move Back to First Wall

S115 — Maintain Pre-set Pattern and Rotation Until Walls Structurally Joined

FIG. 55

442 angle a        444

446

AUTONOMOUS ROBOTIC CONSTRUCTION SYSTEM AND METHOD

CROSS REFERENCE TO RELATED APPLICATIONS

This application is a non-provisional application that hereby claims priority under 35 U.S.C. 119 from U.S. provisional application Ser. No. 62/657,769 filed on Apr. 14, 2018 the disclosure of which is hereby incorporated herein by reference in its entirety.

BACKGROUND OF THE INVENTION

At least one embodiment of the invention relates to an autonomous robotic construction system and method that can be used to manufacture or print buildings or building components. The system comprises a frame, a nozzle, and at least one computer-controlled system for autonomous robotic construction of a building structure. Traditional building procedures involve framing a wall with extensive labor involved. Much of the work is customized and subject to human error. Therefore, there is a need for an automated robotic construction system and method.

SUMMARY OF THE INVENTION

Thus, there is disclosed an autonomous robotic construction system and method comprising at least one frame comprising at least one substantially horizontal track and at least one set of substantially vertical track; at least one nozzle; at least one movable device coupled to the frame and configured to move said nozzle around said frame; at least one pump configured to pump building materials through said at least one nozzle; and at least one computer system comprising at least one microprocessor configured to control said at least one nozzle, said at least one movable device and said at least one pump to control deposition of any building materials on a site.

In at least one embodiment the at least one movable device is configured to move along at least one of said substantially horizontal track or said substantially vertical track.

In at least one embodiment, the at least one substantially horizontal track which comprises at least two substantially parallel tracks.

In at least one embodiment, the at least one substantially vertical track comprises at least two substantially parallel tracks.

In at least one embodiment there is at least one cross-beam configured to extend between two substantially parallel horizontal tracks.

In at least one embodiment, the nozzle is coupled to the cross beam.

In at least one embodiment the substantially horizontal track comprises at least one substantially I beam shaped track.

In at least one embodiment the movable device comprises at least one cart.

In at least one embodiment the substantially vertical track is positioned on at least one cart wherein the substantially vertical track is movable along the horizontal track via the cart.

In at least one embodiment the cross-beam is vertically movable along each of the two substantially parallel vertical tracks.

In at least one embodiment there is a nozzle platform, wherein the nozzle is coupled to the nozzle platform, wherein said the nozzle platform is movable along the one cross-beam.

In at least one embodiment, the nozzle or head can be a rotating head for precise application of building materials. These building materials can be in the form of a cement, concrete, and/or fiber reinforced cement or fiber reinforced concrete or any other suitable poured or injected building materials.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 9A is a bottom view of the vertical rail system;

FIG. 9B is a side view of the vertical rail system;

FIG. 9C is a side view of the vertical rail system rotated 90 degrees with respect to FIG. 9B;

FIG. 9D is a top view of the vertical rail system;

FIG. 10A is another side view of the vertical rail system;

FIG. 10B is another side view of the vertical rail system;

FIG. 17A is a perspective view of the idler assembly;

FIG. 17B is a side view of the idler assembly;

FIG. 17C is a top view of the idler assembly;

FIG. 18A is a top-side perspective view of the gear of FIG. 17A;

FIG. 18B is a close up view of a connector region of FIG. 18A;

FIG. 18C is a close up view of the gear;

FIG. 19A is a side view of the drive housing;

FIG. 19B is an end view of the drive housing;

FIG. 19C is an opposite end view of the drive housing;

FIG. 19D is a top view of the drive housing;

FIG. 19E is a side view of the drive housing;

FIG. 19F is a close-up view of the drive housing;

FIG. 33A is a side cross-sectional view of a nozzle section;

FIG. 33B is a close-up end section of the nozzle of FIG. 33A taken along section A-A;

FIG. 38A is a perspective view of a track;

FIG. 38B is a top view of a track;

FIG. 49A is a perspective view of a Z-drive;

FIG. 49B is a top view of the Z-drive;

FIG. 55 is a view of a wall with a substantially perpendicular intersecting wall.

DETAILED DESCRIPTION OF PREFERRED EMBODIMENTS

Figure 1:
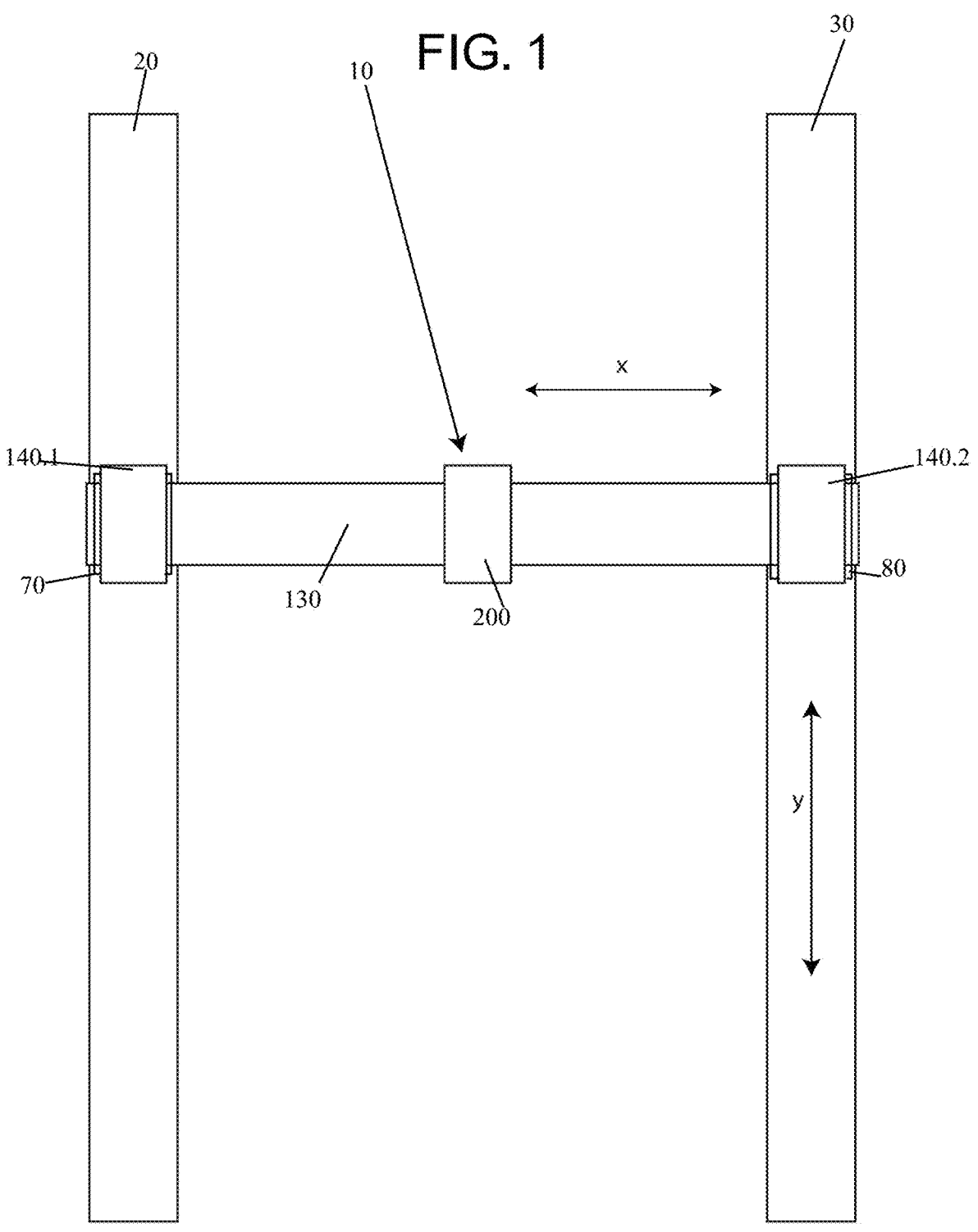
FIG. 1 is a top or plan view of the frame.

Referring to the drawings, FIG. 1 shows a top plan view of a frame 10 for a building printing system according to at least one embodiment. For example, there is at least one first track 20, and an oppositely spaced second track 30. First track 20 and second track 30 are spaced substantially parallel to each other and are in at least one embodiment configured to extend in a substantially horizontal manner. Thus, substantially horizontal tracks 20 and 30 form a path for movement of other tracks or towers on a frame. As shown there is at least one movable device 70 and/or 80 which can be in the form of a cart or trolley. Coupled to each cart or trolley 70 and 80 are respective vertical columns or towers 140.1 and 140.2. Carts or trolleys 70 or 80 are configured to move in a y axis. There is at least one cross-beam 130 which extends between vertical columns or towers 140 (See FIG. 9A) such as towers 140.1 and 140.2. Coupled to cross beam 130 is a nozzle platform 200 in the form of another cart. Cross-beam 130, in at least one embodiment has a track allowing platform or cart 200 having a distribution nozzle to move. Cross beam 130 can also be referred to as a tram as well and is configured to allow the nozzle to move along an x axis.

Thus, carts 70, 80 and 200 are movable along tracks to allow a nozzle to be portioned in an advantageous position.

Figure 2:
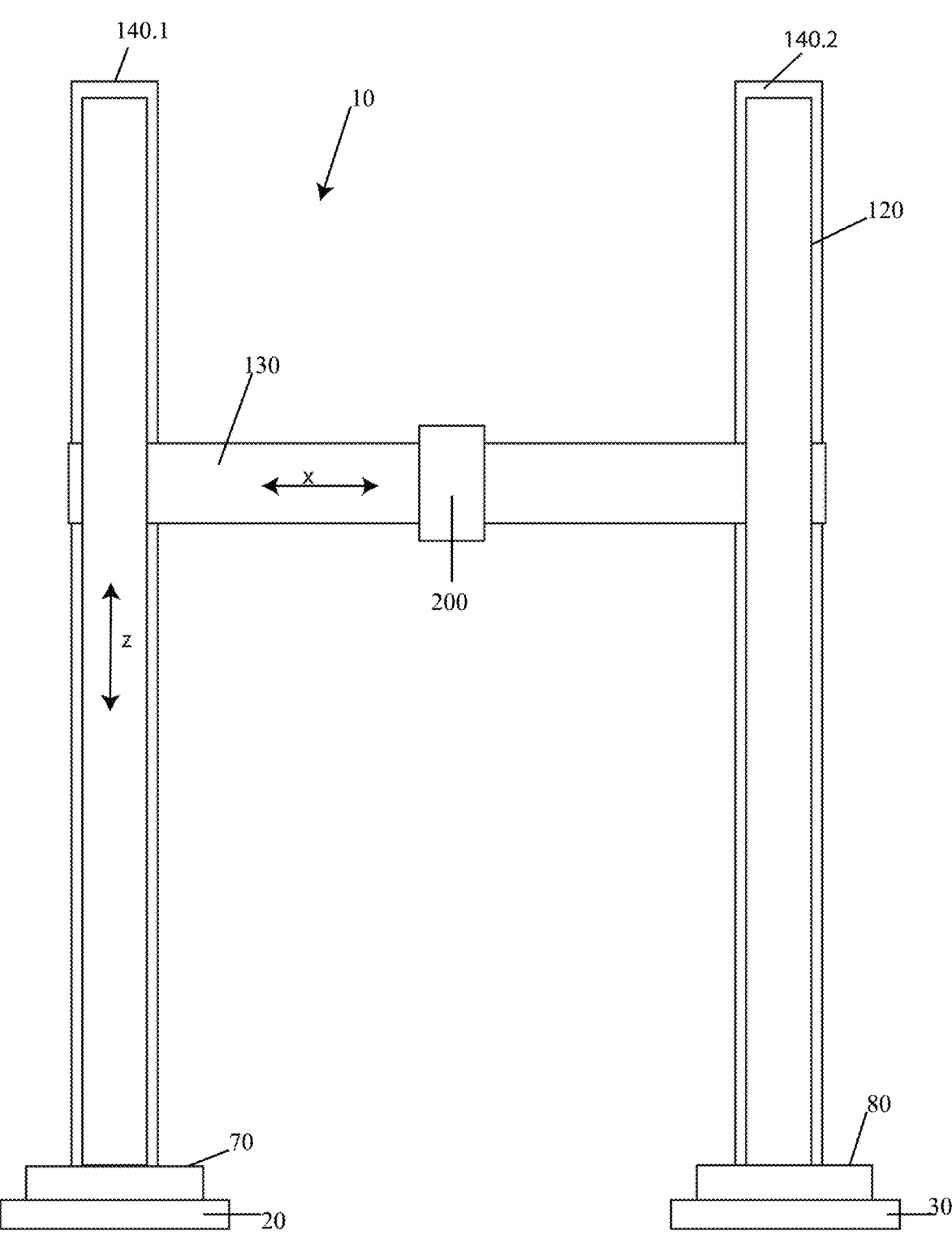
FIG. 2 is a side view of the frame.

FIG. 2 shows a side view of the frame 10 wherein in this view there is shown tracks 20 and 30 which are positioned to extend substantially horizontally. In addition, carts 70 and 80 are positioned on tracks 20 and 30 respectively. These carts are configured to move along these tracks. Positioned on carts 70 and 80 are respective tracks and/or towers 100 and 120 which extend substantially vertically and substantially perpendicular to an extension of respective tracks 20 and 30. Cross beam 130 is also shown extending between tracks 100 and 200 and nozzle platform 200 is shown coupled to cross-beam 130. Cross beam 130 is movable vertically along tracks and/or towers 100 and 120 via carts (not shown) in a z axis while vertical tracks 100 and 120 are movable horizontally along tracks 20 and 30 via carts 70 and 80.

Figure 3:
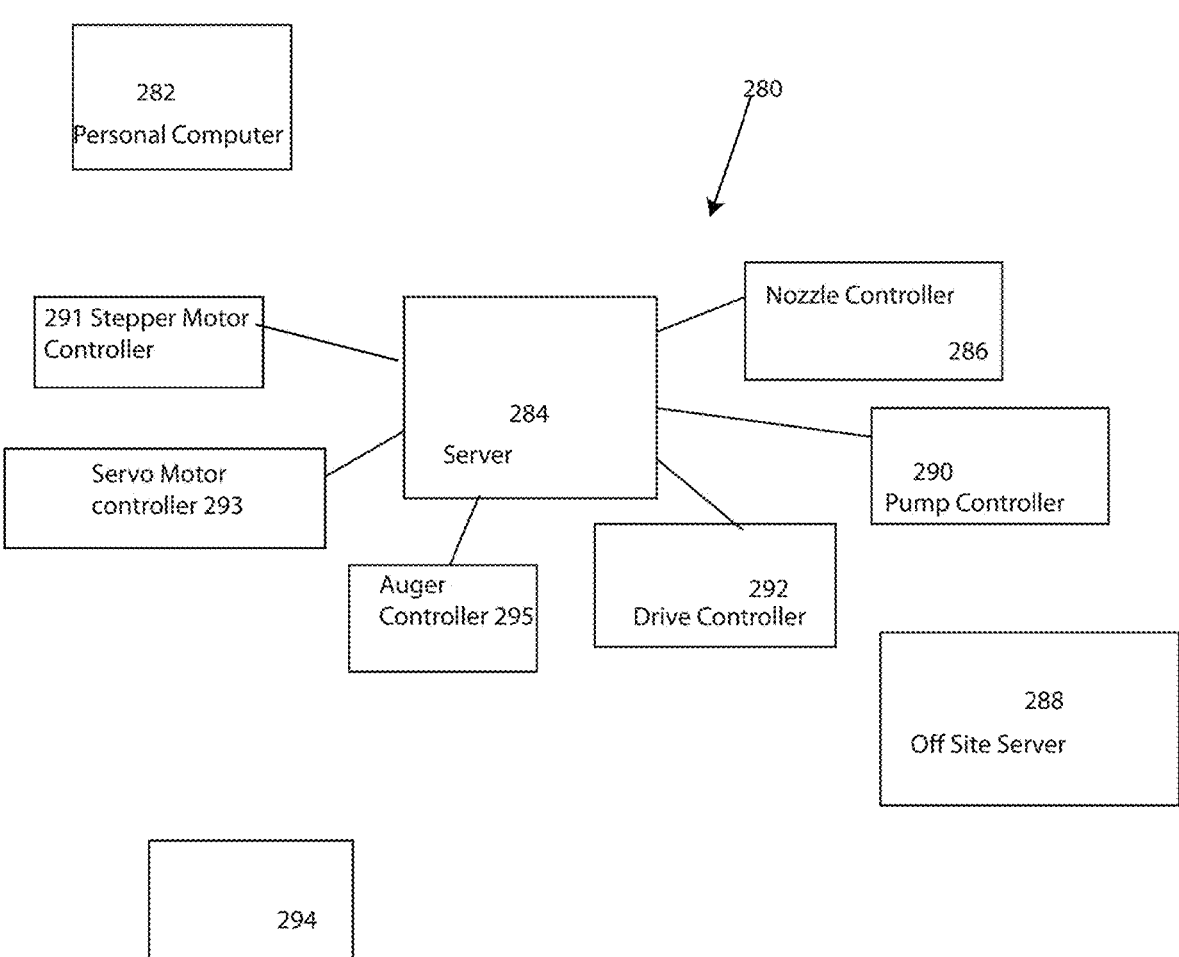
FIG. 3 is a schematic block diagram of the computer portion of the system for controlling the system.

FIG. 3 is a schematic block diagram of a computer system 280 which is configured to control the movement of the frame, as well as the movement and positioning of a nozzle in the system. For example, there is a server 284 which is in communication with remote devices. Remote devices can be in the form of a personal computer 282 such as a desktop computer (PC) a laptop or any other type computing device having at least one microprocessor, and/or a portable device such as portable device 294. Portable device 294 is in the form of a portable personal device such as a phone, or a tablet which may have location enabling devices such as GPS.

Each of these devices 282 and 294 can communicate with server 284 and controlling other remote devices through server 284. Server 284 is configured to communicate with at least one but even a plurality of remote devices. These different devices can include an off-site server 288, at least one nozzle controller 286, at least one drive controller 292 and at least one pump 290. The nozzle controller 286 controls the nozzle to selectively allow for dispensing of materials. The drive controller 292 is configured to selectively drive the carts or moveable devices such as carts 70 or 80 or 200. The pump controller 290 is a pump controller configured to command a pump to pump building materials through a line or hose, through a nozzle 33 onto the site to deposit the building materials on site. Each of the controllers comprises at least one microprocessor. In addition, coupled to server 284 either in a wired or wireless manner is a stepper motor controller 291 configured to control a stepper motor 311, a servo motor controller 293 configured to control a servo motor 321, an auger controller configured to control an auger through an auger tip 303 as well (see FIGS. 26-30).

Figure 4:
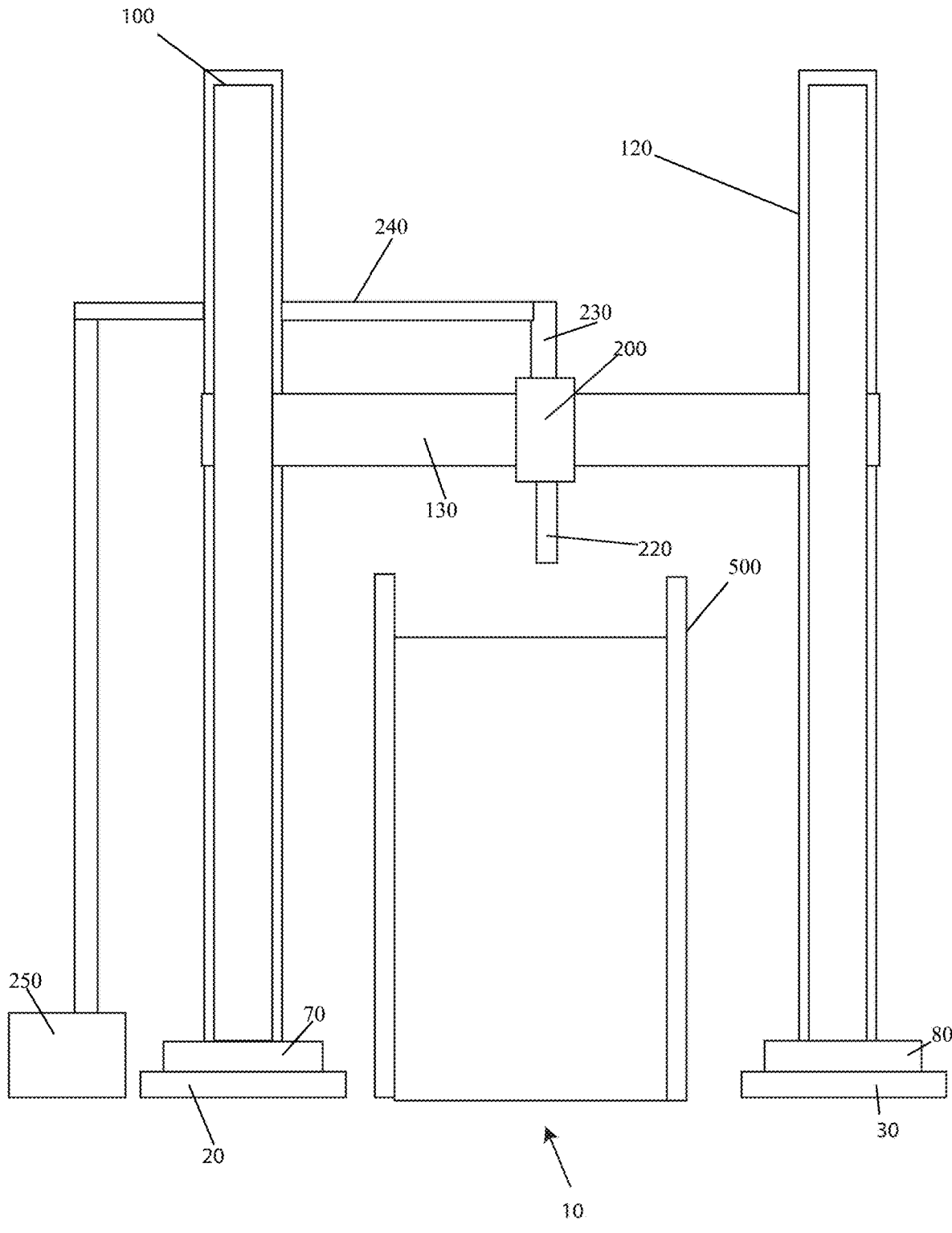
FIG. 4 is a side view of the frame, the nozzle and the feeding system.

FIG. 4 is a side view of the dispensing system which includes a pump 250 which is controlled by pump controller 290 (See FIG. 3). In this view there is frame 10 comprising horizontal tracks 20 and 30 and vertical tracks 100 and 120. Cross beam 130 extends between vertical tracks 100 and 120. A nozzle platform 200 is movable along cross-beam 130. Nozzle 220 is coupled to nozzle platform 200 at one end and coupled to nozzle feed section 230 at the opposite end of nozzle platform 200. In addition, a hose system 240 is coupled between pump 250 and nozzle platform/nozzle feed section 230. This system as shown is configured to produce a building such as building 500.

Figure 5:
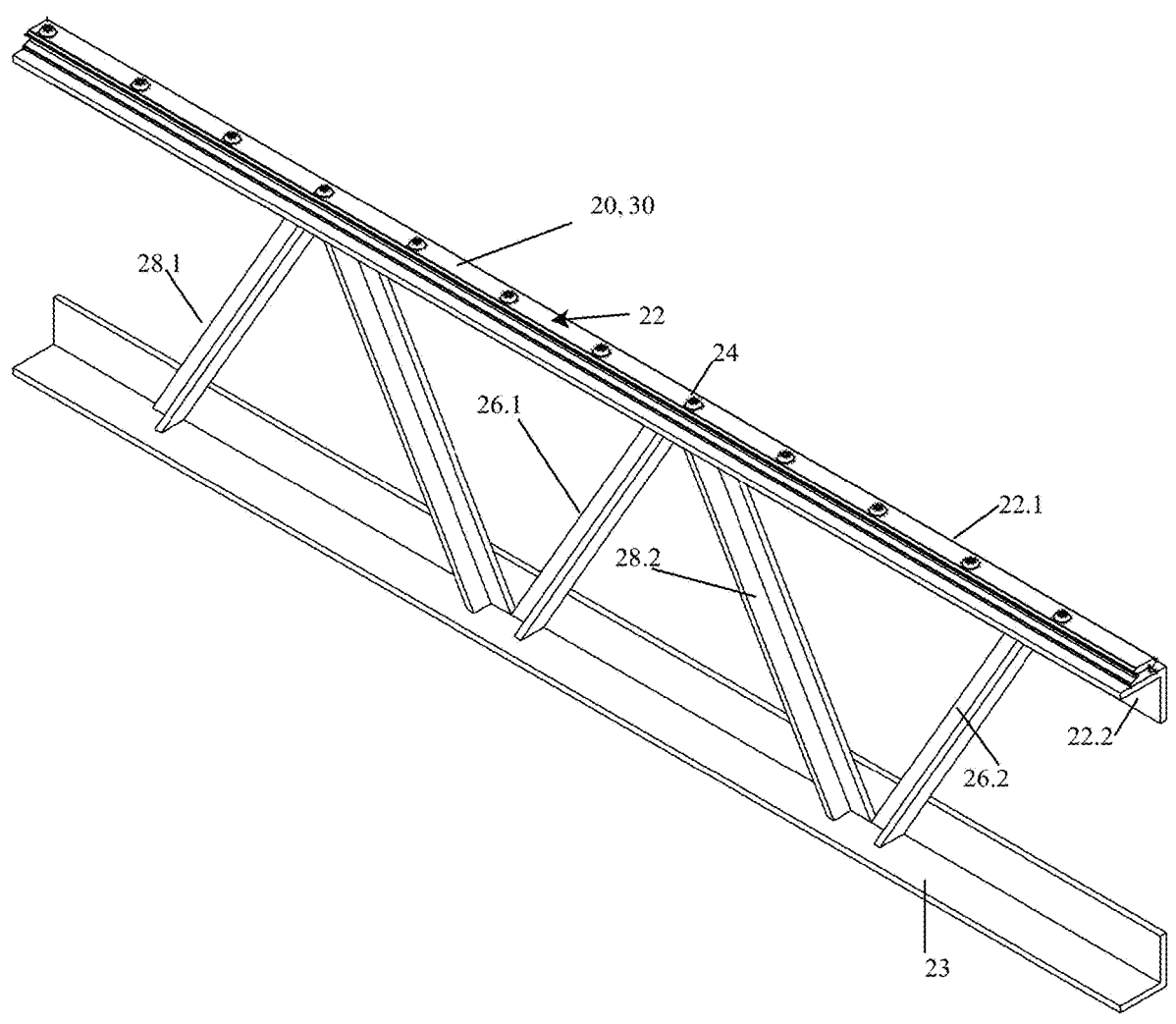
FIG. 5 is a top-side perspective view of a portion of the frame in the form of a bottom rail.

FIG. 5 is a track which can be any one of track 20 or 30, whereas in this case this is track 20. With this design, there is a track line section 22 which is substantially shaped like an I-beam and which is held to the remaining portion of a frame system. The frame system comprises a first L-shaped member 22.2 which is coupled to a track section 22.1. A plurality of struts 26.1, 26.2, 28.1 and 28.2 extend between L-shaped member 22.2 and L-shaped member 23. These struts are angled so that they extend in both a partially horizontal direction and a partially vertical direction to form a framing system.

Figures 6A, 6B, 6C:
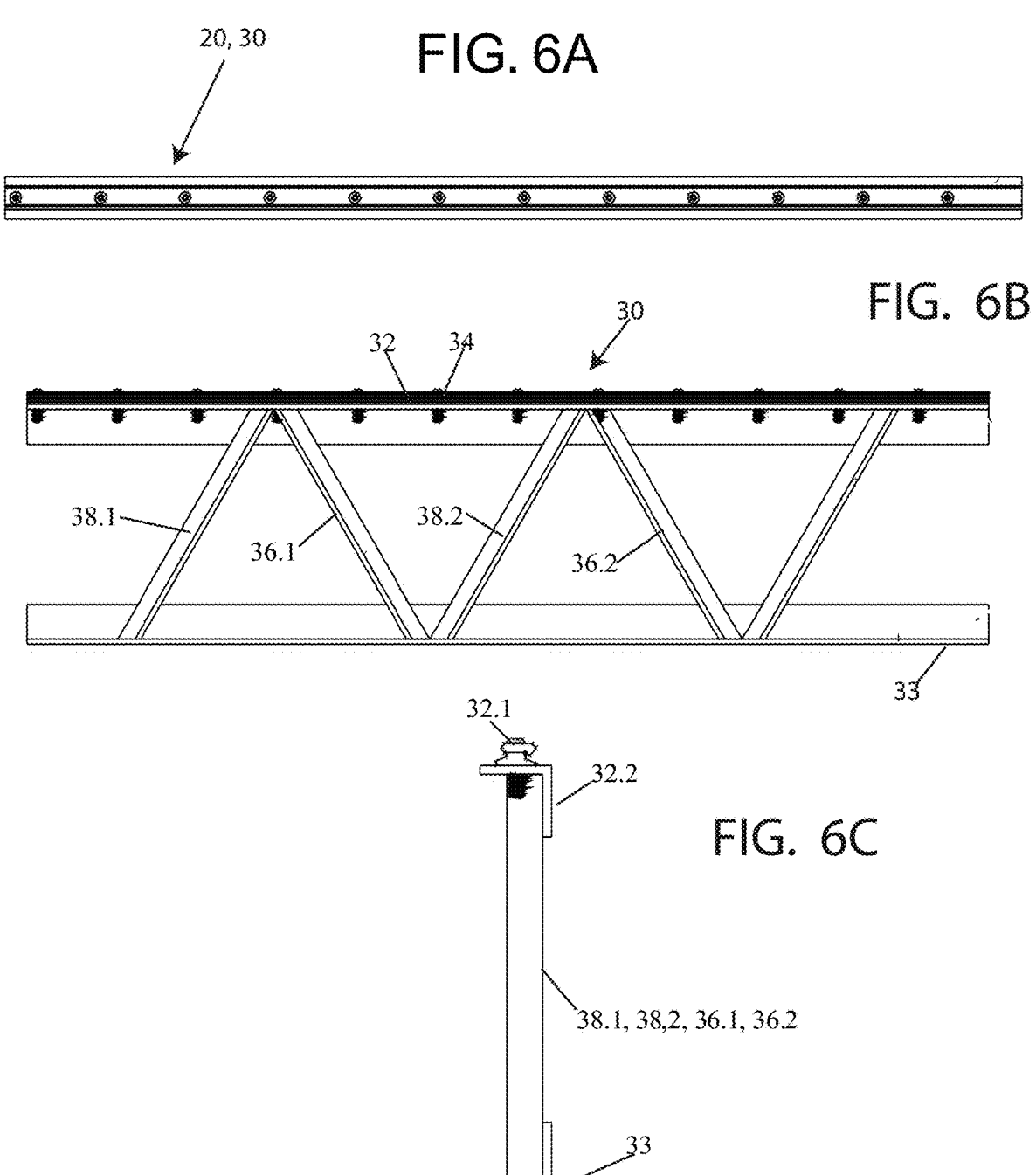
FIG. 6A is a top view of the rail.
FIG. 6B is a side view of the rail.
FIG. 6C is an end view of the rail.

FIG. 6A is a top view of a rail such as rail 20 or 30 which forms a portion of the frame. FIG. 6B shows rail 30 having a rail section 32 and rivet 34. Supports or struts 36.1, 38.1, 36.2, and 38.2 form a support for this rail. FIG. 6C shows a side view of the rail showing an I-beam shaped rail section 32.1 and an L-shaped support section 32.2. Supports 38.1, 38.2, 36.1, and 36.2 are shown positioned between L-shaped section 32.2 and L-shaped section 33.

Figures 7A, 7B, 7C, 7D, 7E:
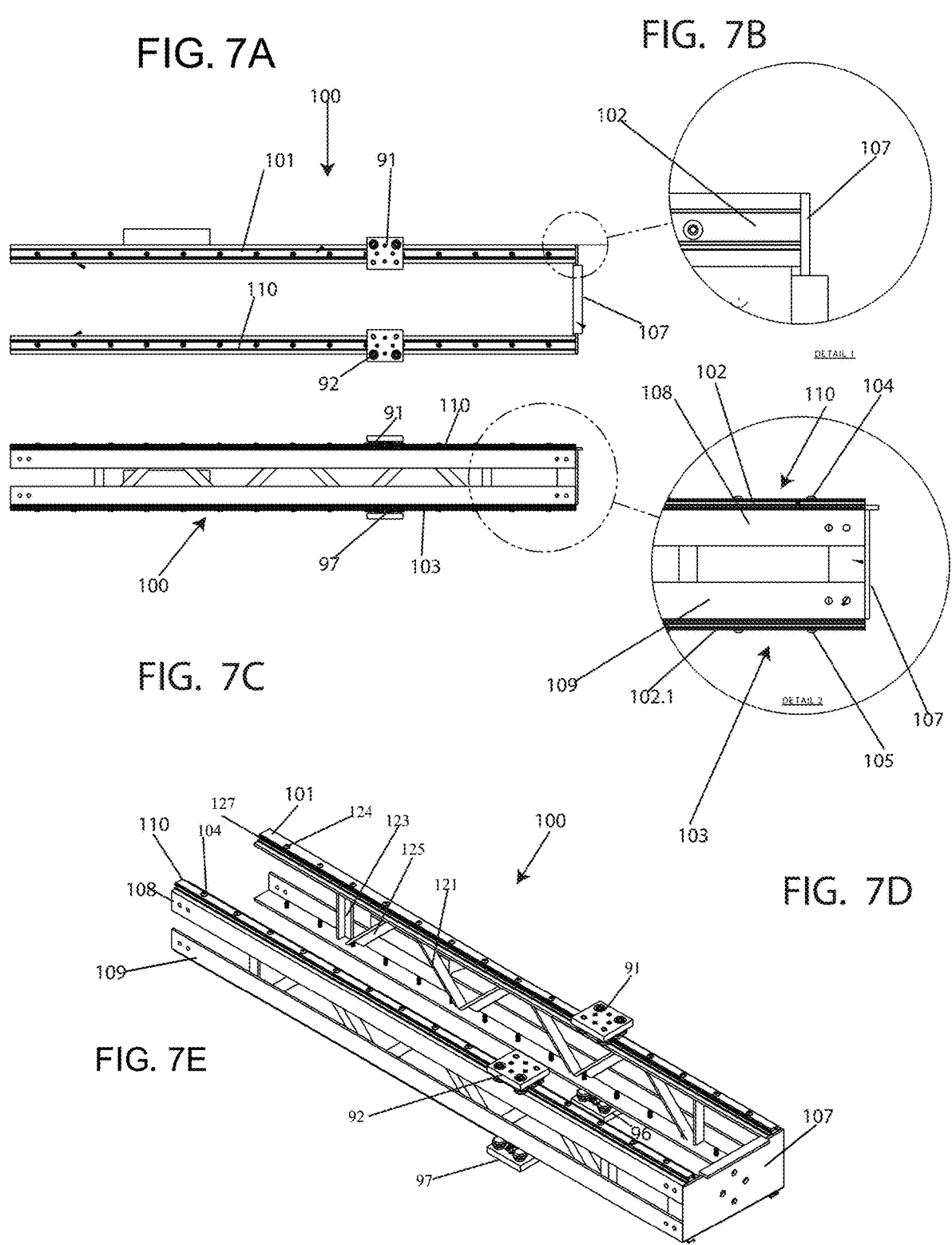
FIG. 7A is a top view of a horizontal rail system.
FIG. 7B is a close-up view of a section of the rail shown in FIG. 7A.
FIG. 7C is a side view of the rail shown in FIG. 7A.
FIG. 7D is a close-up view of an end of the rail shown in FIG. 7C.
FIG. 7E is a top-side perspective view of the rail shown in FIGS. 7A and 7C.

In at least one embodiment, the tracks 20, 30, and/or the tram or cross beam 130 is formed by rails 100. FIG. 7A shows rails 100 including rails 101 and 110 with carts or trolleys 91 and 92 coupled or riding on respective rails 101 and 110. FIG. 7B shows rail 101 having a rail section 102 coupled therein via a rivet 104 to an L-shaped support bracket 108. Support bracket 108 is coupled to an end bracket 107 via another support bracket 108. Coupled to L-shaped support bracket 109 is a rail section 103, with a rivet 105 securing this rail section down.

FIG. 7B shows a close-up view of rail section 102 having an end bracket 107. FIG. 7C shows these rails 100 rotated by a quarter turn or 90 degrees so that a side view is shown showing rails 110 and 103 having rail sections 102 and 102.1 which are bolted to L-shaped support brackets 108 and 109 respectively via rivets 104, 105 (See FIG. 7D). This view also shows end bracket 107 as well.

FIG. 7E shows a perspective view of the rails 100 showing rails 101 and 110 which include rail sections 102 and 102.1 which are bolted to respective L-shaped brackets 127 and 129 via rivets 124 and 128 respectively. L-shaped support brackets 127 and 129 are spaced apart from opposite L-shaped support brackets 108 and 109 via struts 123, 125 and 121. Struts 125 and 127 are angled. Tracks 122 and 126 are configured to support trolleys or carts 95 and 96. An oppositely spaced cart 97 is also shown.

Figure 8:
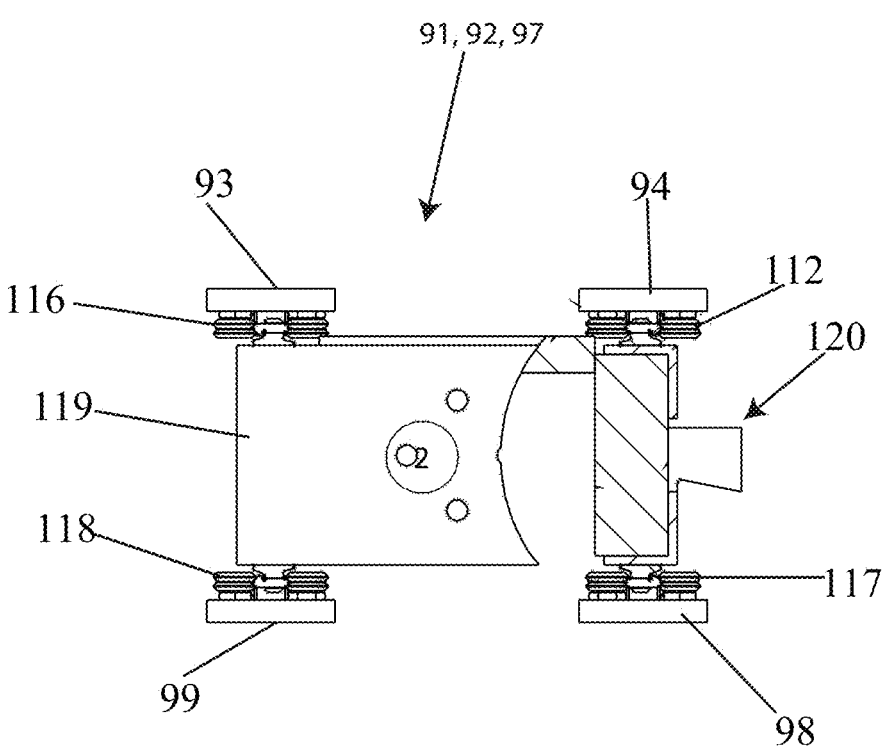
FIG. 8 is a view of a cart, trolley or tractor.

FIG. 8 shows a close-up view of a cart or trolley such as any one of carts or trolley 91, 92, or 97 shown in FIGS. 7A-7E. In this view the cart or trolley comprises a plurality of beveled wheels 112, 116, 117 and 118 configured to ride on rails such as rails 101 and 110. Outside of each of the wheels 112, 116, 117 and 118 are end caps 93, 394, 98 and 99. In addition there is a central plate or tray 119 which has an end piece or bumper 120. These carts 91, 92, 97 can be coupled together to form a single unified cart for a nozzle such as cart 200.

FIG. 9A shows another vertical column or tower 140 having a bottom section 141 which can be used to couple to a cart or trolley 70 or 80. FIG. 9B is a side view of a vertical column 140 as well wherein there are cross beams 142 coupling vertical or substantially vertical beams 148 together. A rail 146 can be coupled to vertical beam 148 via a bolt or rivet 145 as shown in FIG. 9C. In addition, this view also shows cross beams or struts 143 and 144 coupled between vertical beams 148. FIG. 9D shows a top view of this column 140 with a cap 147.

Figures 10A, 10B:
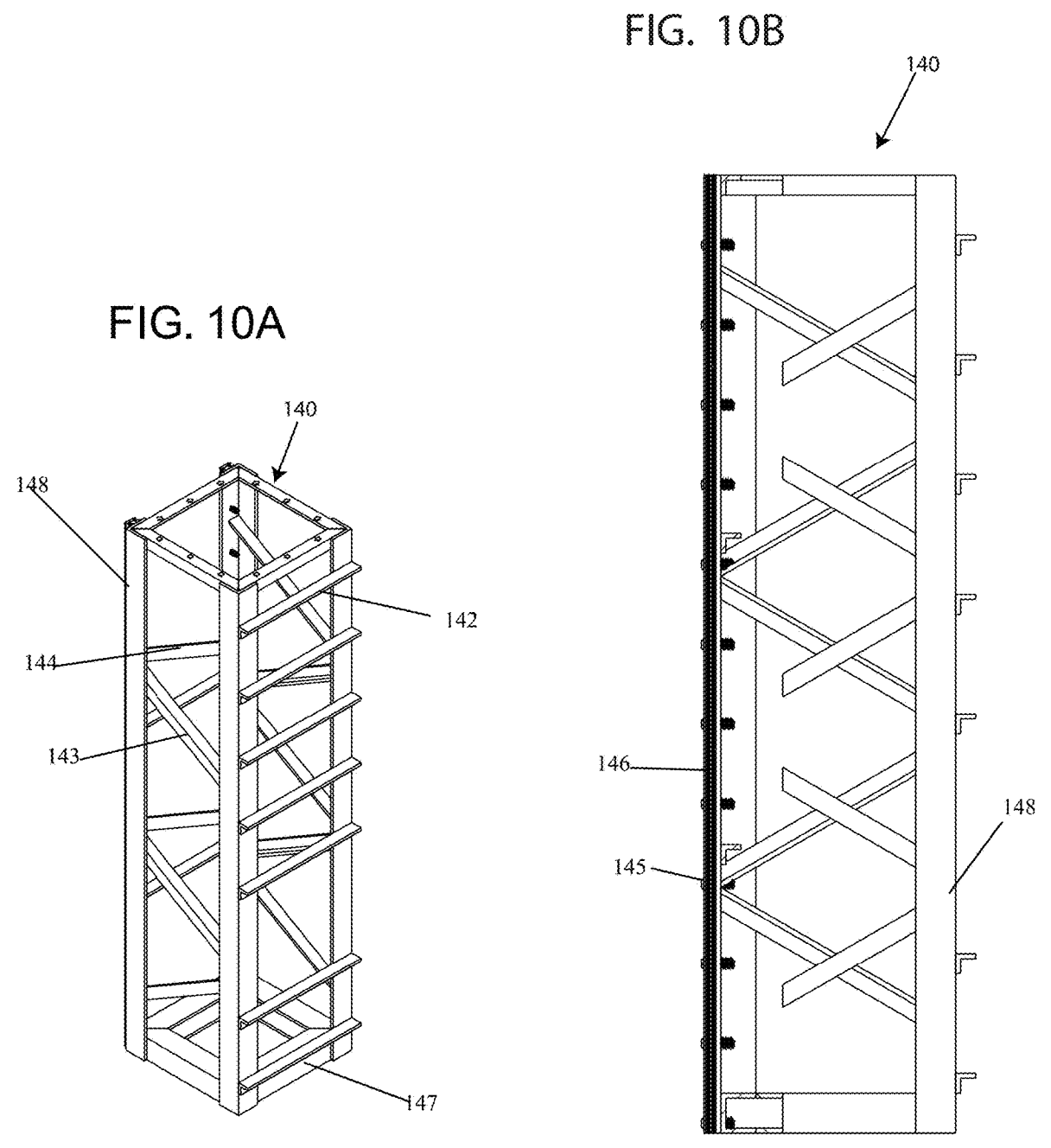

FIGS. 10A and 10B show a perspective and side view of vertical column 140. These views also show cross beams 142, 143, and 144 as well as vertical beams 148. It also shows rail 146 coupled to vertical beam 148 via bolt or rivet 145.

Figure 11:
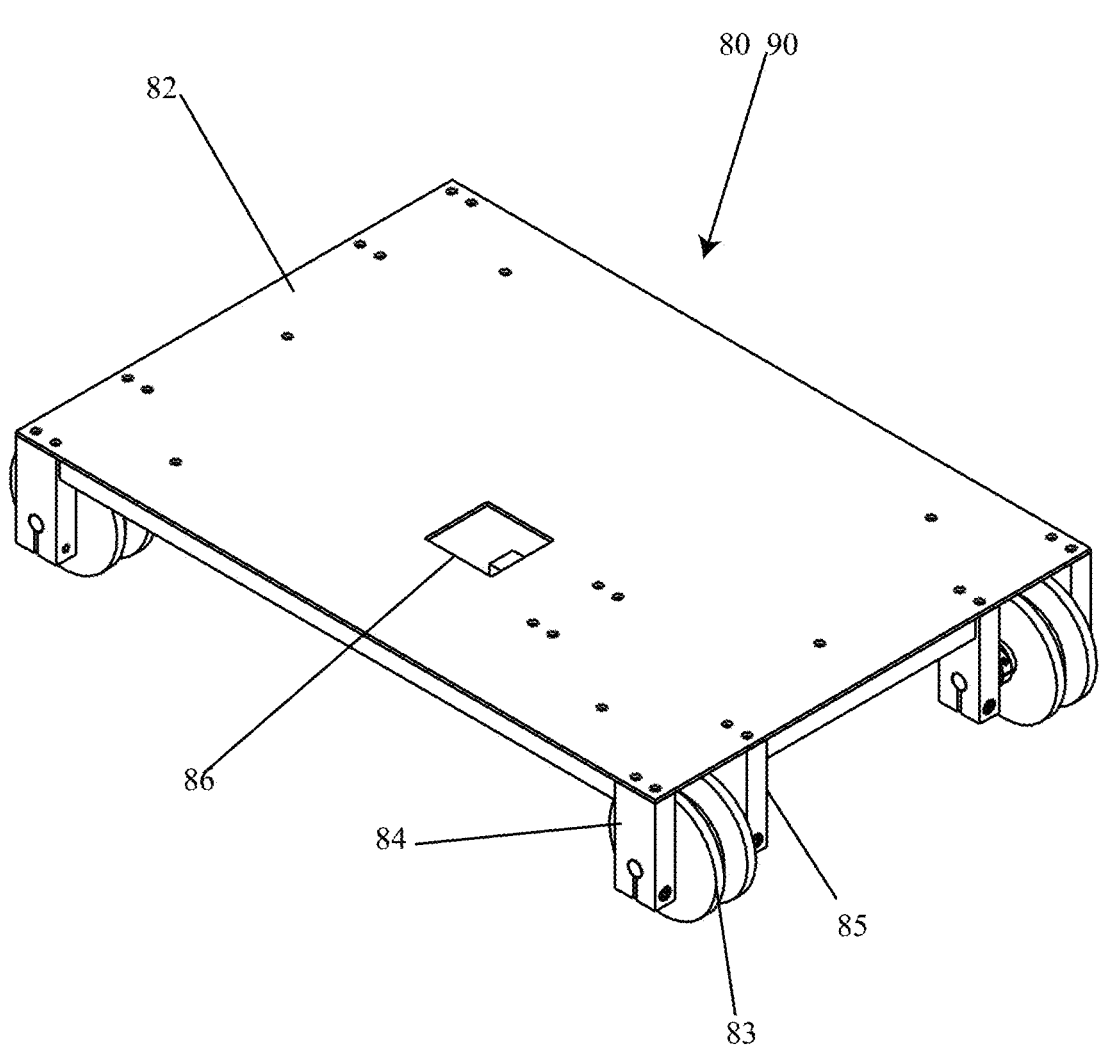
FIG. 11 is a top-side perspective view of the cart.
Figure 12:
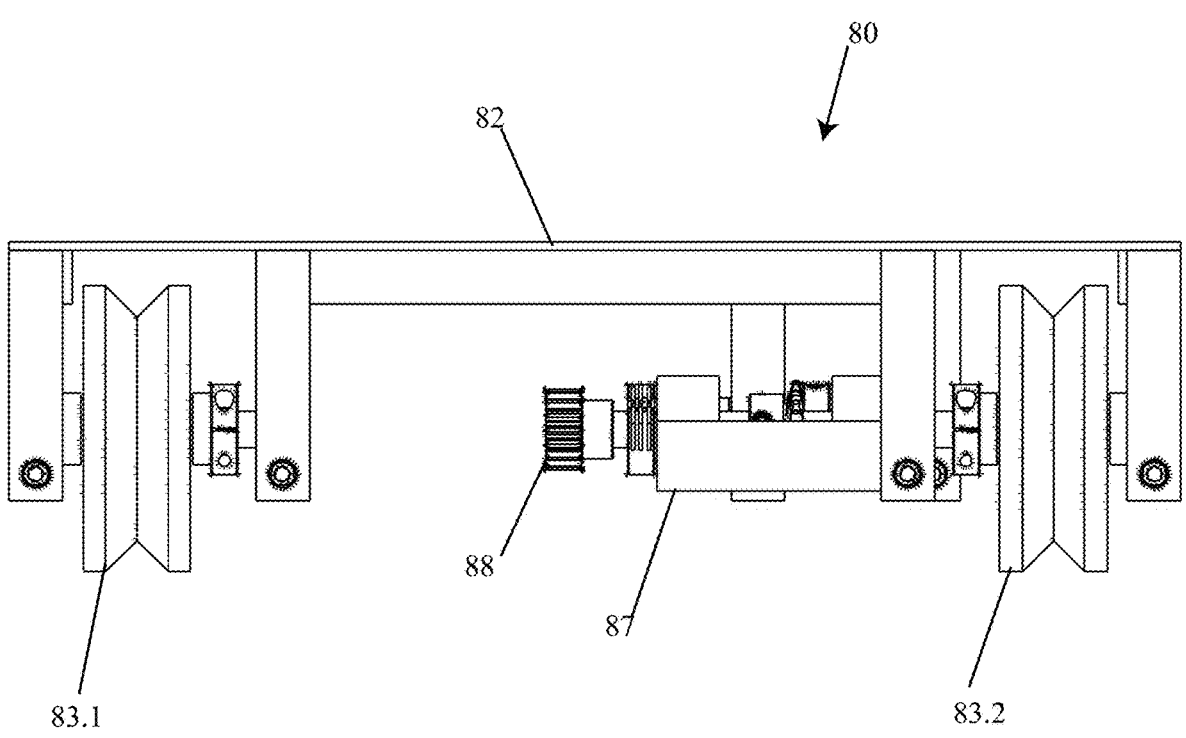
FIG. 12 is an end view of the cart.
Figure 13:
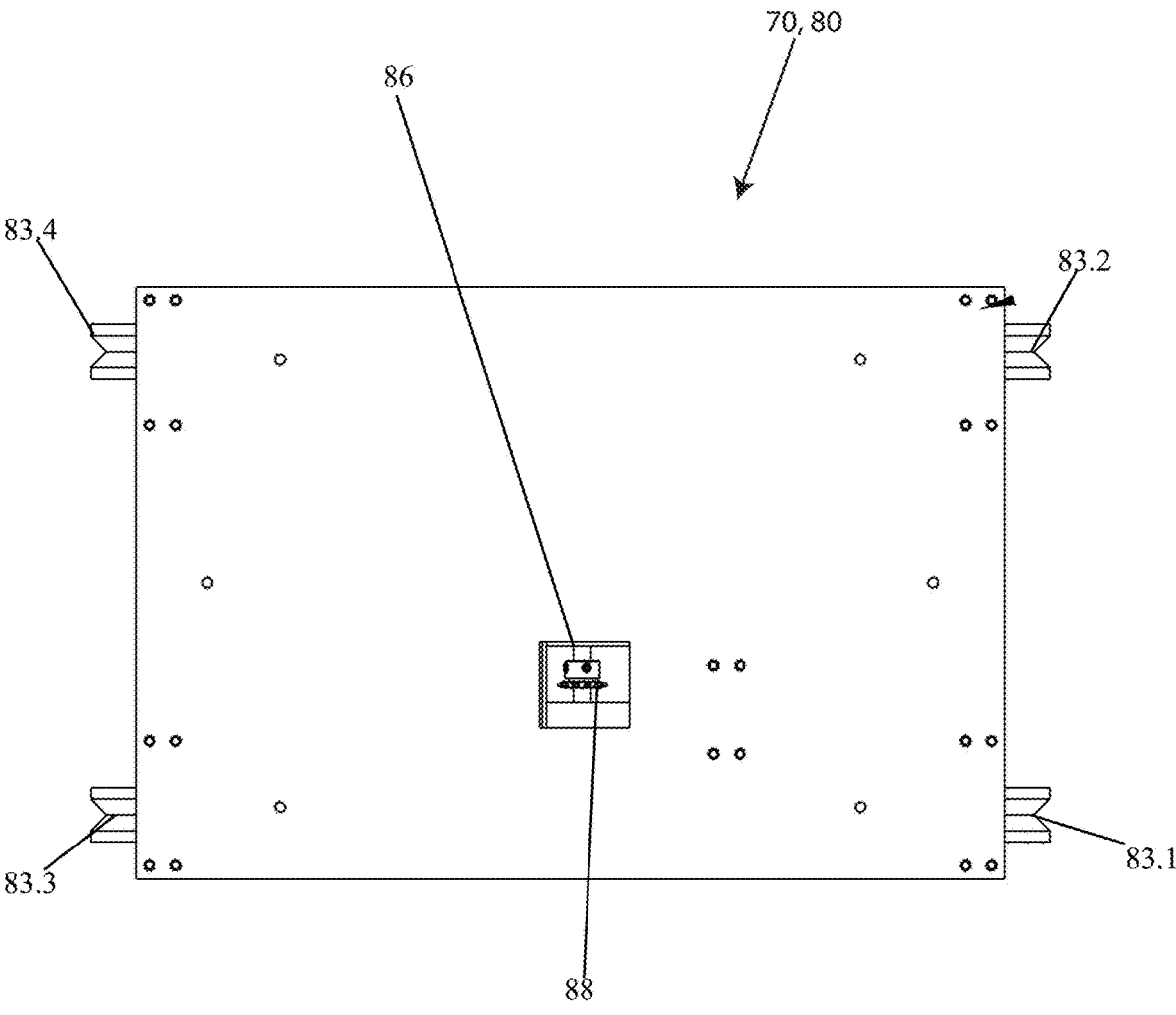
FIG. 13 is a top view of the cart.

FIG. 11 shows a cart or trolley 80 or 90 which has a base platform 82, as well as wheels 83 and supports 84 and 85. There is an opening 86 in the platform 82. FIG. 12 is a side view of the trolley 80 which shows wheels 83.1 and 83.2 as well as a drive system comprising at least one coupling block 87 and at least one gear 88. The gear is configured to be coupled to a chain and then driven by a drive. The gear 88 is in the form of a standard bevel gear. FIG. 13 is a top view of the trolley or cart with wheels 83.1, 83.2, 83.3, and 83.4. Hole 86 is positioned so that gear 88 is shown. This cart or trolley 80 or 90 can be used to transport towers such as towers 140 when riding on rails 20 or 30.

Figure 14:
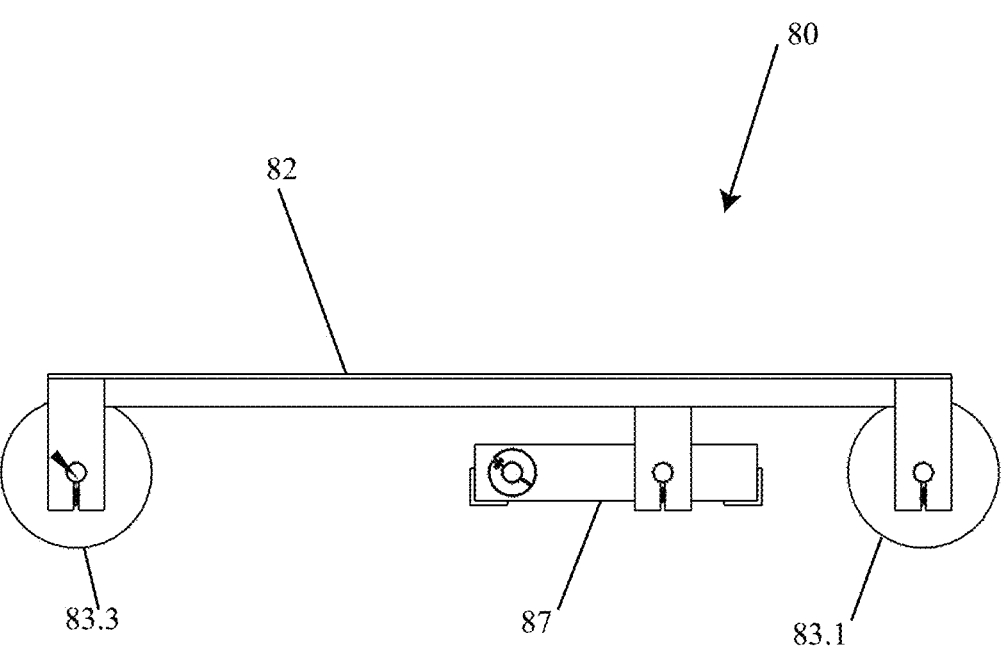
FIG. 14 is a side view of the cart.
Figures 15A, 15B:
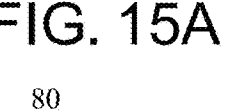
FIG. 15A is an end view of the cart.
FIG. 15B is a close-up view of a portion of the cart.
Figure 16:
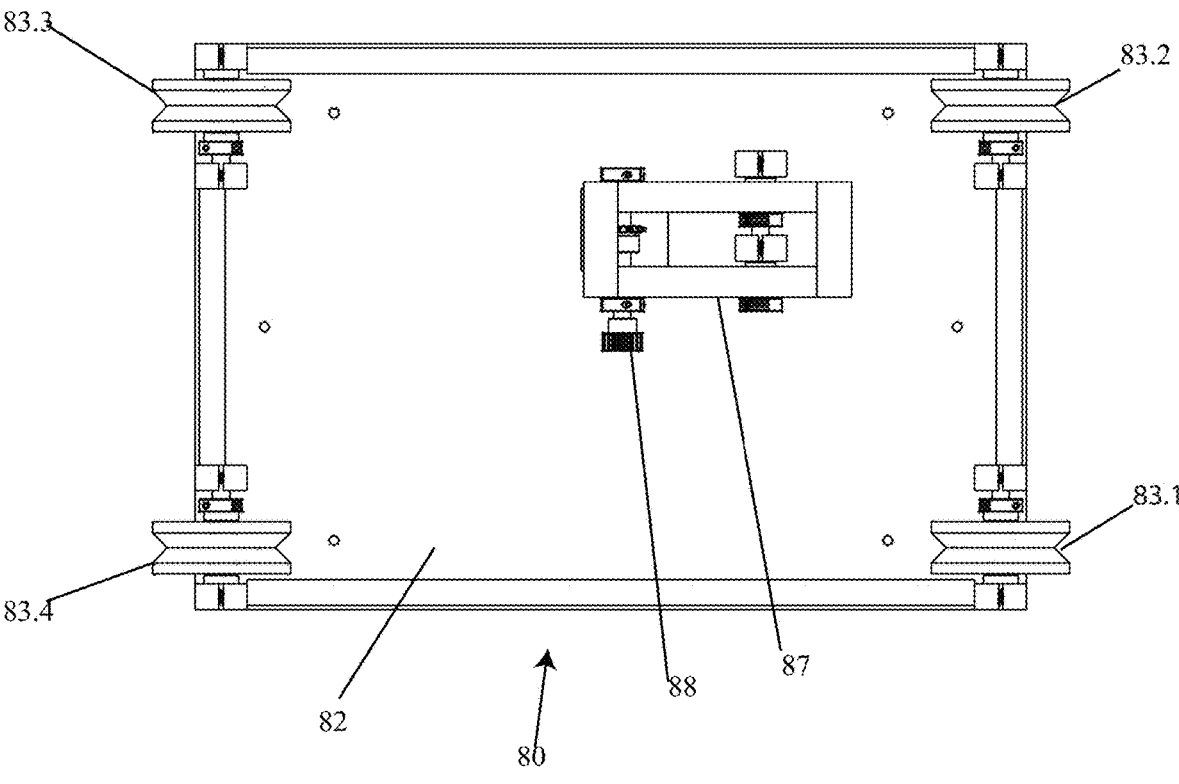
FIG. 16 is a bottom view of the cart.

FIG. 14 is another side view of the trolley or cart 80. With this view there is shown wheels 83.3 and 83.1. A top plate 82 is shown along with coupling block 87. FIG. 15A shows a side view of the cart 80 with wheel 83.3 which is shown in FIG. 15B as a close up view wherein wheel 83.3 is supported by supports 84 and 85. Supports 84, 85 are coupled to plate 82. FIG. 16 is a bottom view which shows wheels 83.3, 83.4, 83.2 and 83.2 as well as gear 88 and coupling block 87 coupled to plate 82.

FIGS. 17A, 17B and 17C show the idler assembly 170 which can be coupled to a trolley via a chain and then used to allow movement of the trolley. Idler assembly 170 is used to coordinate a driven chain (not shown which is then used to pull a trolley or cart such as trolley or cart 80 or 90). With the idler assembly there is a base platform 171, and a plurality of supports 173 and 174 coupled to the base platform 171. There is also a shaft 175 which is journaled within supports 173 and 174. A gear 176 is coupled to shaft 175 such that when shaft 175 is driven or turns, it rotates gear 176 to drive a chain (not shown) which then drives the cart 80 or 90. The chain is coupled at one end to gear 176 and at the other end to for example gear 88 shown in FIG. 17.

FIGS. 18A, 18B and 18C also show this gear 176 from a side view and also show supports such as support 173, 174 coupled to support 172 via a bolt 179.

FIGS. 19A-19F also shows a view of a drive box 190 which house the drive 170. Drive box 19 includes a base 191, a side wall 192, and columns 193, and 194. Columns 193 and 194 have drill holes in them. In addition, there is at least one bolt 199 used to couple columns 193 and 194 to base 191.

Figure 20:
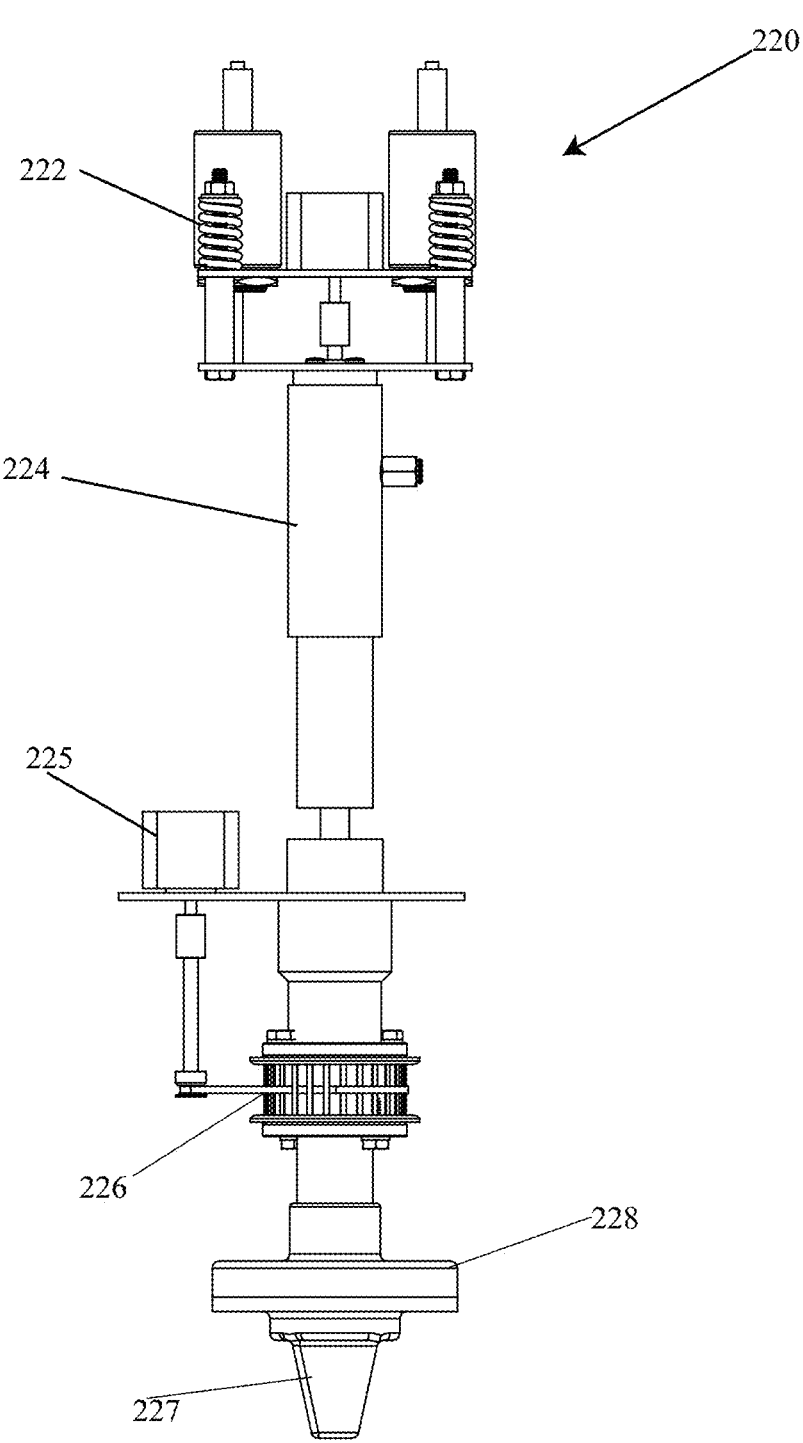
FIG. 20 is a side view of the nozzle feeding system.
Figure 21:
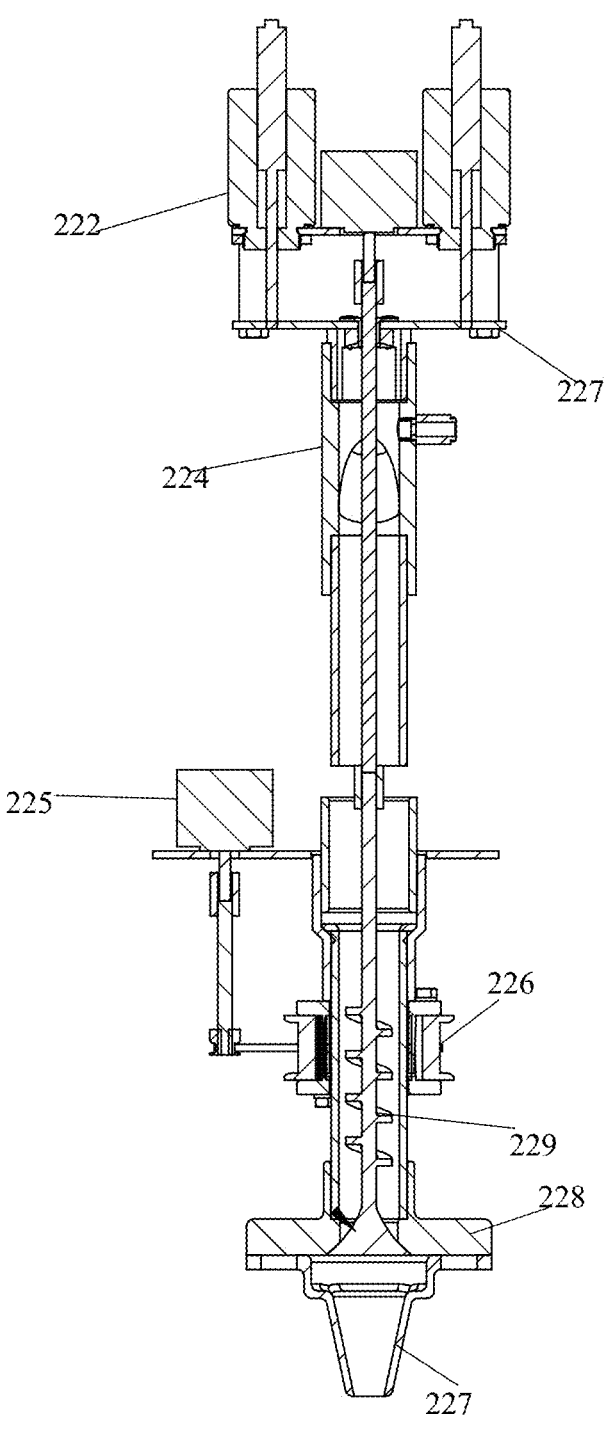
FIG. 21 is a side cross sectional view of the nozzle feeding system.

FIG. 20 is a side view of the nozzle 220. Nozzle 220 includes shocks 222 as well as a first chamber 224 for receiving fed building materials such as concrete. There is a drive motor 225 coupled to chamber 224 wherein drive motor 225 drives auger 229 via transmission 226. As shown in FIG. 21, auger 229 is configured to drive via a push or pulling effect, the building material through the nozzle. This occurs by auger rotating with the screw portion of the auger 229 causing a flow of material through the shaft. A head 227 of the nozzle is configured to release building materials onto a site. Head 227 is positioned adjacent with auger 229. A valve section 228 is configured to control the outflow of material outside of the nozzle.

Figure 22:
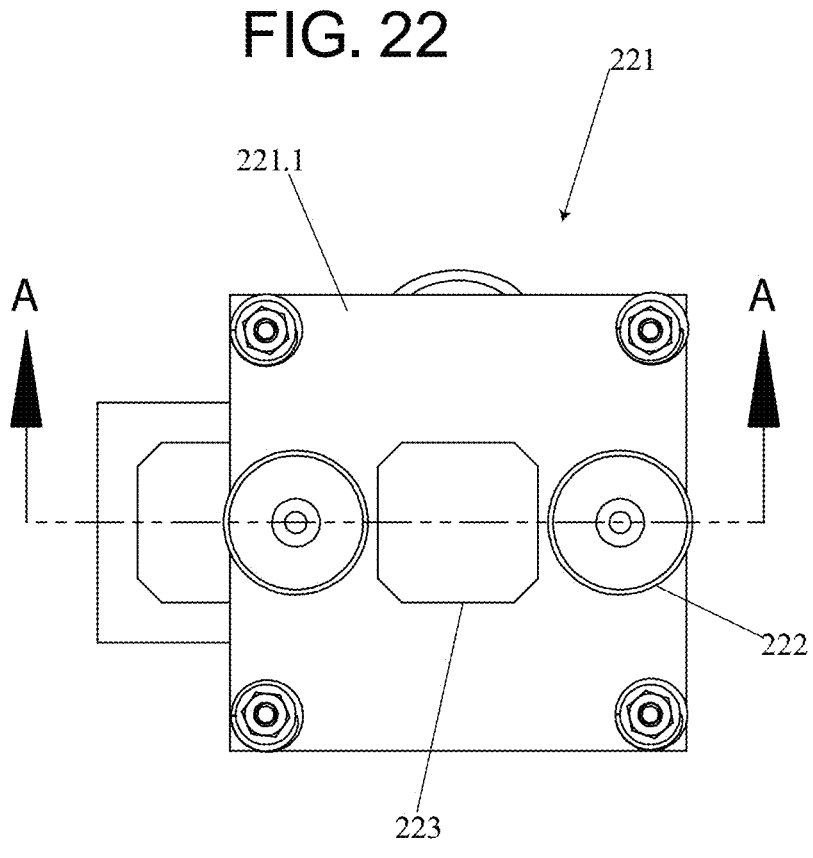
FIG. 22 is a top view of the nozzle platform.

FIG. 22 is a view of the nozzle plate or platform 221 which has a plate section 221.1 which is configured to receive shocks 222. A hole 223 is positioned in plate section 221.1

Figure 23:
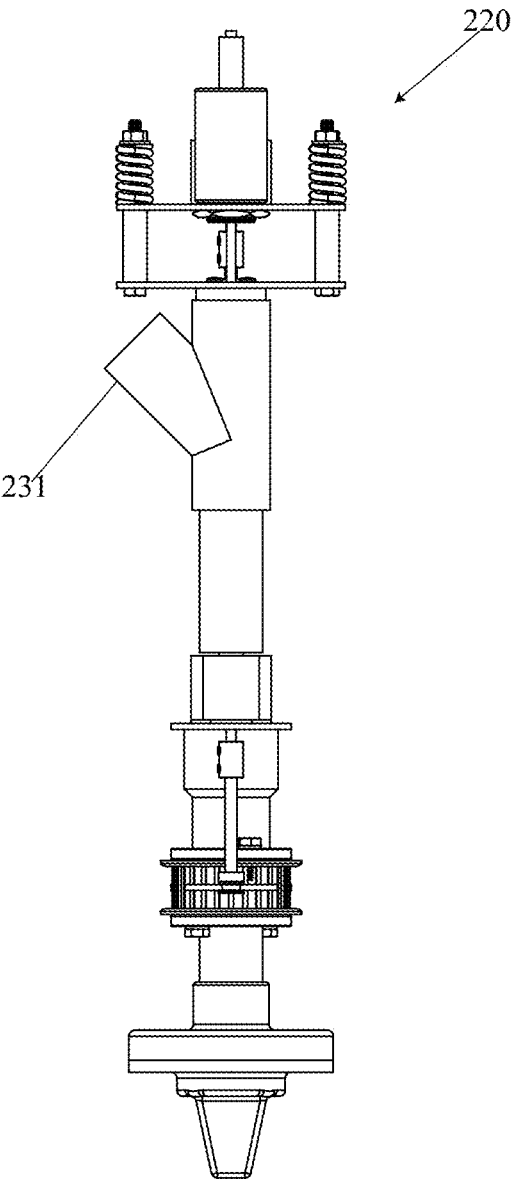
FIG. 23 is another side view of the nozzle system.
Figure 24:
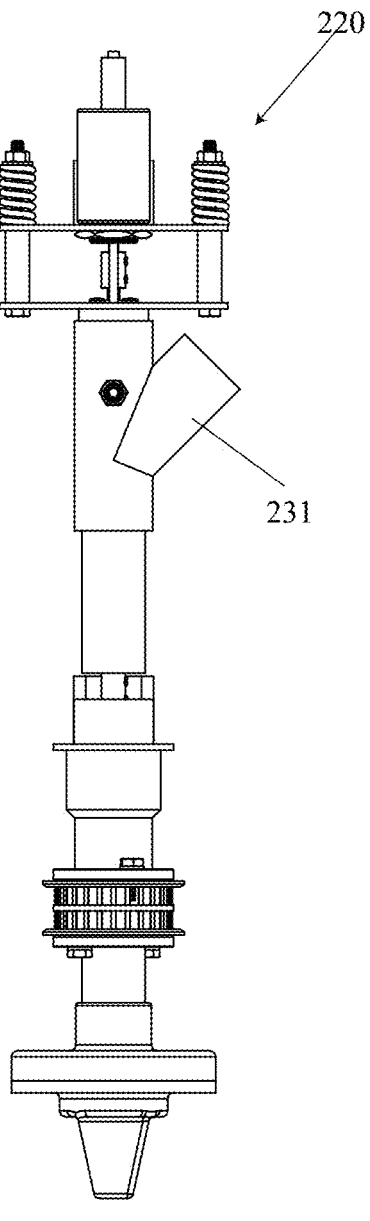
FIG. 24 is an opposite side view of the nozzle system.

FIG. 23 is a side view of nozzle 220 with feed chamber 231 shown coupled to chamber 224. Feed chamber 231 is configured to receive a feed of material from a hose or other building material source. FIG. 24 shows an opposite side view of this nozzle.

Figures 25A, 25B, 25C, 25D:
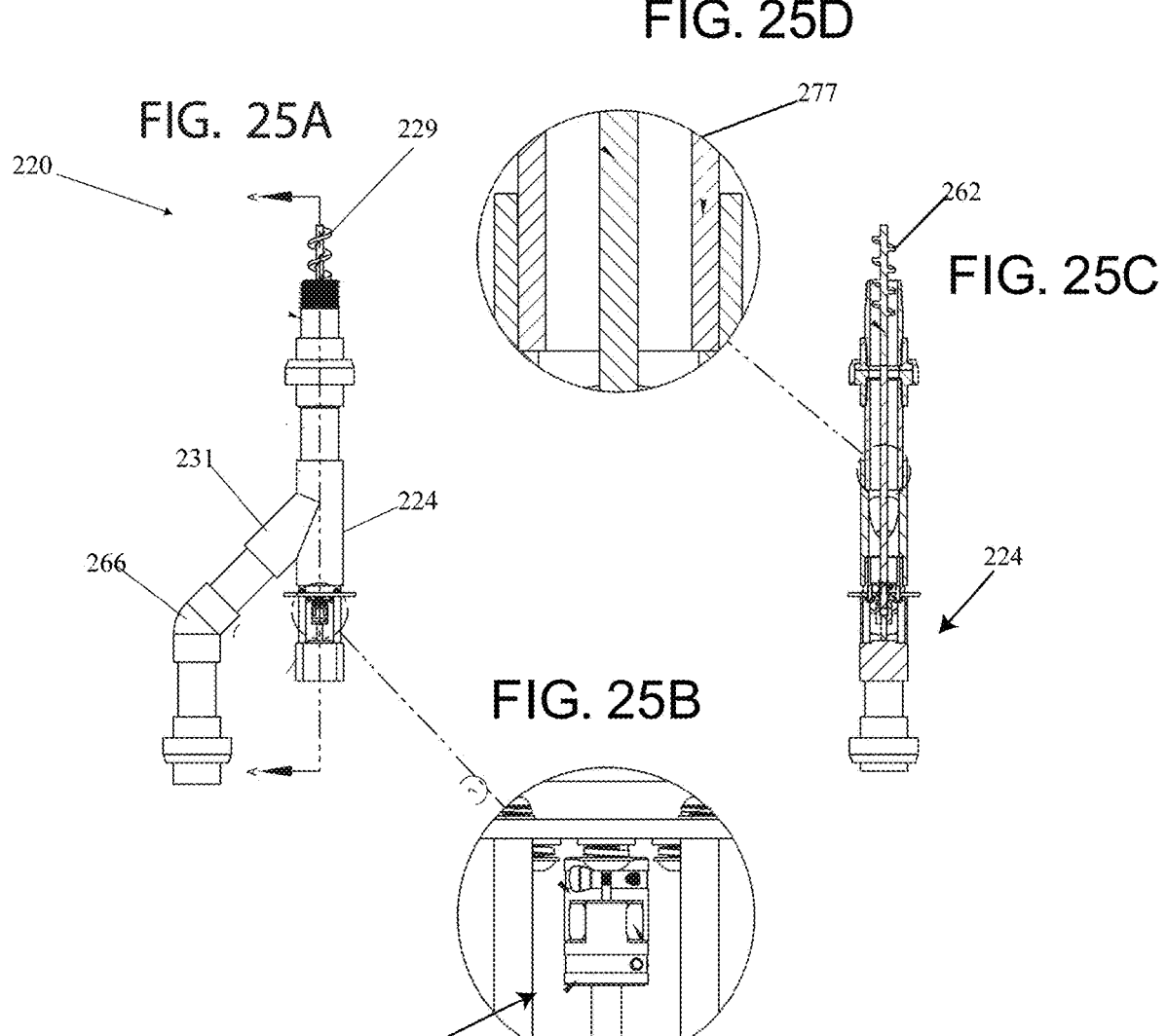
FIG. 25A is a side view of an auger for the nozzle system.
FIG. 25B is a close-up view of a portion of FIG. 25A.
FIG. 25C is a side cross-sectional view of the auger system.
FIG. 25D is a close-up view of a portion of the auger system.

FIGS. 25A-D show the nozzle 220 with the end cap or head 227 removed. This view in FIG. 25A shows auger 229 extending out from chamber 224. A feed line 266 is shown coupled to feed chamber 231. FIG. 25B shows an additional drive chamber 260 while FIGS. 25C and 25D show a feed chamber 277 which is configured to feed building materials there-through.

In all the device is configured to be a computer-controlled device which results in a movable nozzle such as nozzle 220 which is coupled to trolley 200 and controllable by a centralized computer control so that the nozzle can move in at least an X, Y and Z direction.

FIGS. 26-30 are various views of a different embodiment of a nozzle system which can be used with the embodiment of FIGS. 1-25 or with the embodiments of FIGS. 31-49 and with the process of FIGS. 50-55. With this system there is a perspective view of an attachment nozzle system which can be attached to a material feed system and then used with the components provided above. In this embodiment there is a system 300 which can be attached to a nozzle platform 200 as indicated above in FIG. 2. This system includes a back plate 302, a tip assembly 303 along with a tip assembly platform 304. There is a feed opening 306 which feeds into a feed pipe 308. The feed opening 306 is configured to take in the building materials that would be laid down to create the building structure.

Figure 27:
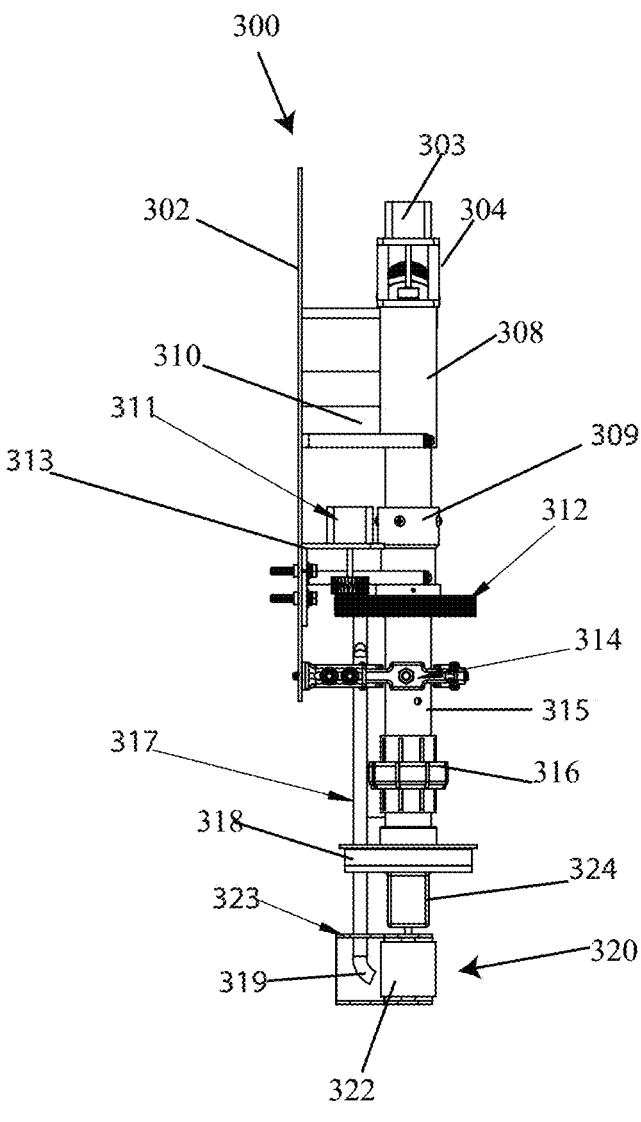
FIG. 27 is a side view of the embodiment of FIG. 26.
Figure 28:
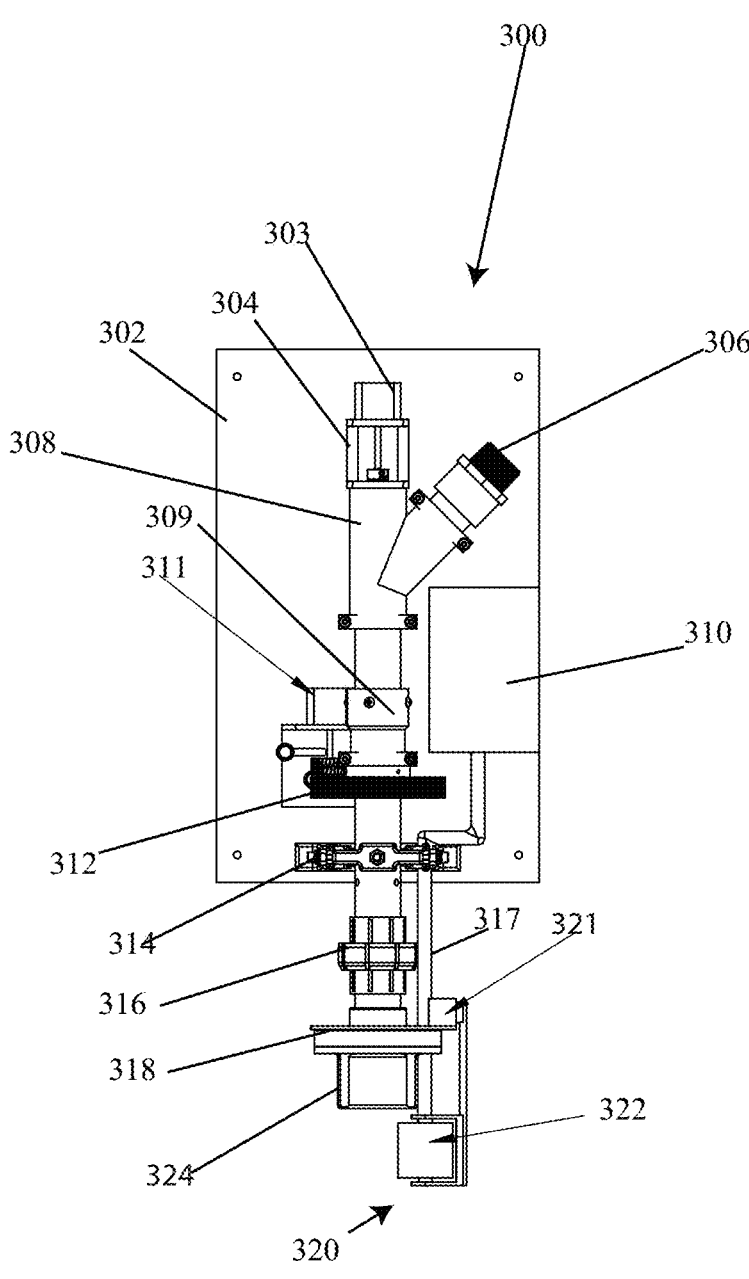
FIG. 28 is a front view of the system shown in FIG. 26.

The feed pipe 308 can be a rotating feed pipe that fits inside of a rotating sleeve bearing 309 See FIG. 27. The rotating sleeve bearing can have bearings (See FIG. 27) which allow sleeve 308 to rotate therein. Disposed adjacent to the sleeve bearing 309 is a slurry tank 310 which is used to feed additional slurry adjacent to the feed pipe 308 which feeds material to a nozzle at a tip. Disposed adjacent to the bearing 309 is a gear drive 312 which is driven by a stepper motor 311 (See FIG. 27). Stepper motor is remotely controlled by a computer or server such as server 284 communicating with a drive controller 291 which is embedded with the stepper motor 311. Stepper motor 311 is coupled to gear drive 312 via intermediate gear 307. Intermediate gear 307 is driven by the stepper motor and interfaces with the gear drive 312 to then rotate an outer shell or tube (See FIG. 30). The stepper motor 311 and the intermediate gear 307 are held in place via a tangential motor mount 313. The outer rotatable tube or shell 325 is rotatable inside of a final stage bearing assembly 314. This final stage bearing assembly 314 has in particular bearings 314.1 which serve to guide the outer rotating sleeve 325 (See FIG. 30). There is a replaceable tip coupling 316 which is configured to allow a tip to be added or replaced depending on wear or use. Adjacent to the replaceable tip coupling 316 is a slurry feed tube 317. Slurry feed tube 317 is configured to feed slurry from a slurry tank 310 to a slurry tip or head 319. A lower bracket 318 is coupled to the replaceable tip 324 and serves as a shelf for allowing a servo motor 321 to reside thereon. A roller former 320 is coupled below the lower bracket 318 and is positioned below the replaceable tip 324. Roller former 320 comprises at least one roller 322 as well as a servo-motor to drive the roller as well as a slurry nozzle tip 323 as well. Replaceable tip 324 delivers the majority of the slurry while the slurry head 319 delivers any remaining amount of additional adjustment slurry from slurry feed tank 310.

Figure 26:
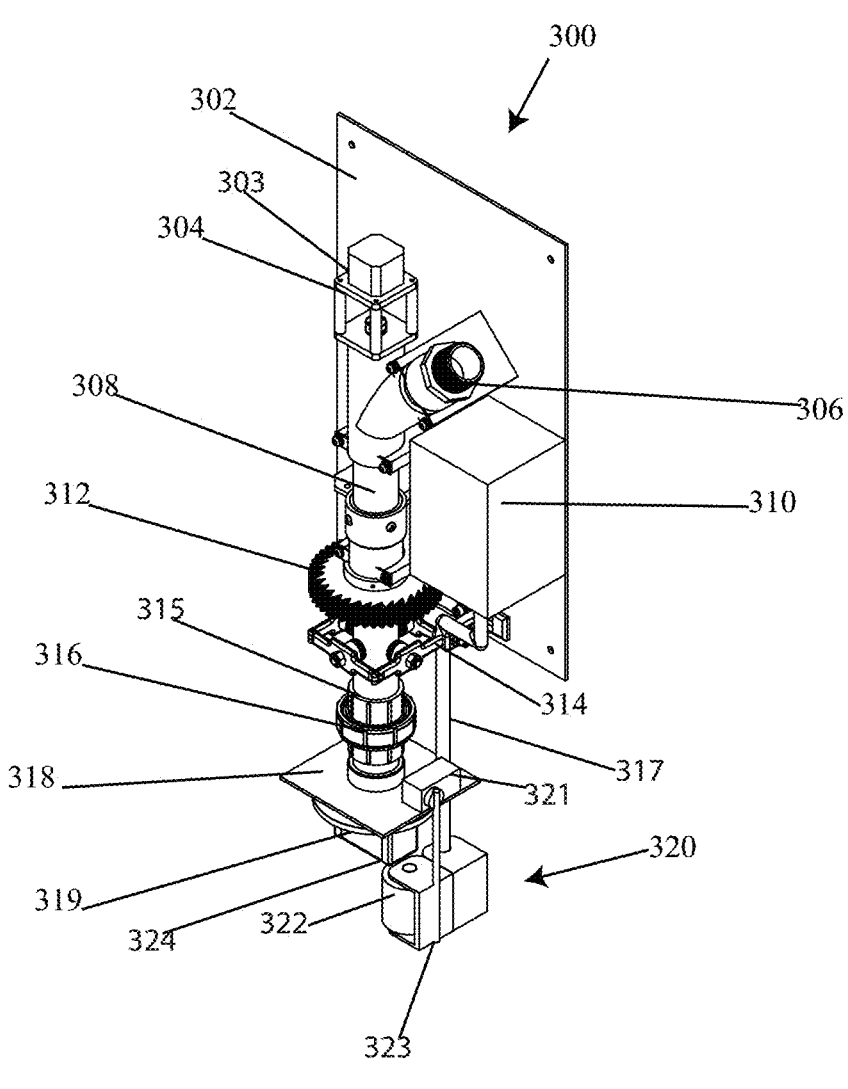
FIG. 26 is a perspective view of an attachment nozzle system which can be attached to a material feed system and then used with the components provided above.
Figure 29:
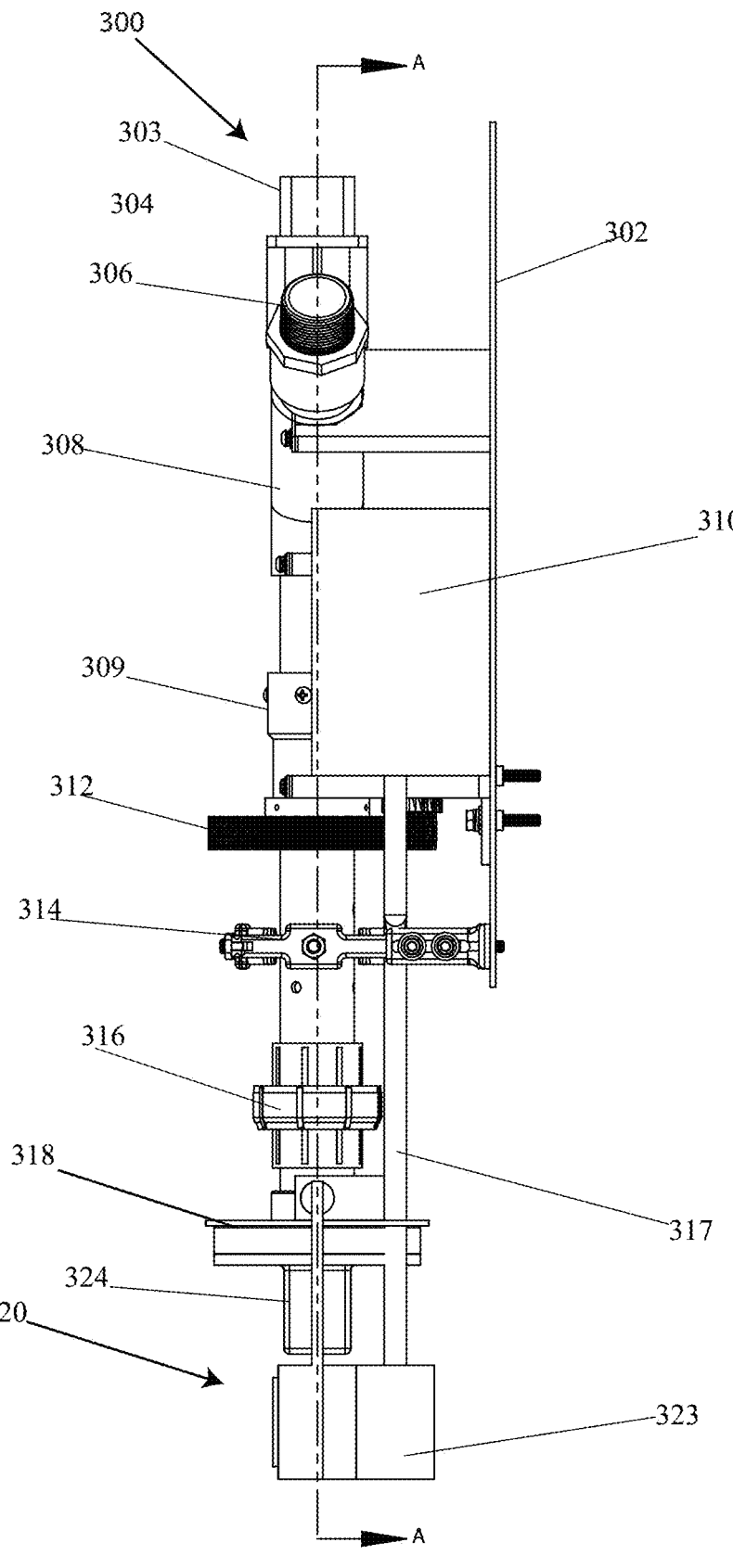
FIG. 29 is a side view of the system shown in FIG. 26.
Figure 30:
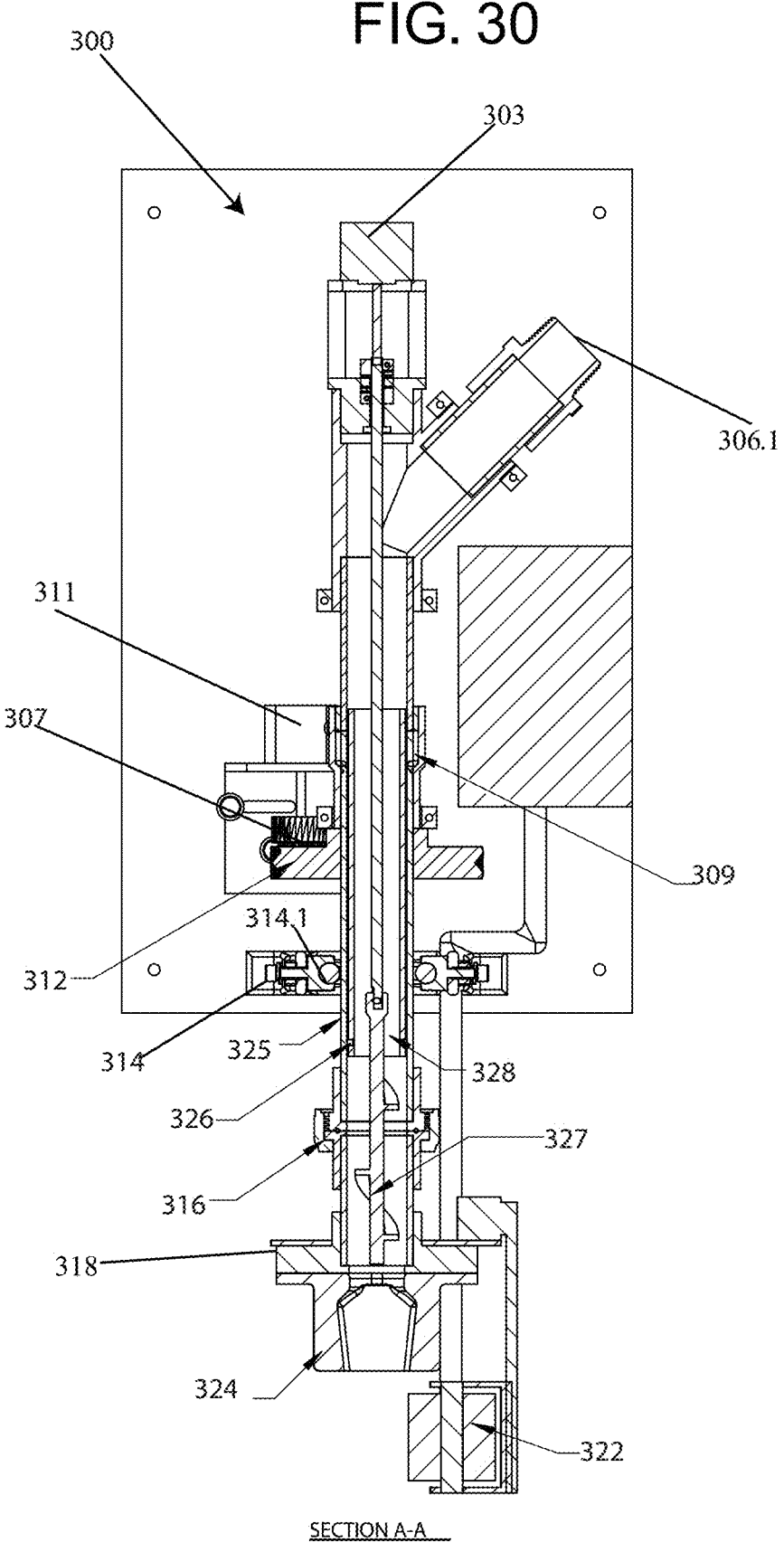
FIG. 30 is a cross-sectional view of the system shown in FIG. 26 taken through the line A-A in FIG. 29.

FIG. 30 is a cross-sectional view of the system shown in FIG. 26 taken through the line A-A in FIG. 29. With this view, there is a tip assembly 303 which is used to drive an auger 327 in side of the feed pipe 308. In addition, as shown a feed opening 306 includes its own preliminary feed pipe 306.1. This feed pipe 306.1 feeds into feed pipe 308 to allow the slurry to flow down and then be selectively controlled by auger 327. Auger 327 is a flow control auger having paddles 328 which are configured to control the flow of slurry down the feed pipe.

As shown in this side view there is an outer rotating sleeve 325, and a cement control seal 326. The outer rotating sleeve 325 rotates within a rotating sleeve bearing 309 which allows for the rotation of the rotating sleeve 325. The auger extends all the way down to the lower bracket 318 as well. This auger 327 thereby controls the distribution of additional materials to the tip 324. Once these additional materials are distributed, they can be further shaped by roller head 320 via rollers 322.

The rotation of outer rotating sleeve 325 is controlled by stepper motor 311 which drives a shaft that connects to intermediate gear 307 which then drives gear drive 312 to rotate outer rotating sleeve 325. Simultaneously or separately the auger 327 is driven by a drive in the auger tip assembly 303 which rotates auger 327 either in a same rotational direction as the outer rotating sleeve 325 or in an opposite direction to outer rotating sleeve 325. The control and rotation of the auger 327 and of the stepper motor 311 as well as the rotation of the outer rotating sleeve 325 by a remote server such as server 284 allow for finite control of the placement of material on a surface. Alternatively, this control could be fed from a personal computer 282 to server 284, or from portable device 294 to server 284.

Figures 31A, 31B:
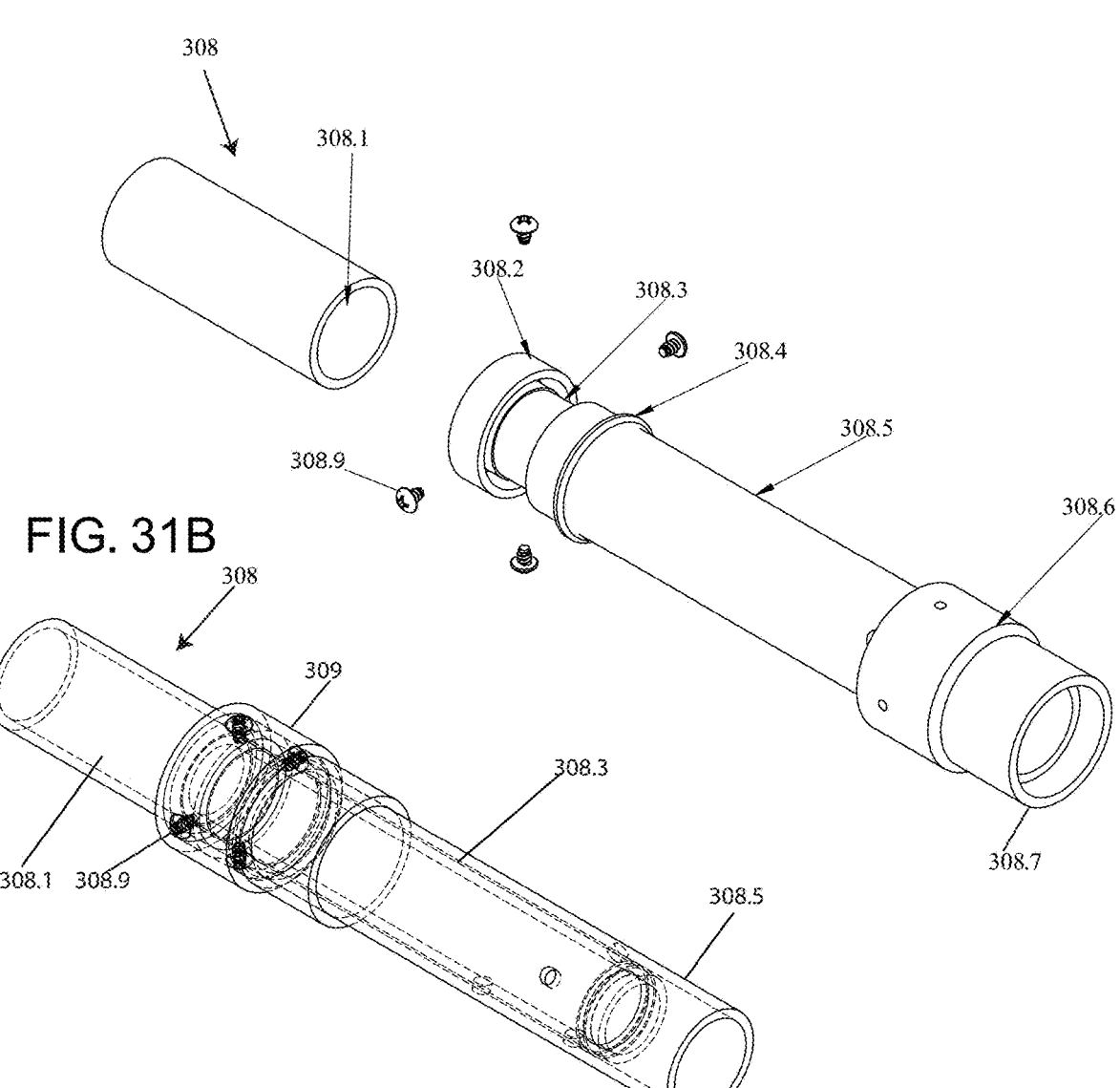
FIG. 31A is a perspective view of an upper section of pipe.
FIG. 31B is a side transparent perspective view of the pipe.

FIG. 31A is a perspective view of an upper pipe section for a nozzle assembly. There is shown a first unthreaded pipe section 308.1. This unthreaded pipe section 308.1 fits into a bushing 308.2. Bushing is coupled to a second unthreaded pipe section 308.3. Coupled to unthreaded pipe section 308.3 is a retaining ring 308.4. This retaining ring allows for the coupling of a reducer and/or a coupling bearing 308 to be coupled thereto (See FIG. 31B). A further section of an unthreaded pipe 308.5 extends towards a pipe fitting 308.6 and then ends at end 308.7.

Figures 32A, 32B, 32C:
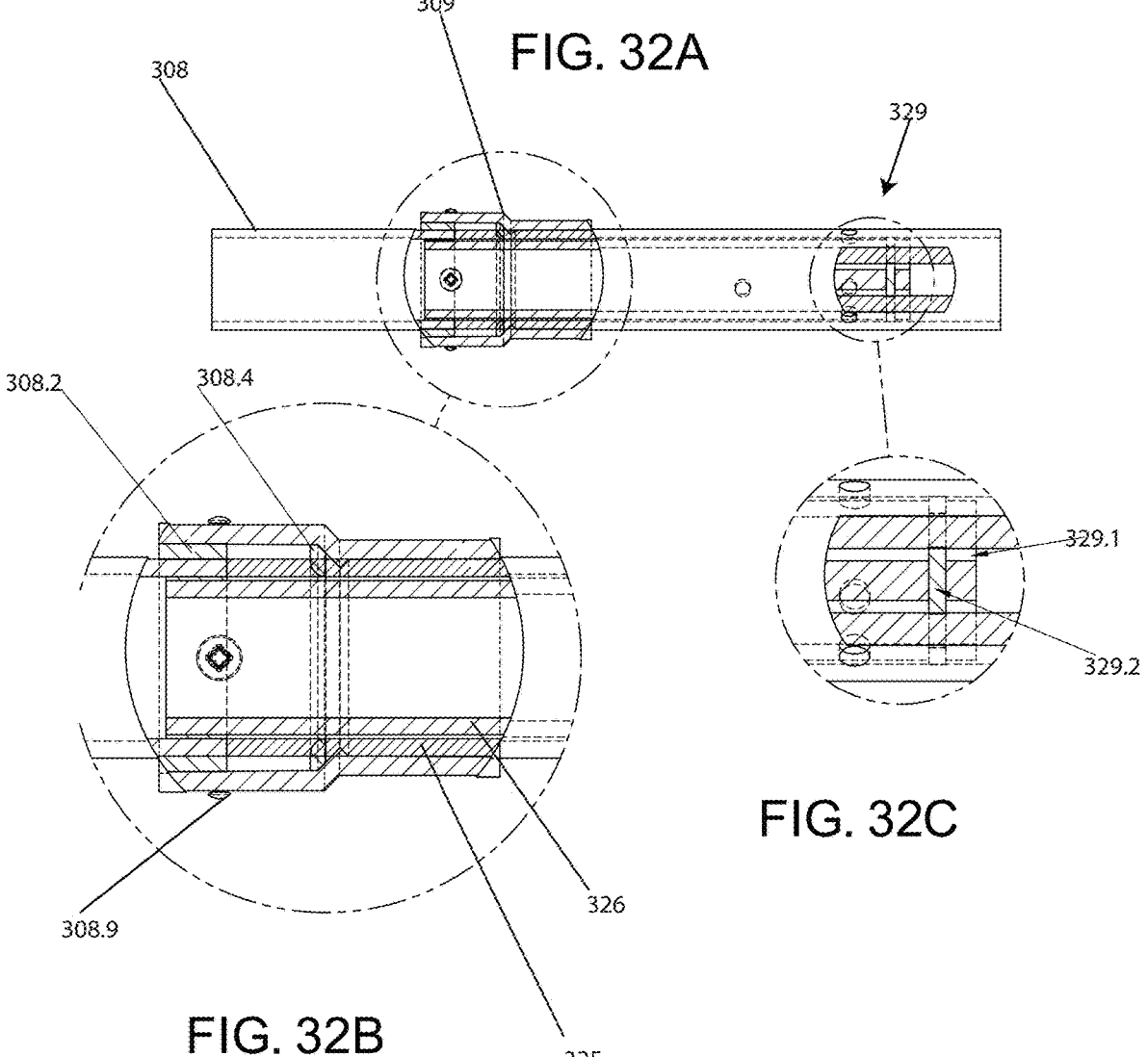
FIG. 32A is a side cross-sectional view of the pipe of FIG. 31A.
FIG. 32B is a close-up view of the coupling section of the pipe of FIG. 31A.
FIG. 32C is a close-up view of an end section of pipe.

A plurality of screws 308.9 are configured to secure a coupling bearing 309 to this upper pipe section to couple a first unthreaded pipe section 308.1 and a second unthreaded pipe section 308.3 together (See FIG. 31B). FIG. 32B shows a close-up view of this section with bushing being clamped by coupling bearing 309 via screws 308.9. In addition, this view also shows both outer pipe 325 and inner pipe 326 in a cross-sectional view as well. FIG. 32C also shows the end 329 of a pipe 329.1 and an O-ring coupling 329.2 a for coupling to an end of another section of pipe.

FIG. 33A shows a side cross-sectional view of a nozzle section 301 which shows an auger 327, a coupling bearing 309 coupling a top fixed part of an upper pipe section 308 of a feed part to a lower rotatable section of a feed pipe which includes both an outer pipe 325 and an inner pipe 326. This view also shows tip coupling 316 as well, which couples a nozzle or tip 324 having a lower bracket to a rotatable section of the feed pipe. At both the coupling bearing 309 and at the tip coupling 316 the feed pipe can be disassembled. Thus, with this view there are multiple sections in which the feed pipe can be disassembled and removed and/or replaced from the system to allow for better cleaning as well as replacement due to wear.

FIG. 33B shows the end section of the feed pipe that is rotatable. With this view there is shown outer pipe 325 as well as inner pipe 326. These pipes are configured to be driven in a rotatable manner by gear 312 when it is driven by stepper motor 311 (See FIG. 27). The rotation of this pipe is inside of bearing assembly 314 (See also FIG. 27). Because this end section of the feed pipe is rotatable as well as an auger that is rotatable, the nozzle section 324 can be configured to precisely apply minute different amounts of building material. For example, in at least one embodiment, the rotatable section can rotate opposite the direction of rotation of the auger. In another embodiment, the rotatable section can rotate with the direction of rotation of the auger but at a different rotational rate. Alternatively, the rotation of the rotatable section can be at a same rate and a same direction of the auger to control application of the material as well as direction of application of material.

Figure 34:
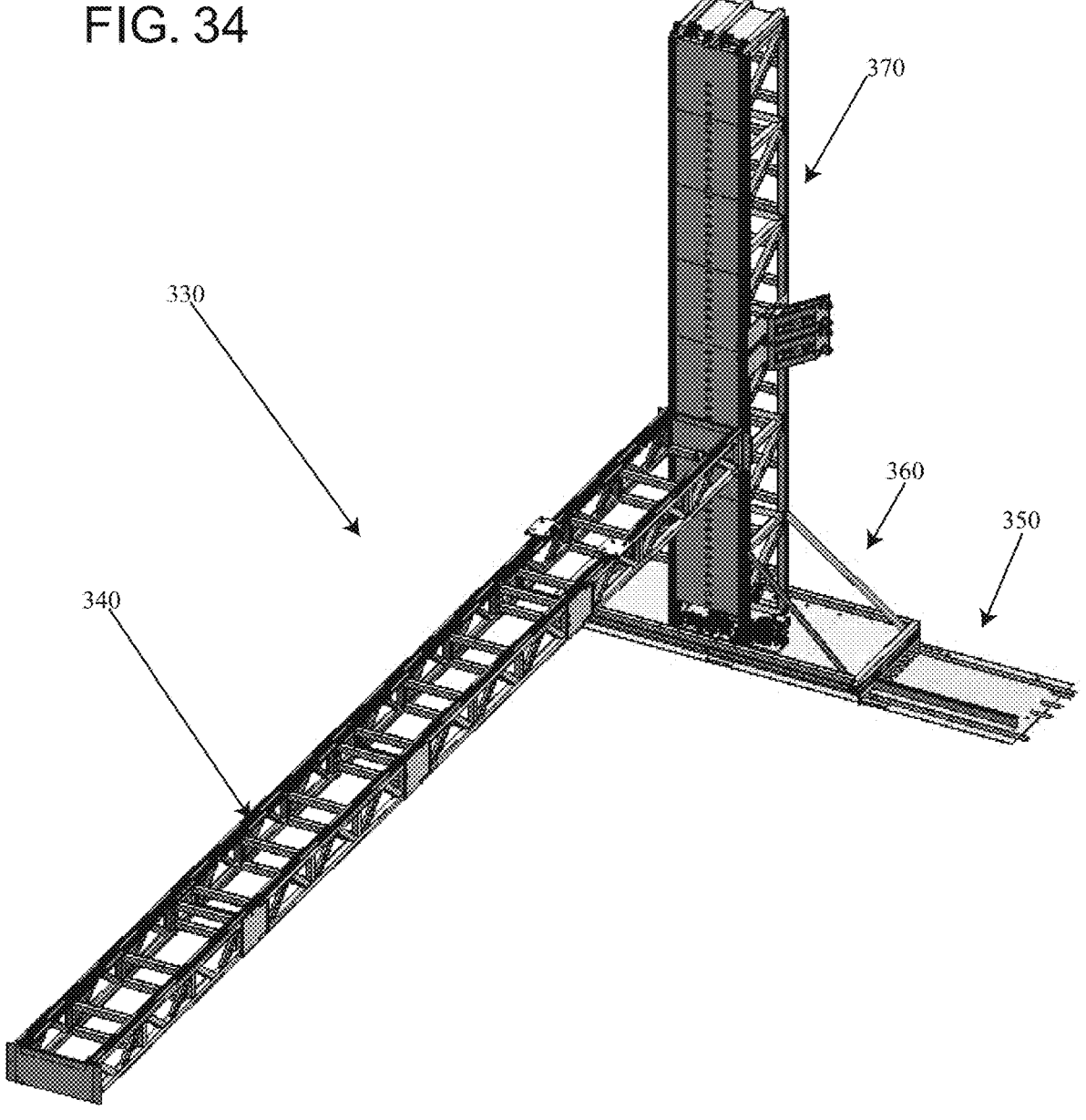
FIG. 34 is an assembled section of the autonomous robotic construction system.

FIG. 34 is an assembled section of a second embodiment of the autonomous robotic construction system 330. While the nozzle above shown in FIGS. 26-33B can be used in the autonomous building system as disclosed in FIGS. 1-25, this nozzle system as shown in FIGS. 26-33B can also be used with the system of FIG. 34 as well. In this view there is a tram section 340. This tram section is coupled to a tower 370. Tower 370 rides on a trolley which rides on track 350.

Figure 35:
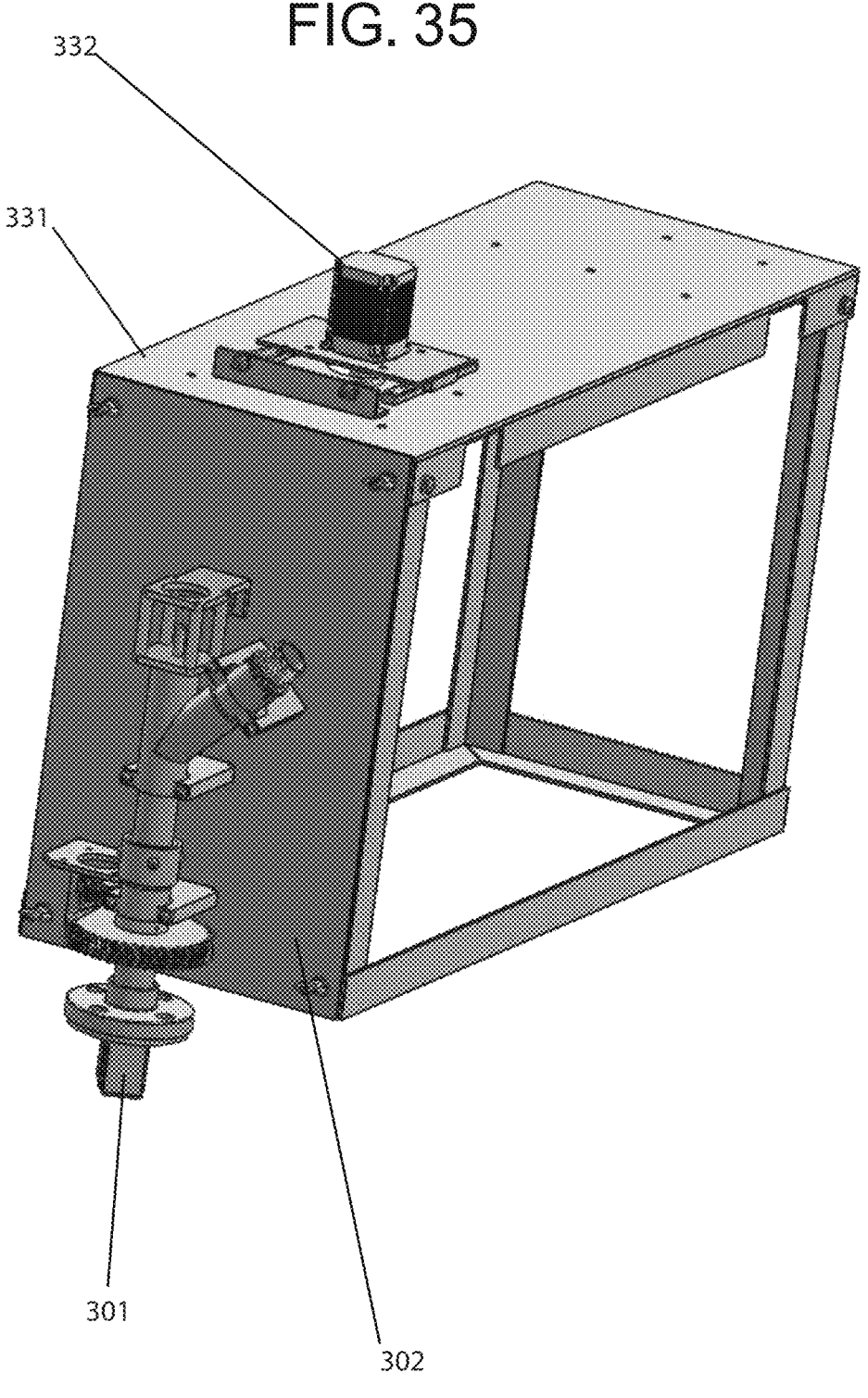
FIG. 35 is an assembled section of the nozzle system.

FIG. 35 is an assembled section of the nozzle system 301 which is coupled to a back plate 302. Back plate 302 is coupled to a box 331, having a drive 332 which forms a rack and pinion X-drive. Rack and pinion X-drive drives the nozzle in an X-direction along the tram between two towers.

Figures 36A, 36B, 36C:
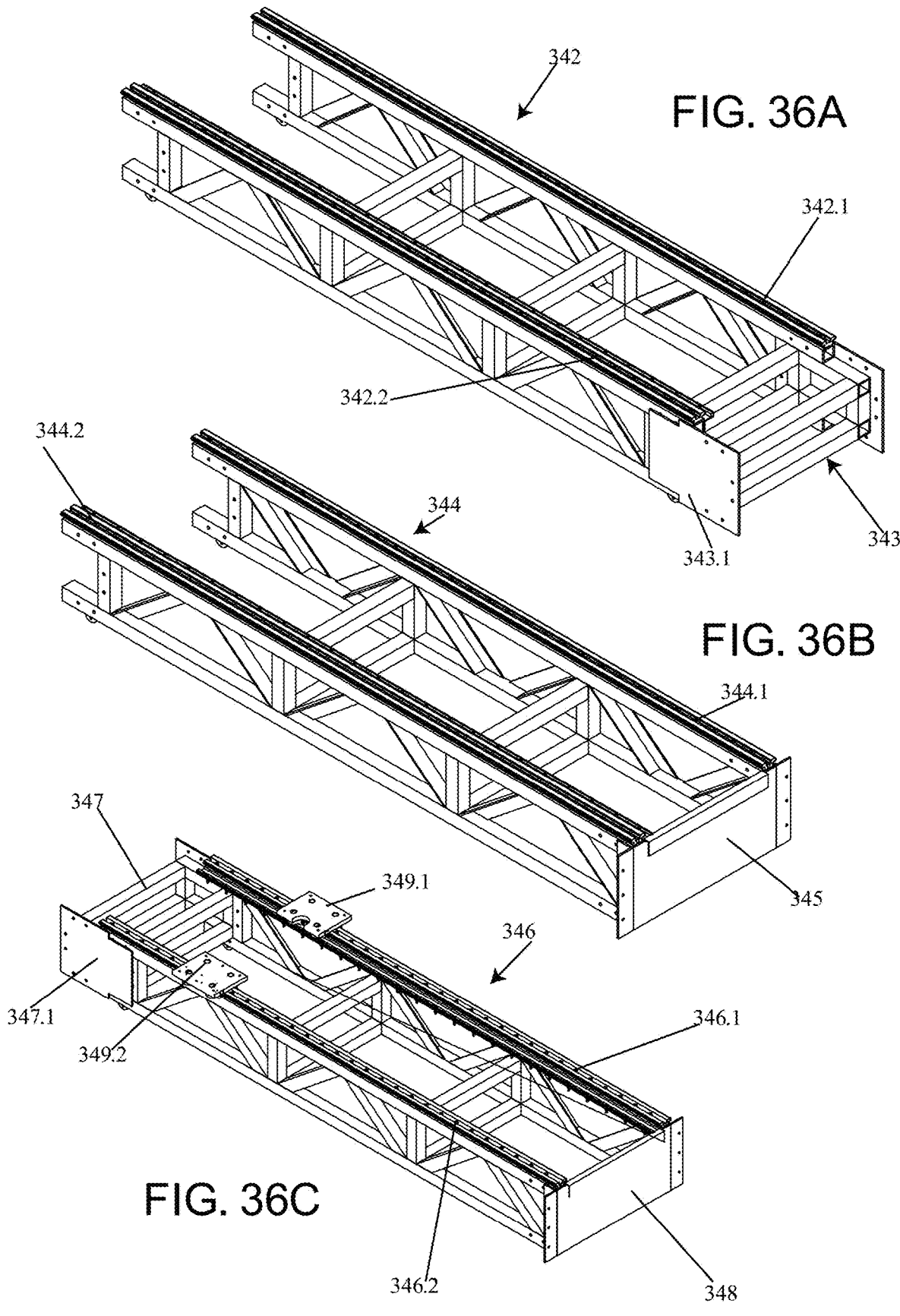
FIG. 36A is a perspective view of a center section of a tram system.
FIG. 36B is a perspective view of a computer end section.
FIG. 36C is a perspective view of a concrete end section.

FIG. 36A is a perspective view of a center section 342 of a tram system. This section includes rails 342.1 and 342.2 as well as a box joiner 343 for joining to other sections and a side plate 343.1.

FIG. 36B is a perspective view of a computer end section of the tram system. This computer end section includes rails 344.1 and 344.2 as well as an end plate 345.

FIG. 36C is a perspective view of a concrete end section. This concrete end section 346 includes rails 346.1 and 346.2 a box joiner 347, with a splice plate 347.1 as well as an end plate 348. Each of these sections can be joined together with the center section repeated in the middle depending on the desired length of the tram. A plurality of cars 349.1 and 349.2 are configured to ride on rails 346.1 and 346.2 or rails 344.1, 344.2, or rails 342.1, 342.2 respectively. The cars are driven back and forth by pinion drive 332 (X-direction drive) which drives the X-direction location of the nozzle.

Figure 37A:
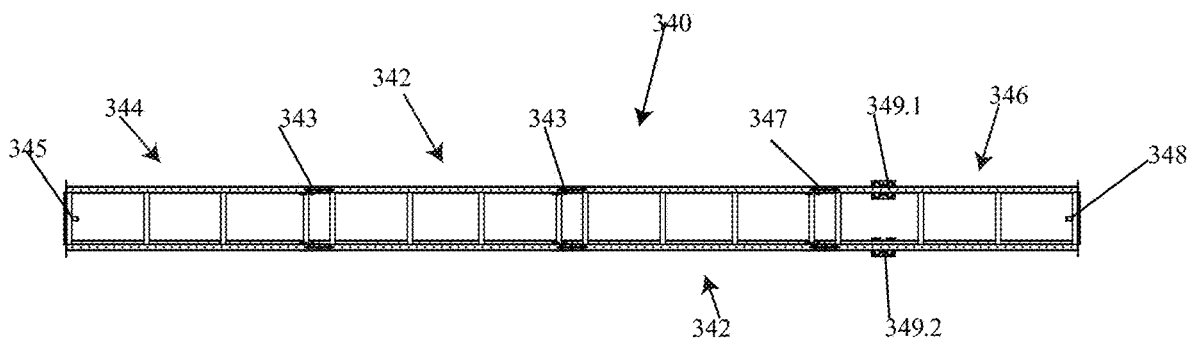
FIG. 37A is a top view of a tram section.

FIG. 37A is a top view of a tram section 340. With this view there is shown a plurality of center sections 342 having box joiners 343 and 347 joining these sections together. In addition, there is shown computer end section 344 having end plate 345 as well as concrete end section having end plate 348 as well. Cars 349.1 and 349.2 are shown riding on respective rails.

Figure 37B:
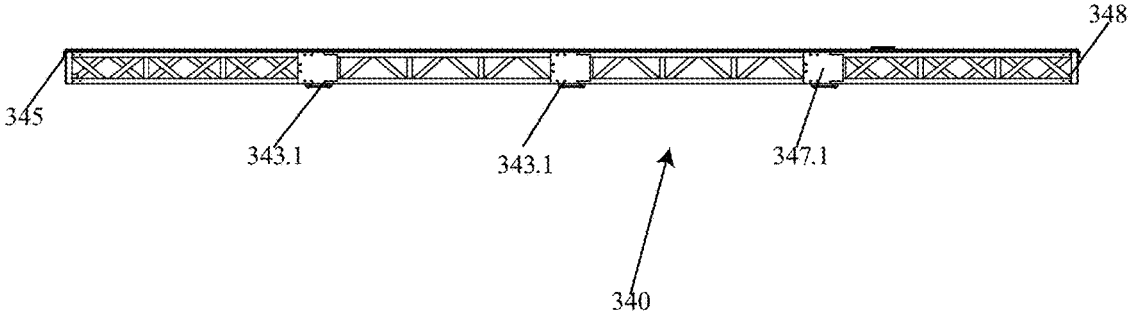
FIG. 37B is a side view of a tram section.

FIG. 37B is a side view of a tram section 340 wherein there is shown side views of splice plates 343.1 and 347.1 as well as end plates 345 and 348.

FIG. 38A is a perspective view and FIG. 38B is a top view of a track 350. Track 350 includes a track plate 351 which has disposed on it a plurality of locks 352. A track 354, a twist lock 353 and a rail 355. A tractor supporting a tower is configured to ride on rails 355. Each of these tracks are configured to be joined together end to end to form a continuous fully adjustable length of track which can be adjusted depending on the desired length. There is also a rack mount 356 coupled to plate 351 as well. This rack mount can be used to further lock the y-direction movement of the tractor in place along the rails.

Figure 39A:
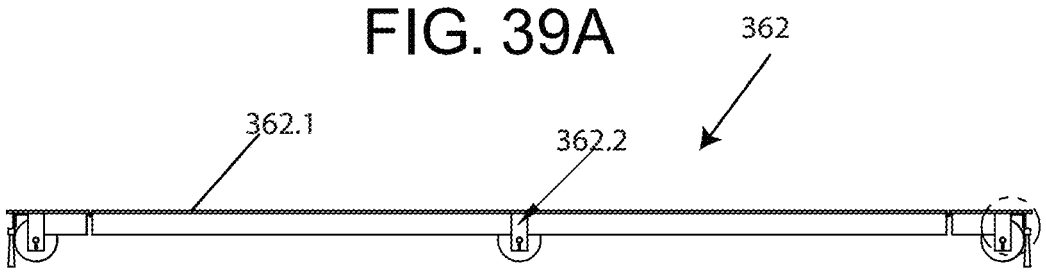
FIG. 39A is a side view of a tractor.
Figure 39B:
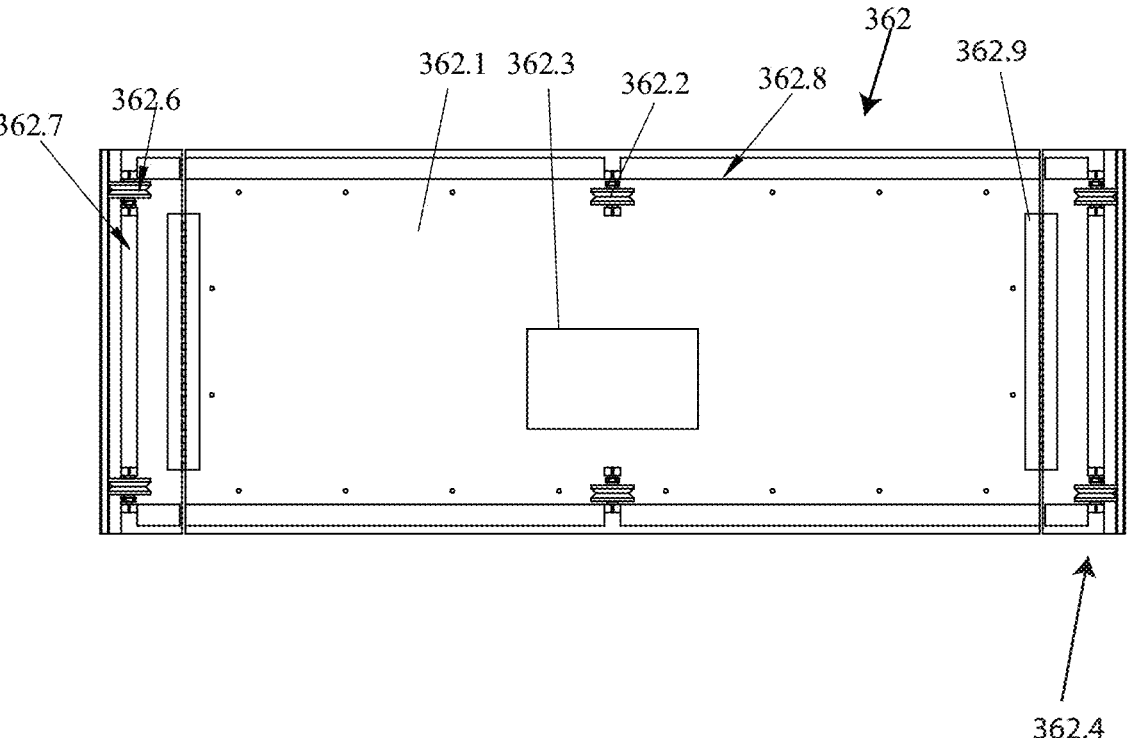
FIG. 39B is a bottom view of the tractor of FIG. 39A.

FIG. 39A is a side view and FIG. 39B is a bottom view of a tractor 362. This tractor includes a center wheel 362.2 as well as a tractor plate 362.1. There is a center section 362.3 cut out of plate 362 allowing for the placement of the Y-drive therein. Coupled to plate 362.1 is a rim 362.8. A plurality of end sections 362.4 are coupled to plate 362.1 via a hinge 362.9. Each end section has a plurality of wheels 362.6 coupled to a respective axle 362.7 (See FIG. 40A).

Figure 40A:
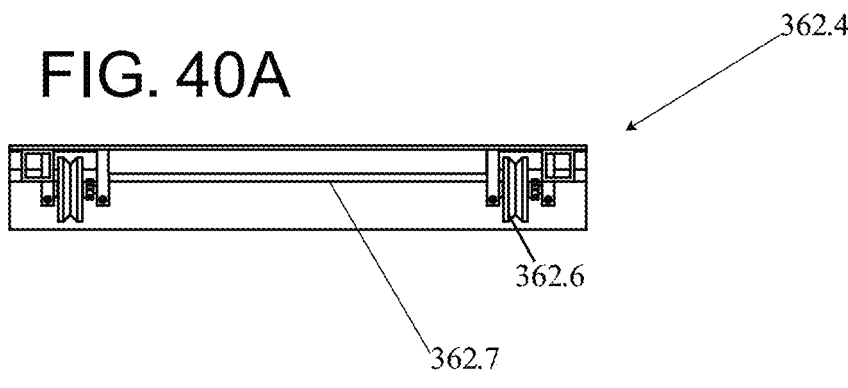
FIG. 40A is an end view of an end plate assembly.
Figure 40B:
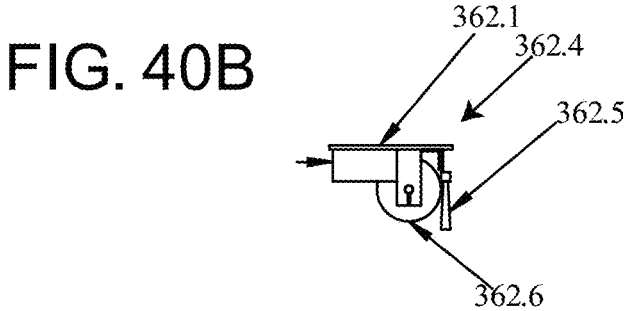
FIG. 40B is a side view of an end plate assembly.
Figure 40C:
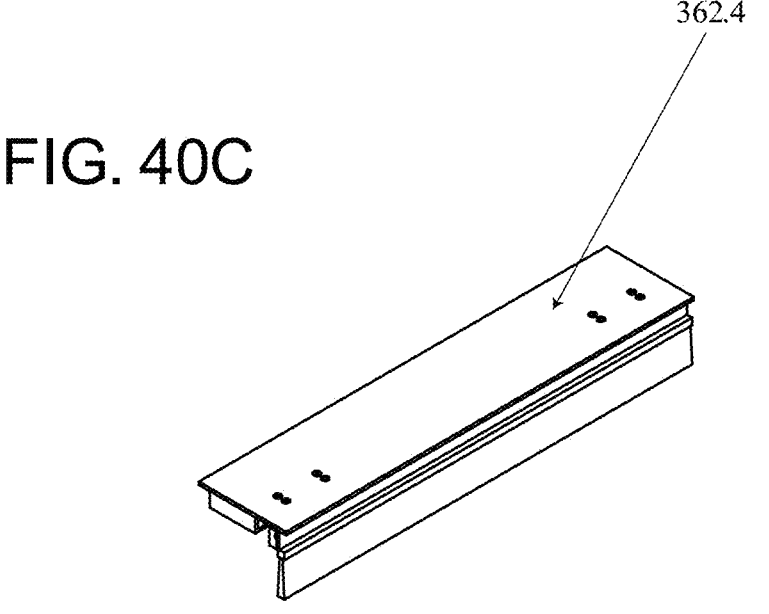
FIG. 40C is a top perspective view of an end plate assembly.

FIG. 40B is a side view of an end plate assembly 362.4, wherein this end plate assembly includes a top plate 362.1 and an end plate 362.5. Also shown is wheel 362.6. In addition, FIG. 40C is a top perspective view of an end plate assembly 362.4. As described above, tractor 362 is configured to roll or move along rails such as rail 355 of track 350 as shown in FIGS. 39A-B. While only one rail 355 is shown on track 350, in a preferred embodiment two parallel tracks are used to support the tractor.

Figures 41A, 41B:
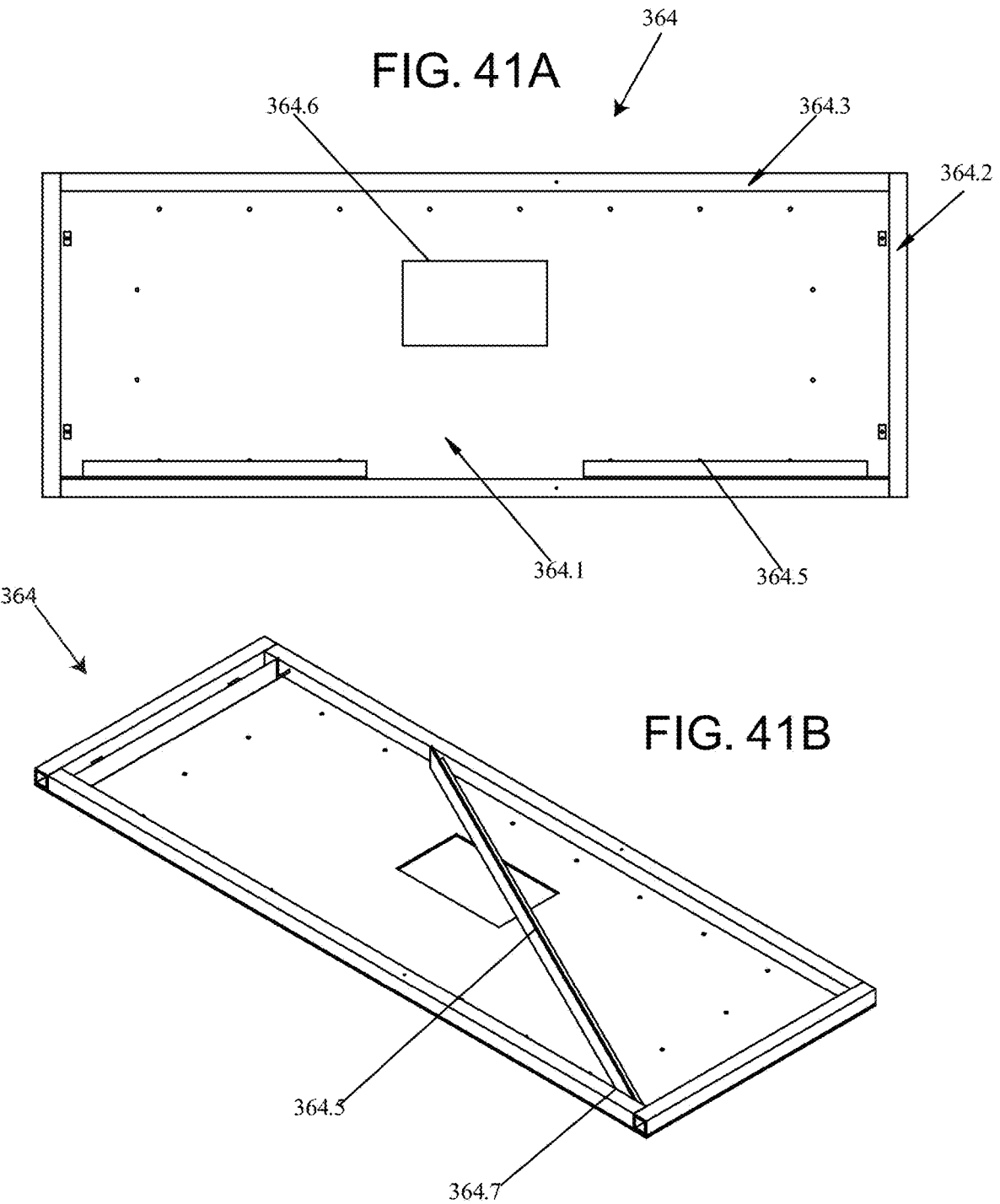
FIG. 41A is a bottom view of a motor plate assembly.
FIG. 41B is a perspective view of a motor plate assembly.

FIG. 41A is a bottom view of a motor plate assembly 364. This view shows a base plate 364.1 a short brace 364.2, and a long brace 364.3. There is also a rotatable tower brace 364.5 coupled to long brace 364.3. A center hole 364.6 is aligned with hole 362.3 on tractor 362. Thus, motor plate assembly 364 is coupled to tractor 362 by being fastened to top plate 362.1 of tractor 362 shown in FIG. 34.

FIG. 41B is a perspective view of motor plate assembly 364. This view shows tower brace 364.5 rotated up via hinge 364.7 so that it can be used to support an upstanding tower such as tower 370.

Figures 42A, 42B, 42C:
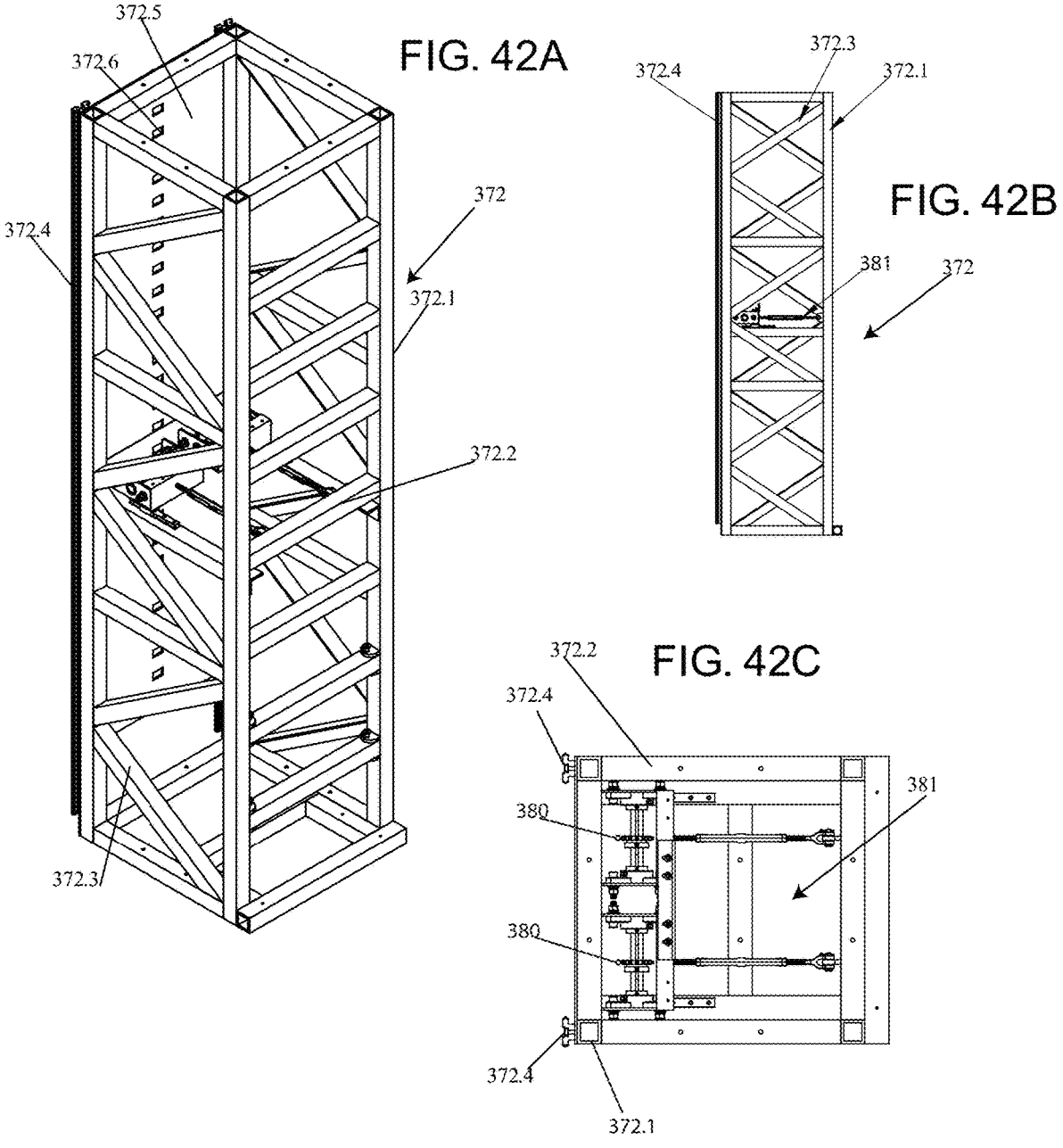
FIG. 42A is a perspective view of a lower section of a tower.
FIG. 42B is a side view of a lower section of a tower.
FIG. 42C is a top view of the lower section of the tower.

FIG. 42A is a perspective view of a lower section 372 of a tower. For example, there is a corner post or column 372.1 which is coupled to a tower step or horizontal beam 372.2. In addition, there is a cross brace 372.3 coupled between the tower step 372.2 and the corner post or column 372.1. A rail 372.4 runs vertically along corner post 372.1 and is config- ured to allow for a tram such as tram 330 to be elevated in a Z-direction.

FIG. 42B is a side view of a lower section 372 of a tower. In this view there is corner post 372.1 supporting rail 372.4. There is also a chain tensioner 381 disposed inside of the lower tower section as well.

FIG. 42C is a top view of the lower section of the tower 372. This view shows corner post 372.1 supporting rails 372.4 and tied to steps 372.2. In addition, there is shown a top view of chain tensioner 381 as well. The chain tensioner is configured to take up any slack in a belt drive of a Z-drive. The Z-drive elevates the tram above a ground surface to allow for continuous layering of material at different levels via a nozzle such as nozzle 324. There is also shown a top cut away view of a belt or a chain 380 coupled to the chain tensioner as well. This belt or chain is driven by the Z-drive to elevate the tram along rails 372.4.

Figures 43A, 43B, 43C:
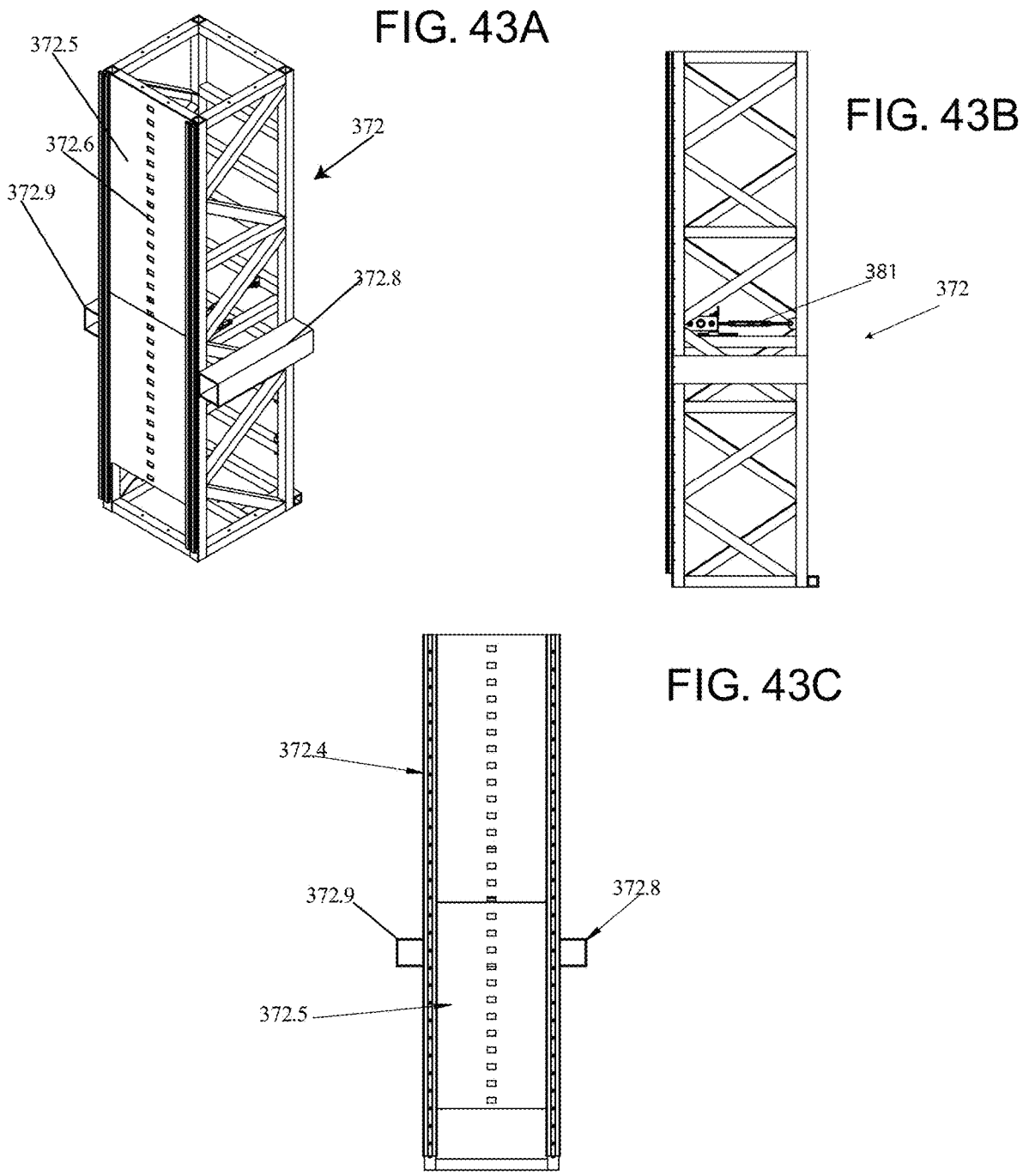
FIG. 43A is another perspective view of the lower section of the tower.
FIG. 43B is a side view of the lower section of the tower.
FIG. 43C is an end view of the lower section of the tower.

FIG. 43A is a perspective view of the lower section of the tower having lift brackets 372.8 and 372.9 coupled thereto. This view also shows plate or tower face 372.5 having notches or face openings 372.6 disposed therein. FIG. 43B is a side view of the lower section of the tower which shows chain tensioner 381 disposed therein. FIG. 43C is an end view of the lower section of the tower having face 372.5 as well as rails 372.4. Lift brackets 372.8 and 372.9 are shown and are configured to be lifted by a forklift on site to allow for assembly of the tower onto the tractor.

Figures 44A, 44B:
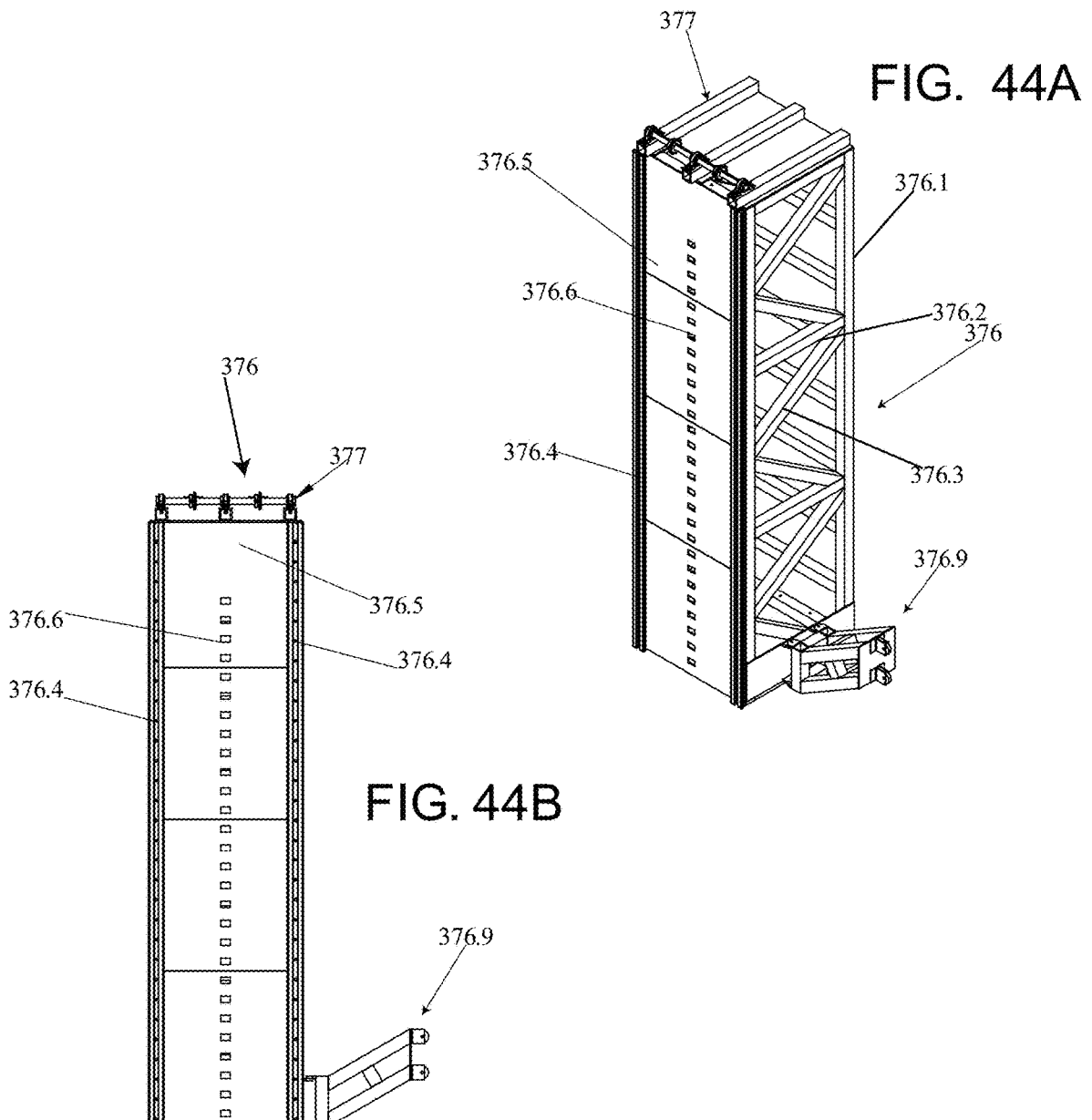
FIG. 44A is a perspective view of an upper section of a tower.
FIG. 44B is a side view of an upper section of the tower.

FIG. 44A is a perspective view and FIG. 44B is a side view of an upper section 376 of a tower. This view shows corner posts 376.1 coupled to shelf beams 376.2 and having cross braces 376.3. In addition, there are shown rails 376.4 which run contiguous with rails 372.4 of the lower section. There is also an upper tower face 376.5 having openings 376.6 as well. There is a lower tower lift 376.9 which is configured to lift the upper tower on top of the lower tower via a hinge (not shown) which is configured to couple the upper tower 376 to the lower tower. Disposed on an upper part of the tower is an idler assembly 377 which is config- ured to have chains or belts extending through them to selectively raise or lower a tram. Thus, a chain or belt extends around Z-drive, through chain tensioner 381, around idler assembly 377 and down to tram 330 such that when the chain or belt is driven in a particular direction by a Z drive, it raises or lowers the tram thereby changing the position of a nozzle.

Figures 45A, 45B:
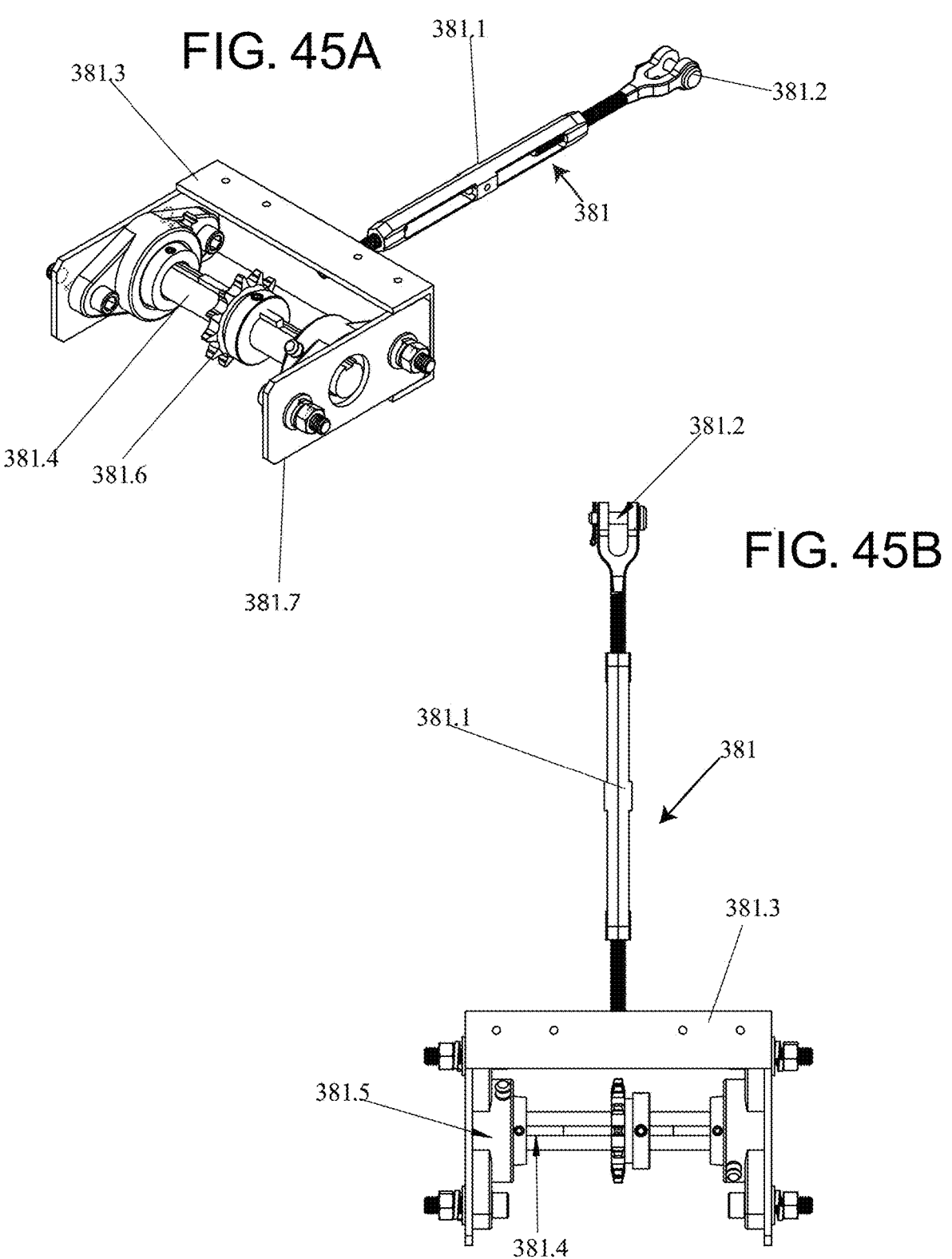
FIG. 45A is a perspective view of a chain tensioner.
FIG. 45B is a top view of a chain tensioner.

FIG. 45A is a perspective view of a chain tensioner 381. The chain tensioner is configured to have an adjustable arm 381.1 as well as a coupling end 381.2. There is a base 381.3 which is configured to hold a tensioner shaft 381.4 having a gear 381.6. FIG. 45B is a top view of a chain tensioner 381 which shows arm 381.1, coupling 381.2, base 381.3 and a ball bearing housing 381.5 coupled to a tensioner shaft 381.4. Thus, the tensioner shaft is rotatable inside of the ball bearing housing 381.5.

Figure 46:
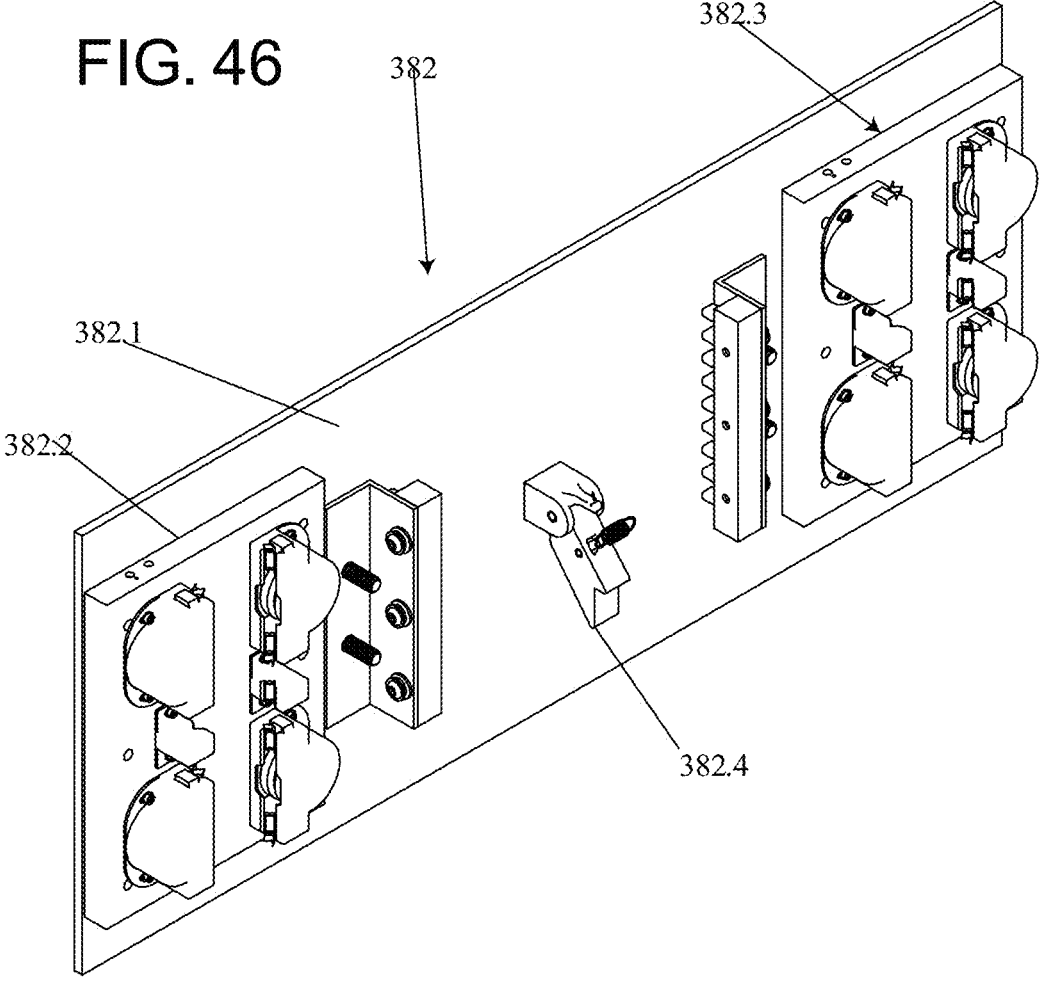
FIG. 46 is a perspective view of a mounting plate assembly.

FIG. 46 is a perspective view of a mounting plate assem- bly 382. This mounting plate assembly includes a plate section 382.1 and a plurality of connector sections 382.2 and

382.3. A center arm 382.4 is positioned in a center region of this plate 382.1. Plate section 382.1 is configured to be coupled to a Y drive (FIGS. 47A, 47B).

Figures 47A, 47B:
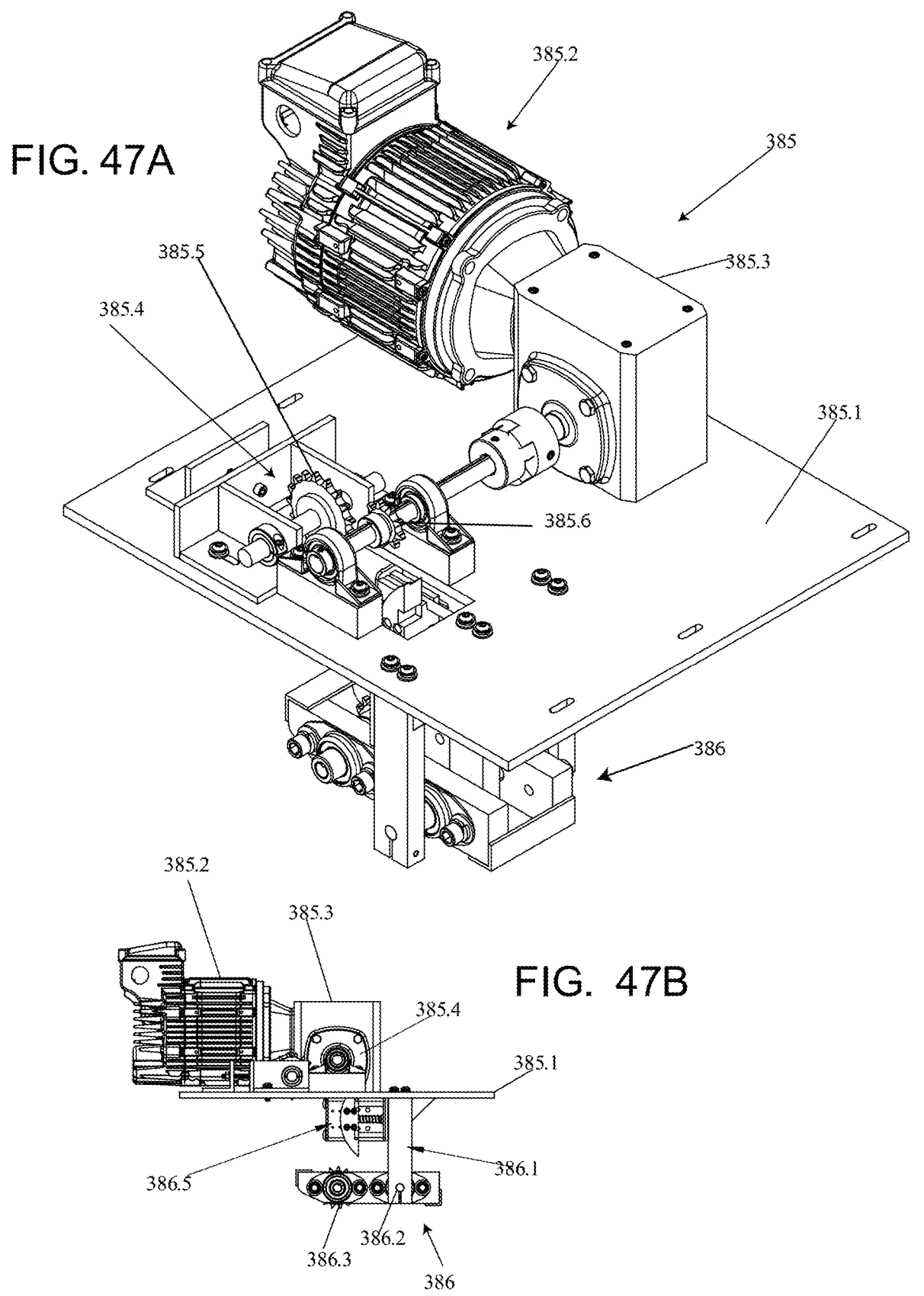
FIG. 47A is a perspective view of a Y drive.
FIG. 47B is a side view of a Y drive.

FIG. 47A is a perspective view of a Y drive 385 which is configured to drive a tractor on rails of the track 350. This Y-drive includes a mounting plate 385.1, a motor 385.2, a transmission housing 385.3 and an idler assembly 385.4 having a gear 385.5 which is driven by motor 385.2. Gear 385.5 can be selectively engaged by gear 385.6 to drive gear 385.5. The idler assembly 385.4 allows for an additional transmission system to take the drive out of gear at select moments. The idler assembly 385 is configured to drive a pinion assembly 386.

FIG. 47B is a side view of a Y drive. This view shows a plate 385.1, a motor 385.2, and a transmission housing 385.3. There is also idler assembly 385.4 which is config- ured to drive pinion assembly 386. Arms 386.1 extend pinion assembly 386 from plate 385.1. In addition, there is shown a chain tensioner 386.5 as well as a lower bracket 386.3 and an axle 386.2.

Figures 48A, 48B, 48C:
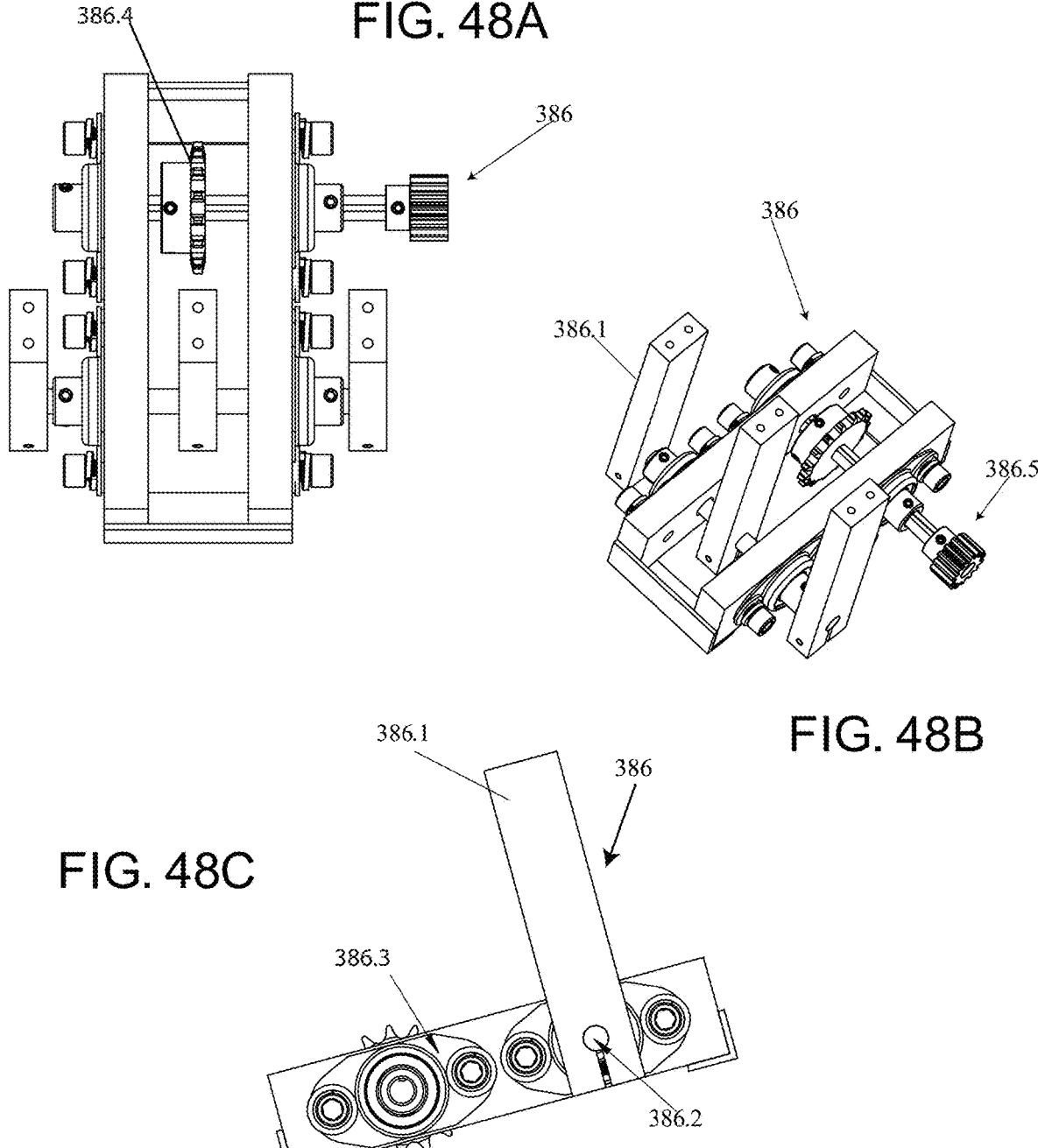
FIG. 48A is a top view of a pinion assembly.
FIG. 48B is a perspective view of a pinion assembly.
FIG. 48C is a side view of a pinion assembly.

FIG. 48A is a top view of a pinion assembly 386 which shows a gear 386.4 which is a driven gear which is driven by motor 385.2 driving a chain around gear 385.5 and then around gear 386.4. As shown in FIG. 48B there is a perspective view of a pinion assembly which shows arms 386.1 and a second driven gear 386.5 which is driven when gear 386.4 is driven as well. FIG. 48C is a side view of a pinion assembly showing arms 386.1 and axle 386.2 as well as bracket 386.3. The pinion assembly is configured to extend through openings such as opening 364.6 on plate 364.1.

FIG. 49A is a perspective view of a Z-drive. This Z-drive 390 is configured to selectively raise and lower a tram such as tram 330.

FIG. 49B is a top view of the Z-drive 390 which includes a plate 391, and a plurality of bearing housings 392 config- ured to allow an axle 394 to rotate within these housings. Gear 393 is configured to rotate with axle 394. In addition, gears 395 and 396 are also configured to rotate with axle 394. Another stage 401 of Z-drive 390 includes a second axle 397 which rotates with axles 398 and 402 inside of bearing housings 400. In addition, there is an even further stage of the Z-drive 390 which includes an additional axle 406 rotatable inside of bearing housings 404 and having gears 407 and 408 to ultimately drive the tram 330 up and down to selectively elevate the nozzle such as nozzle 324. At least one chain such as chain 380 is coupled to at least one gear such as gears 402 or 407 and is ultimately coupled to an idler assembly such as idler assembly 377 positioned on top of tower 370 to selectively raise and lower tram 340.

Figure 50:
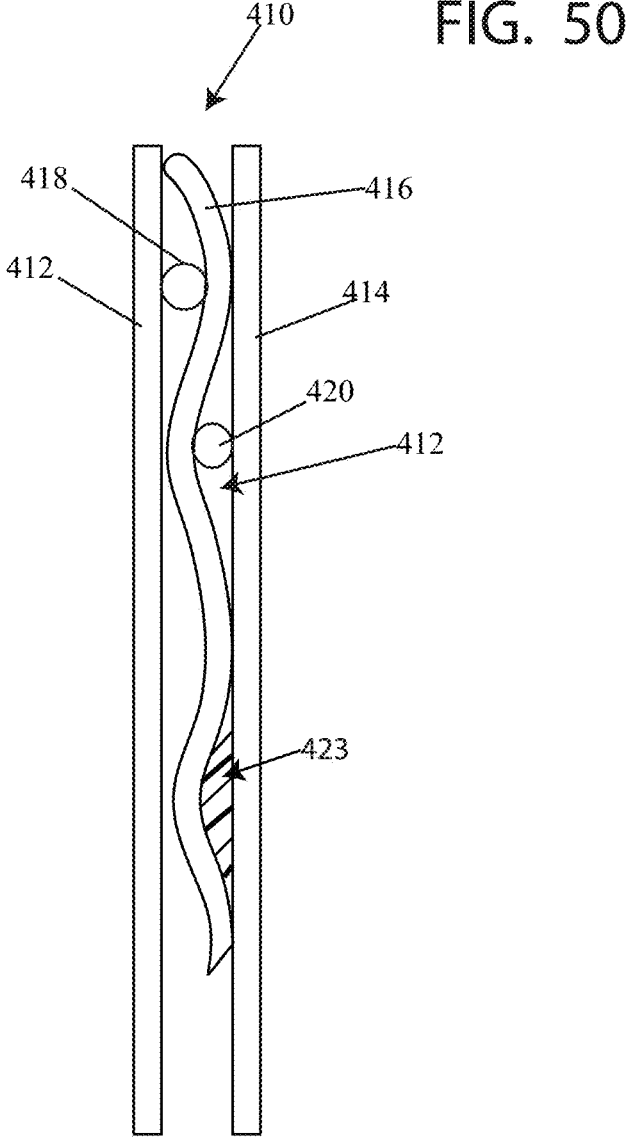
FIG. 50 is a top view of a building component showing the walls and the structural ties along with electrical and plumbing feed pipes.

FIG. 50 is a top view of a building component showing the walls and the structural ties along with electrical and plumbing feed pipes. As shown in FIG. 50 there is a structural member 410 formed which has a first wall 412 and a second wall 414. Disposed between these walls is a structural tie such as tie 416. Structural tie 416 can be made of the same or substantially the same type of material as shown The walls 412 and 414 can be printed in layers with a first wall being printed in a first layer, a second wall being printed then in a first layer and then a tie 416 being printed between the two walls in a first layer. Then once the first layers for each of the walls 412, 414 and 416 are completed the system then puts down a second layer As this is a top view, a plurality of vertically oriented pipes 418 and 420 are shown which can serve as respective electrical conduits such as pipe conduit 418 and a plumbing conduit such as pipe conduit 420. This allows for the formation of a structural member that is free or substantially free from any manual intervention. In the remaining region 422 blown insulation material such as insulation material 423. This blown insulation material can be in the form of mineral wool or other suitable structurally sound but viscous or dense material such as a foam type material which provides additional support for pipes 418 and 420 which thereby allows them to be free standing but supported without any additional couplings or brackets.

Figure 51:
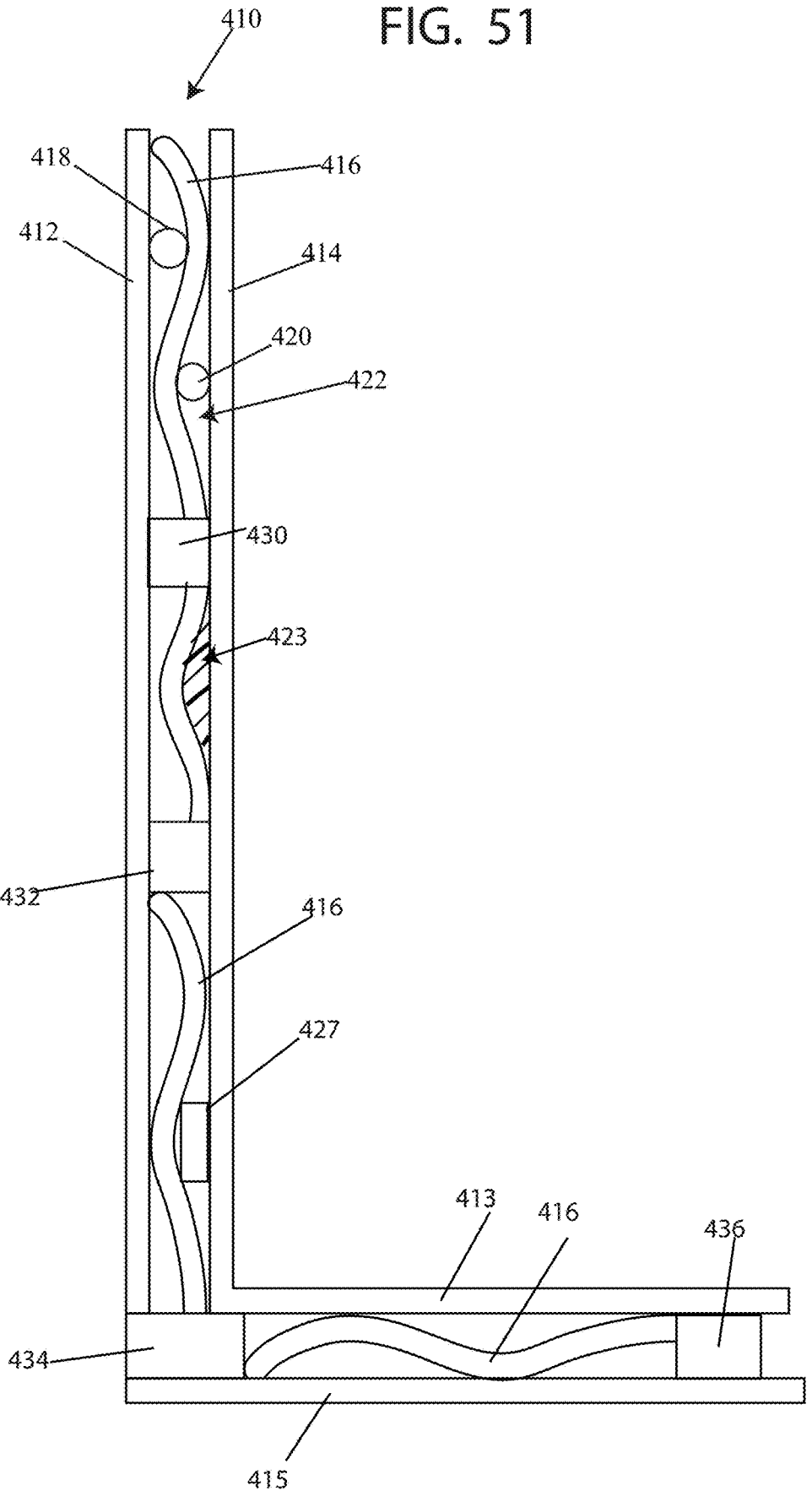
FIG. 51 is a top view of another embodiment of a wall.

FIG. 51 is a top view of another embodiment of a wall made by any one of the systems shown in FIGS. 1-25 or that of the other embodiment shown in FIGS. 34-49 using any one of the nozzle shown in FIG. 26-30.

With this view there is an outer wall (first wall) 412 and an inner wall 414 (second wall). Inner wall 414 and outer wall 412 are spaced apart from each other and are substantially parallel to each other. A plurality of vertically oriented pipes 418 and 420 are also shown. A tie 416 is shown extending between walls 412 and 414. With ties 416 extending between wall 412 and 414 it can be configured to hold vertically oriented pipes in place or a blown insulation such as insulation 423 can be used. With this design there are a plurality of different vertical columns 430, 432, 434, and 436 which are positioned along these walls to provide vertical support such as support for a roof, or an additional floor. A HVAC vent is also shown 427 extending vertically as well. This HVAC vent can be also secured via a blown insulation such as foam insulation. The building material that is used can be a fibrous building material so that the walls such as walls 412 and 416 as well as columns 430, 432, 434, 436 and tie 416 can all be load bearing structures. In addition, substantially perpendicular or tangential walls 413 and 415 are also formed with tie 416 extending between it. These walls 413 and 415 are substantially parallel to each other and spaced apart from each other and are substantially perpendicular or tangential to walls 412 and 414. When a nozzle such as nozzle 424 reaches an end of a wall such as wall 414, it then rotates so that it can then be moved in a substantially tangential direction along a new or second path to print or form wall 413.

Figure 52:
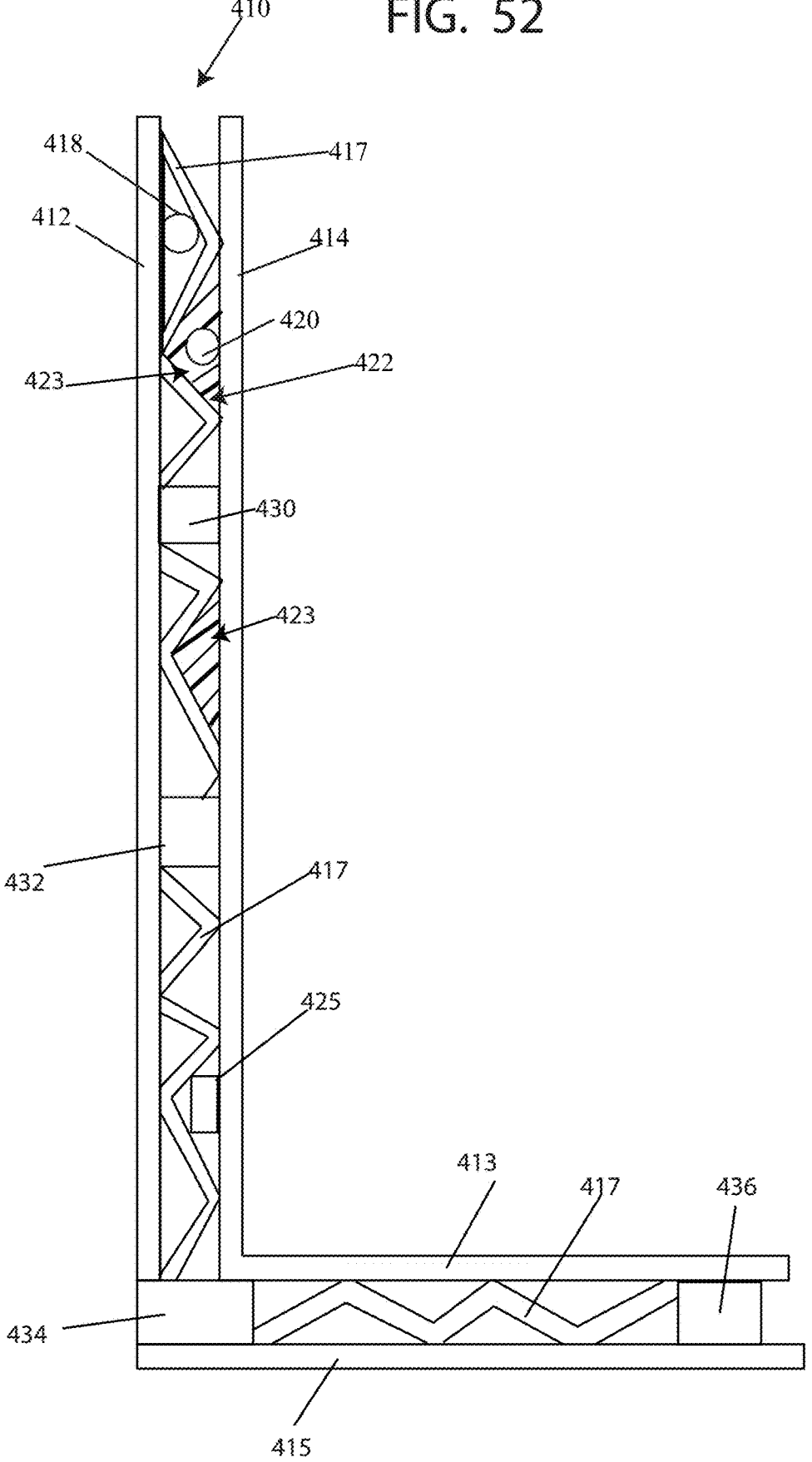
FIG. 52 is a top view of another embodiment of a wall.

FIG. 52 shows a top view of another embodiment of a wall structure 410 which includes walls 412, 414 as well as an intermediate tie such as tie 417 which is formed in a Z-shaped pattern instead of a sinusoidal pattern of tie 416. Essentially these ties are formed to tie both walls such as walls 412 and 414 together so that the application of additional framing material is unnecessary. With both of the embodiments of FIGS. 51 and 52, additional walls 413 and 415 are formed by a rotating nozzle at the corners.

Figure 53:
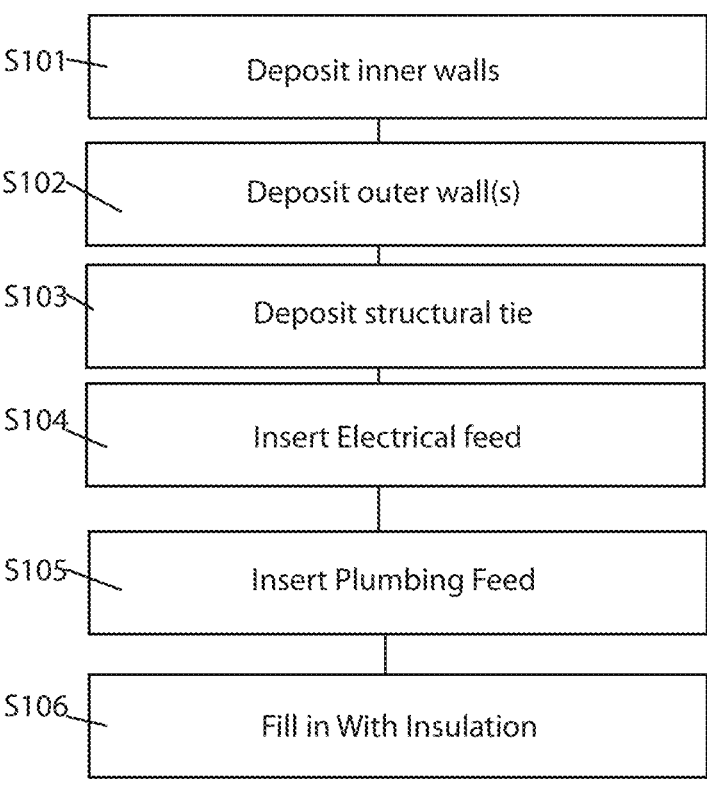
FIG. 53 is a flow chart for the process for producing a wall system as shown in FIGS. 50-52.

FIG. 53 is a flow chart for the process for producing a wall system as shown in FIG. 50. For example, the process starts in step S101 wherein the system would deposit slurry to form an inner wall such as with wall 412. Next the system could then deposit either subsequently or simultaneously material to form an outer wall 404 as well. These two walls are formed in parallel so that two spaced nozzles can be placed side by side to simultaneously form two parallel walls. Next, in step S103 the system can deposit the structural tie such as tie material 416. This tie material would be in the place of beams or other structural support members. The tie material would essentially serve to couple the two different walls such as walls 412 and 414 together. Each of the walls 412 and 414 as well as the structural support 416 serve as a support or post to further support either a roof or an additional floor. Next, in step S104 the electrical feed is deposited in a top down manner with a feed pipe or feed channel inserted therein. Next, in step S105 a plumbing feed is also inserted. While the step for inserting the plumbing feed is shown as after the insertion of the electrical feed, these steps can be reversed as needed. Next, in step S106 the system can fill in the surrounding area with material such as foam material to support either the plumbing feed or the electrical feed in a vertical manner.

Figure 54:
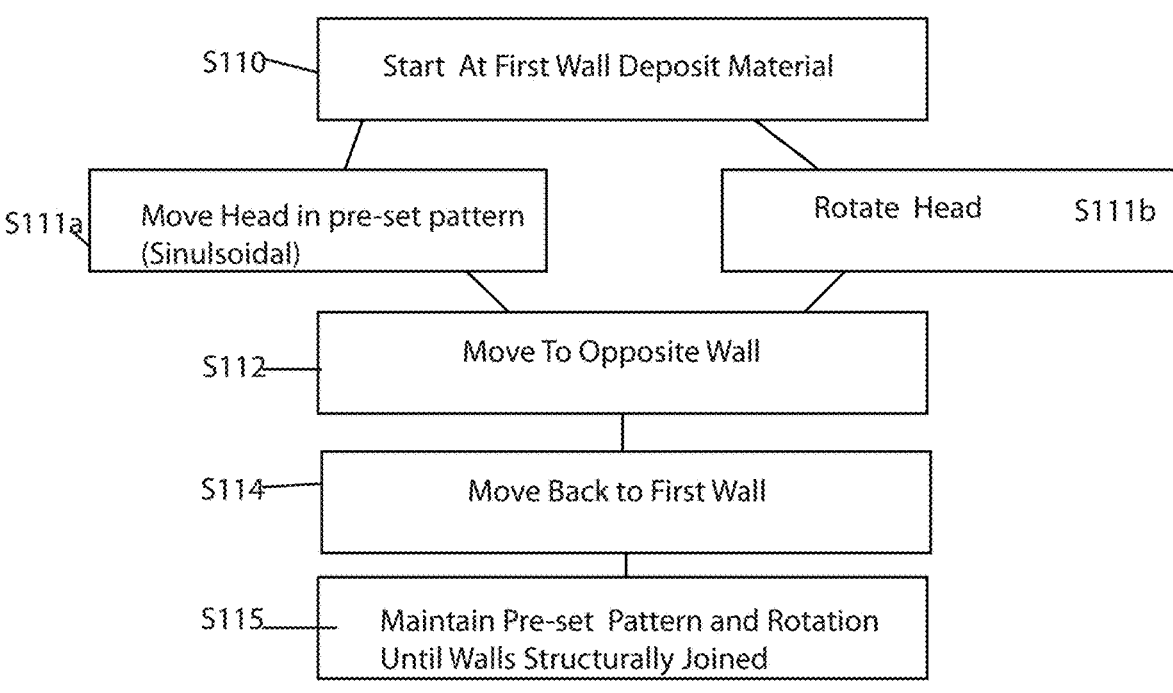
FIG. 54 is a flow chart for the process for making the structural wall with the step of producing the structural tie expanded upon.
Figure 56:
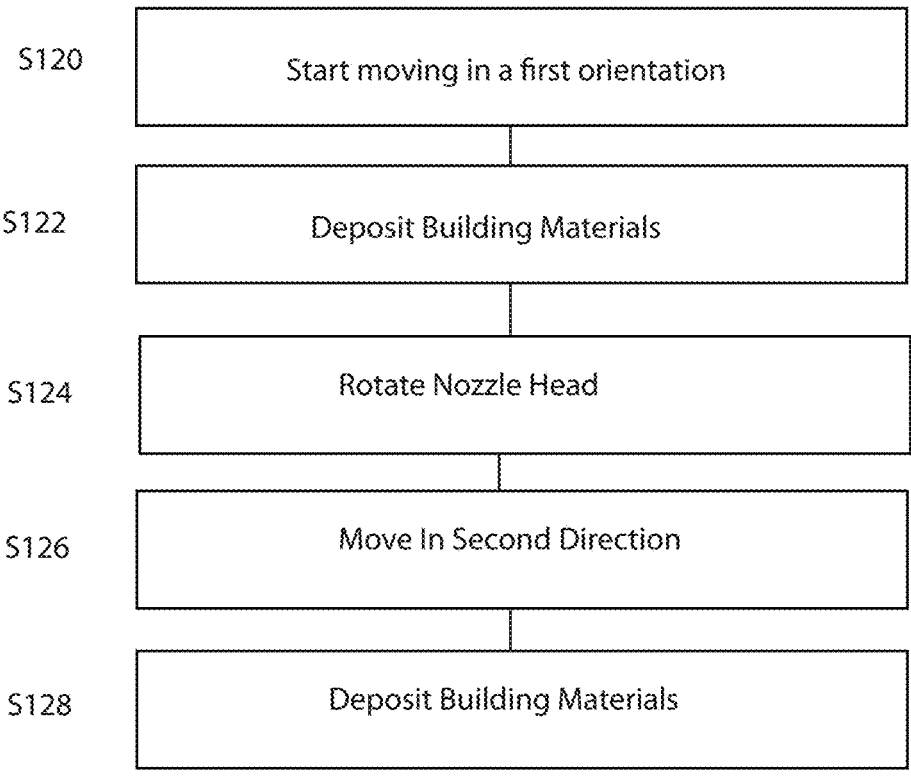
FIG. 56 is the flow chart for forming a perpendicularly intersecting wall.

FIG. 54 is a flow chart for the process for making the structural wall with the step of producing the structural tie 416 expanded upon. For example, with this design, the process begins with the step of S110 wherein the head or tip 324 starts at a first wall to deposit material. Next, in step S111a the system can move the tip 324 in a pre-set pattern such as a sinusoidal pattern while simultaneously or sequentially rotating head or tip 324 to accommodate this sinusoidal movement. The rotation of the head or tip 324 allows for the deposition of material in a curved manner as well as allows for very fine placement of specific amounts of material. Next as the tip 324 or the head moves from one wall in step to the other wall it reaches the opposite wall in step S112 and then starts back on the opposite pattern repeating steps S111a and S111b to first wall S114 repeating this pattern in step S115 until the structural tie 406 is fully formed.

Figure 55:
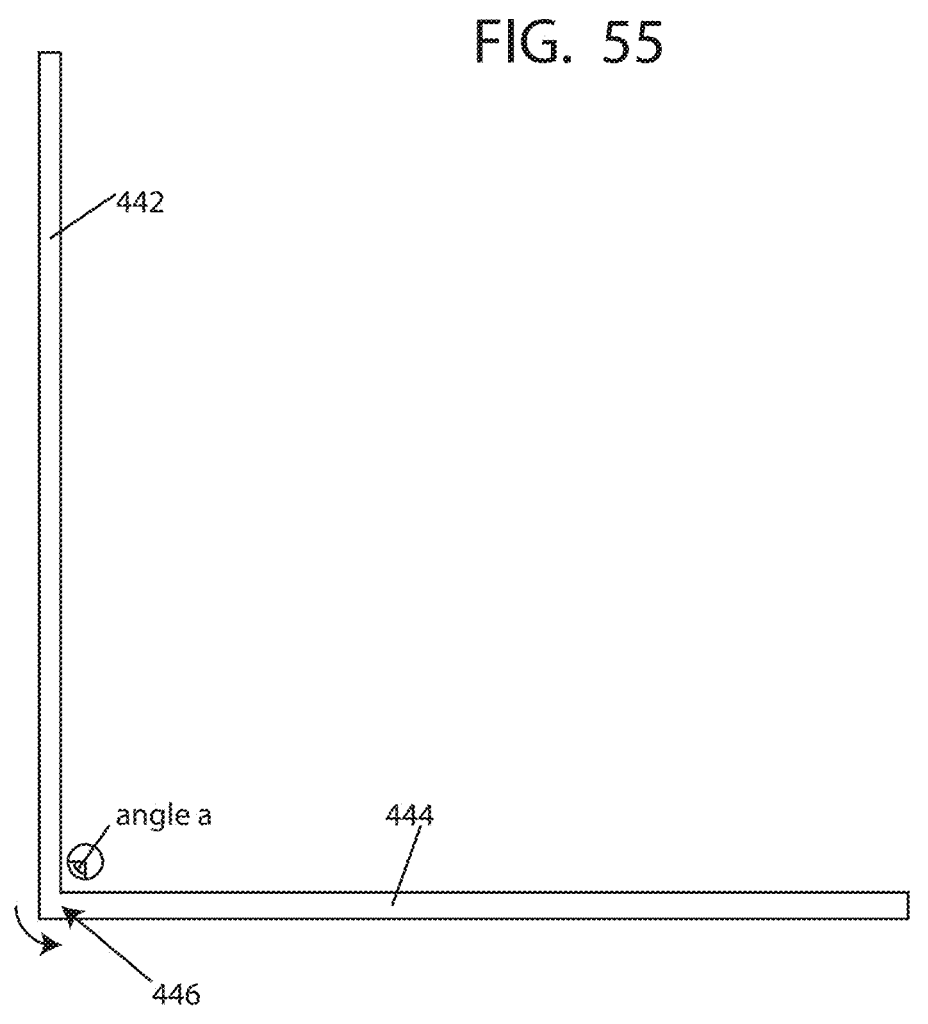

FIG. 55 is a view of a wall with a substantially perpendicular intersecting wall.

With this view there is a first wall 442 and a second wall 444. The formation of the first wall 442 is formed with the nozzle moving in a first orientation in step 120 with a straight-line movement of the tip or head 324, it then deposits building materials in step S122.

When this head reaches the intersection of the first wall 422 with the second wall 444, head or tip 324 rotates in step S124 at least a first degree of rotation of for example 90 degrees as shown by angle a to allow for movement of the tip or head 324 in a direction that is substantially perpendicular to the orientation of the first wall 442. This rotating head using the rotating sleeve 325 allows for the distribution of materials at any orientation and in substantially any direction. Next, in step S126 the nozzle can move in a second direction and then deposit additional building materials in step S128.

Thus, there is created an autonomous robotic building system which is configured to create and assembly a building structure with little or no human intervention and which can be controlled by a computer to create a three-dimensional structure such as a building.

Accordingly, while at least one embodiment of the present invention have been shown and described, it is to be understood that many changes and modifications may be made thereunto without departing from the spirit and scope of the invention as defined in the appended claims.

What is claimed is:

1. An autonomous robotic construction system configured to distribute building materials, the system comprising:

at least one frame comprising at least one substantially horizontal track and at least one set of substantially vertical tracks;

at least one rotatable nozzle having a non-circular aperture;

at least one movable device coupled to the frame and configured to move said rotatable nozzle around said frame;

at least one pump configured to pump building materials comprising at least one of cementitious material or concrete through said at least one rotatable nozzle;

at least one feed tube configured to distribute the building materials, wherein said at least one feed tube comprises a chamber and at least one rotatable sleeve, the chamber being fluidly connected to the at least one rotatable nozzle through the at least one rotatable sleeve;

at least one rotatable auger extending from the chamber, wherein the at least one rotatable sleeve and the at least one rotatable auger are rotatable independent of one another at a direction of rotation and a rate of rotation effective to control deposition amount and deposition rate of the building materials; and at least one computer system comprising at least one microprocessor configured to control said at least one rotatable nozzle, said at least one rotatable auger, said at least one movable device, and said at least one pump to control deposition of the building materials.

2. The system as in claim 1, wherein said at least one movable device is configured to move along at least one of said substantially horizontal track or at least one track of said set of substantially vertical tracks.

3. The system as in claim 1, wherein said at least one substantially horizontal track of said frame comprises at least two substantially parallel horizontal tracks.

4. The system as in claim 3, wherein said at least one set of substantially vertical tracks of said frame comprises at least two substantially vertical parallel tracks.

5. The system as in claim 4, further comprising at least one cross-beam configured to extend between said at least two substantially parallel horizontal tracks.

6. The system as in claim 5, wherein said at least one rotatable nozzle is coupled to said at least one cross-beam.

7. The system as in claim 1, wherein said at least one substantially horizontal track comprises at least one substantially I-beam shaped track.

8. The system as in claim 1, wherein said at least one movable device comprises at least one cart.

9. The system as in claim 8, wherein said at least one set of substantially vertical tracks is positioned on said at least one cart wherein said at least one set of substantially vertical tracks is movable along said at least one horizontal track via said at least one cart.

10. The system as in claim 5, wherein said at least one cross-beam is vertically movable along each of said at least two substantially parallel vertical tracks.

11. The system as in claim 10, further comprising at least one nozzle platform, wherein said at least one rotatable nozzle is coupled to said at least one nozzle platform, wherein said at least one nozzle platform is movable along said at least one cross-beam.

12. The system as in claim 1, wherein said at least one rotatable nozzle non-circular aperture is rectangular in shape.

13. The system as in claim 12, further comprising at least one stepper motor, wherein said at least one stepper motor is coupled to said at least one rotatable auger and configured to drive said at least one rotatable auger.

14. The system as in claim 13, wherein said at least one stepper motor is configured to rotate said at least one rotatable sleeve.

15. The system as in claim 14, wherein said at least one computer system is configured to control said at least one stepper motor.

16. The system as in claim 1, wherein said rotatable nozzle is replaceable.

17. The system as in claim 16, further comprising a replaceable tip coupling configured to allow said at least one rotatable nozzle to be removed and replaced.

18. The system as in claim 1, further comprising at least one additional feed tube for delivering additional material separate from said nozzle.

19. The system as in claim 18, further comprising at least one tank coupled to said additional feed tube.

20. The system as in claim 19, further comprising at least one additional head coupled to said additional feed tube.

21. The system as in claim 20, wherein said at least one tank, said at least one additional feed tube and said at least one additional head are configured to deliver a slurry.

22. The system as in claim 21, further comprising at least one roller former configured to shape slurry delivered by said at least one additional head.

23. The system as in claim 22, wherein said at least one roller former comprises at least one roller.

24. An autonomous robotic construction system configured to distribute building materials, the system comprising:

at least one frame comprising at least one substantially horizontal track and at least one set of substantially vertical tracks;

at least one rotatable nozzle;

at least one nozzle platform wherein said rotatable nozzle is coupled to said nozzle platform, and said nozzle platform is coupled to said at least one frame;

at least one shock, coupled to said at least one nozzle platform;

at least one movable device coupled to the frame and configured to move said rotatable nozzle around said frame;

at least one pump configured to pump the building materials comprising at least one of cementitious material or concrete through said at least one rotatable nozzle;

at least one feed tube, said feed tube configured to distribute the building materials, wherein said at least one feed tube comprises a chamber and at least one rotatable sleeve, the chamber being fluidly connected to the at least one rotatable nozzle through the at least one rotatable sleeve;

at least one rotatable auger extending from the chamber, wherein the at least one rotatable sleeve is rotatable independent of a rotation of the at least one rotatable auger; and at least one computer system comprising at least one microprocessor configured to control said at least one rotatable nozzle, said at least one movable device, and said at least one pump to control deposition of the building materials.

25. The system of claim 1, wherein the at least one rotatable sleeve is adjacent to the chamber.

26. The system of claim 24, wherein the at least one rotatable sleeve is adjacent to the chamber.

* * * * *